US012440214B2

United States Patent
Kawaura et al.

(10) Patent No.: US 12,440,214 B2
(45) Date of Patent: Oct. 14, 2025

(54) COMPRESSION DEVICE AND COMPRESSION METHOD

(71) Applicant: TERUMO KABUSHIKI KAISHA, Tokyo (JP)

(72) Inventors: Masakatsu Kawaura, Mountain View, CA (US); Yuki Soma, Mountain View, CA (US); Shuji Uemura, Mountain View, CA (US)

(73) Assignee: TERUMO KABUSHIKI KAISHA, Tokyo (JP)

( * ) Notice: Subject to any disclaimer, the term of this patent is extended or adjusted under 35 U.S.C. 154(b) by 1217 days.

(21) Appl. No.: 17/152,426

(22) Filed: Jan. 19, 2021

(65) Prior Publication Data
US 2021/0204953 A1 Jul. 8, 2021

Related U.S. Application Data

(63) Continuation of application No. PCT/JP2019/028550, filed on Jul. 19, 2019.

(30) Foreign Application Priority Data

Jul. 20, 2018 (JP) .................................. 2018-137180

(51) Int. Cl.
*A61B 17/12* (2006.01)
*A61B 17/00* (2006.01)

(52) U.S. Cl.
CPC .......... *A61B 17/12* (2013.01); *A61B 17/0057* (2013.01); *A61B 2017/0065* (2013.01);
(Continued)

(58) Field of Classification Search
CPC ................ A61B 17/12; A61B 17/0057; A61B 2017/0065; A61B 2017/00659;
(Continued)

(56) References Cited

U.S. PATENT DOCUMENTS 1,281,653 A * 10/1918 Plummer ........... A61B 17/1327
606/203
2,533,924 A * 12/1950 Foley .................... A61F 2/0054
128/885
(Continued)

FOREIGN PATENT DOCUMENTS

CN 205758645 U 12/2016
CN 113100867 A * 7/2021 ............. A61B 17/12
(Continued)

OTHER PUBLICATIONS

Office Action issued Oct. 5, 2023 by the European Patent Office in corresponding European Patent Application No. 19 838 845.6 (7 pages).
(Continued)

*Primary Examiner* — Tan-Uyen T Ho
*Assistant Examiner* — Osama Nemer
(74) *Attorney, Agent, or Firm* — BUCHANAN INGERSOLL & ROONEY PC

(57) ABSTRACT

A compression device according to the present disclosure includes a main body portion that is fixable to a biological surface; a compression portion configured to compress the biological surface; a hinge portion that supports the compression portion so as to be rotatable around a rotational axis with respect to the main body portion; and a pressing portion configured to press the compression portion in one rotational direction around the rotational axis. The compression portion rotates around the rotational axis to be configured to compress the biological surface.

14 Claims, 37 Drawing Sheets

(52) U.S. Cl.
CPC ............... *A61B 2017/00659* (2013.01); *A61B 2017/12004* (2013.01)

(58) Field of Classification Search
CPC ........... A61B 2017/12004; A61B 2017/00858; A61B 2017/00951; A61B 17/135; A61B 17/1325; A61B 5/02233; A61B 17/132; A61H 39/04
See application file for complete search history.

(56) References Cited

U.S. PATENT DOCUMENTS

| | | | | |
|---|---|---|---|---|
| 3,884,240 | A * | 5/1975 | Gilman | A61B 17/132 2/209 |
| 5,307,811 | A * | 5/1994 | Sigwart | A61B 17/132 600/490 |
| 5,468,220 | A * | 11/1995 | Sucher | A61F 5/05866 63/8 |
| 5,486,194 | A * | 1/1996 | Kawasaki | A61B 17/135 602/53 |
| 5,569,297 | A * | 10/1996 | Makower | A61B 17/1325 606/201 |
| 5,728,120 | A | 3/1998 | Shani et al. | |
| 5,792,173 | A * | 8/1998 | Breen | A61B 17/135 606/1 |
| 6,068,646 | A * | 5/2000 | Lam | A61B 17/1325 606/157 |
| 6,833,001 | B1 * | 12/2004 | Chao | A61B 17/1325 606/203 |
| 8,298,199 | B2 * | 10/2012 | Lu | A61F 13/08 602/53 |
| 8,845,680 | B2 * | 9/2014 | Lampropoulos | A61B 17/132 600/499 |
| 9,439,827 | B2 * | 9/2016 | Saatchi | A61H 1/006 |
| 2003/0055453 | A1 * | 3/2003 | Akerfeldt | A61B 17/132 606/203 |
| 2008/0269659 | A1 * | 10/2008 | Bergin | A61B 17/0057 606/213 |
| 2009/0281565 | A1 * | 11/2009 | McNeese | A61B 17/1325 606/201 |
| 2010/0280541 | A1 * | 11/2010 | Lampropoulos | A61B 17/1325 606/203 |
| 2011/0112459 | A1 * | 5/2011 | Mathieu | A41B 11/126 602/55 |
| 2011/0202089 | A1 * | 8/2011 | Sun | A61B 17/1325 606/201 |
| 2012/0150215 | A1 * | 6/2012 | Donald | A61B 17/1325 606/203 |
| 2013/0085524 | A1 * | 4/2013 | Dahlberg | A61B 17/1325 606/202 |
| 2013/0237866 | A1 * | 9/2013 | Cohen | A61B 5/742 600/502 |
| 2014/0142615 | A1 * | 5/2014 | Corrigan, Jr. | A61B 17/1325 606/201 |
| 2015/0284597 | A1 * | 10/2015 | Carty | C09J 7/255 206/229 |
| 2016/0206298 | A1 * | 7/2016 | Keene | A61B 17/0057 |
| 2018/0008280 | A1 * | 1/2018 | Clark | A61B 17/132 |
| 2018/0070949 | A1 * | 3/2018 | Karimov | A61B 17/12009 |
| 2019/0150938 | A1 * | 5/2019 | Hazama | A61B 17/135 |
| 2019/0167273 | A1 * | 6/2019 | Morrison | A61B 17/135 |

FOREIGN PATENT DOCUMENTS

| | | | | |
|---|---|---|---|---|
| EP | 1 295 564 | A1 | 3/2003 | |
| EP | 1204391 | B1 * | 10/2004 | ......... A61F 13/0203 |
| FR | 3 070 850 | A1 | 3/2019 | |
| JP | 2003135472 | A | 5/2003 | |
| JP | 2005521464 | A | 7/2005 | |
| JP | 2007-021112 | A | 2/2007 | |
| JP | 2010131296 | A | 6/2010 | |
| JP | 2010530766 | A | 9/2010 | |
| JP | 2011528569 | A | 11/2011 | |
| JP | 3186070 | U | 9/2013 | |
| JP | 2013176557 | A | 9/2013 | |
| JP | 3190161 | B2 | 3/2014 | |
| JP | 3190161 | U | 4/2014 | |
| JP | 2017018155 | A | 1/2017 | |
| JP | 2018011867 | A | 1/2018 | |
| WO | 96/07358 | A1 | 3/1996 | |
| WO | WO-2005023333 | A2 * | 3/2005 | ......... A61B 17/0057 |
| WO | 2017164243 | A1 | 9/2017 | |
| WO | 2019044565 | A1 | 3/2019 | |

OTHER PUBLICATIONS

An English Translation of the International Search Report (Form PCT/ISA/210) and the Written Opinion of the International Searching Authority (Form PCT/ISA/237) issued on Sep. 10, 2019, by the Japanese Patent Office in corresponding International Application No. PCT/JP2019/028550. (12 pages).

Office Action (Communication pursuant to Article 94(3) EPC) issued on Jul. 4, 2024, in corresponding European Patent Application No. 19838845.6. (8 pages).

International Search Report (PCT/ISA/210) with translation and Written Opinion (PCT/ISA/237) mailed on Sep. 10, 2019, by the Japanese Patent Office as the International Searching Authority for International Application No. PCT/JP2019/028550.

Office Action (The First Office Action) issued Jun. 1, 2023, by the National Intellectual Property Administration, P. R. China in corresponding Chinese Patent Application No. 201980036928.6 and an English translation of the Office Action. (14 pages).

Office Action (Notice of Reasons for Refusal) issued Aug. 16, 2022, by the Japan Patent Office in corresponding Japanese Patent Application No. 2020-531396 and an English Translation of the Office Action. (12 pages).

The extended European Search Report issued Jul. 14, 2021, by the European Patent Office in corresponding European Patent Application No. 19838845.6-1122. (10 pages).

* cited by examiner

COMPRESSION DEVICE AND COMPRESSION METHOD

CROSS-REFERENCES TO RELATED APPLICATIONS

This application is a continuation of International Patent Application No. PCT/JP2019/028550 filed on Jul. 19, 2019, which claims priority to Japanese Patent Application No. 2018-137180 filed on Jul. 20, 2018, the entire content of both of which is incorporated herein by reference.

FIELD OF THE INVENTION

The present disclosure generally relates to a compression device and a compression method.

BACKGROUND DISCUSSION

In recent years, in medical institutions, various forms of examinations or treatments are performed using an elongated hollow tubular medical device which is called a catheter. The catheter is percutaneously inserted into a blood vessel from a puncture site, which is formed in the wrist, the inguinal region, or the like, to be delivered to a site to be examined or treated through the blood vessel. After the examination or treatment by a health care worker is completed, the tubular member as the medical device such as the catheter or a sheath used to introduce the catheter is removed from the puncture site, and hemostasis is performed on the puncture site.

Japanese Patent Application Publication No. 2005-521464 discloses a dressing as a compression device that compresses a puncture site after a tubular member is removed. The dressing disclosed in Japanese Patent Application Publication No. 2005-521464 includes an inflatable bladder having a contracted state where a membrane is adjacent to an end wall and an inflated state where the membrane is spaced apart from the end wall. In addition, the dressing disclosed in Japanese Patent Application Publication No. 2005-521464 includes holding means that holds the bladder against the skin of a patient at a position where the puncture site is covered.

SUMMARY

In the dressing as a compression device described in Japanese Patent Application Publication No. 2005-521464, the holding means holds the bladder against the skin as a biological surface of the patient and the bladder is brought into the inflated state, so that the puncture site can be compressed by the bladder.

However, in the dressing described in Japanese Patent Application Publication No. 2005-521464, the direction of compression is a direction substantially orthogonal to the biological surface. When the direction of compression is a direction substantially orthogonal to the biological surface, for example, it may be difficult to narrow or obstruct a perforation that is formed after the tubular member is removed from the puncture site, and so there is room for improvement in hemostasis at the puncture site.

Disclosed here is a compression device that easily performs hemostasis on a puncture site. Also disclosed here is a new compression method.

According to a first aspect of the present disclosure, there is provided a compression device including: a main body portion that is fixable to a biological surface; a compression portion configured to compress the biological surface; a hinge portion that supports the compression portion relative to the main body portion so that the compression portion is rotatable around a rotational axis with respect to the main body portion; and a pressing portion configured to press the compression portion in one rotational direction so that the compression portion rotates in the one rotational direction around the rotational axis. The compression portion is configured to compress the biological surface when the compression portion is rotated around the rotational axis in the one rotational direction as a result of the compression portion being pressed in the one rotational direction by the pressing portion.

As one embodiment of the present disclosure, the compression device is configured to perform hemostasis at a puncture site at which a tubular member punctures the biological surface, and the main body portion includes a receiving portion configured to receive the tubular member, with the receiving portion extending, in a cross-sectional view orthogonal to the rotational axis, in a direction where the compression portion rotates when the pressing portion presses the compression portion to rotate around the rotational axis.

As one embodiment of the present disclosure, the compression portion contacts the biological surface to compress the biological surface, and the compression portion includes an outer surface provided with an anti-slip portion at a position that contacts the biological surface when the compression portion compresses the biological surface.

As one embodiment of the present disclosure, the compression device further includes an angle restriction portion provided on the main body portion to restrict a range of rotation of the compression portion around the rotational axis.

As one embodiment of the present disclosure, the main body portion includes an adhesion sheet that is adherable to the biological surface to fix the main body portion on the biological surface.

As one embodiment of the present disclosure, the main body portion includes a belt that extends in an axial direction along the rotational axis and is configured to be wound around a living body that includes the biological surface.

As one embodiment of the present disclosure, the pressing portion includes an inflatable pressing body that is located between the main body portion and the compression portion, with the inflatable pressing body including an interior configured to receive fluid to inflate the inflatable pressing body and is inflatable by supply of a fluid.

As one embodiment of the present disclosure, wherein the compression portion is comprised of an inflatable compression body having an interior configured to receive fluid to inflate the inflatable compression body that is inflatable by supply of the fluid.

As one embodiment of the present disclosure, the interior of the inflatable pressing body and the interior of the inflatable compression body communicate with each other, and the compression device further comprises a fluid supply tube in communication with the interior of the inflatable pressing body to supply the fluid to the interior of the inflatable pressing body, wherein the fluid supplied from the fluid supply tube is supplied to the interior of the inflatable compression body after passing through the interior of the inflatable pressing body.

As one embodiment of the present disclosure, the main body portion includes an internally threaded through hole, and the pressing portion is an externally threaded elongated member which is threadably engageable with the internally threaded through hole so that a free end of the externally threaded elongated member protrudes from the internally threaded through communication hole to apply a force to the compression portion.

As one embodiment of the present disclosure, the main body portion further includes an extending portion that extends from the belt toward a direction orthogonal to the axial direction to support the compression portion via the hinge portion in an end portion on an opposite side of the extending portion from the belt, and the pressing portion is a band that is mounted on the compression portion to extend from opposite sides of the compression portion in opposite axial directions. When the band is fixed to the belt while the belt is wound around the living body, the band presses the compression portion so that the compression portion maintains a state where the compression portion rotates in the one rotational direction.

As one embodiment of the present disclosure, the compression portion is formed of a plate-shaped member extending along a plane parallel to the rotational axis.

As one embodiment of the present disclosure, the hinge portion is formed of a mechanical hinge interposed between the main body portion and the compression portion.

As one embodiment of the present disclosure, the hinge portion is formed of a material hinge that includes a deformation portion which is flexible, and that is integrally connected to the compression portion.

As one embodiment of the present disclosure, the material hinge is fixed to the main body portion.

As one embodiment of the present disclosure, the compression device further includes an extending portion that extends from the material hinge to be fixed to the main body portion. The material hinge is supported via the extending portion by the main body portion.

According to a second aspect of the present disclosure, there is provided a compression method including: fixing a main body portion to a biological surface, wherein a compression portion is rotatably supported on the main body portion to rotate around a rotational axis, and causing a pressing portion to press the compression portion so that the compression portion rotates around the rotational axis. The compression portion is supported to be rotatable around the rotational axis with respect to the main body portion, and the rotation of the compression portion around the rotational axis compressing the biological surface toward a direction intersecting an extending direction of a perforation that is formed when a tubular member inserted into a vessel from the biological surface through a connective tissue is removed.

According to a third aspect of the present disclosure, there is provided a compression method including: moving a compression device toward a living body that has been punctured by a tubular member so that a portion of the tubular member is positioned inside the living body and a portion of the tubular member is outside the living body. The compression device includes a main body portion that is fixable to a biological surface of the living body, a compression portion configured to compress the biological surface, a hinge portion that rotatably supports the compression portion on the main body portion so that the compression portion is rotatable around a rotational axis, and a pressing portion configured to press the compression portion in one rotational direction so that the compression portion rotates around the rotational axis in the one rotational direction. The method additionally includes positioning the compression device so that a portion of the tubular member that is outside the living body is received in a receiving portion of the main body portion, the portion of the tubular member that is outside the living body, in a cross-sectional view orthogonal to the rotational axis, extending in a direction in which the compression portion rotates when the pressing portion presses the compression portion. In addition, the method involves fixing the main body portion to the biological surface, removing the tubular member from the living body so that an entirety of the tubular member is outside the living body, the removing of the tubular body resulting in a wound hole in the living body; and causing the pressing portion to press the compression portion to cause the compression portion to rotate around the rotational axis and apply a compression force to the biological surface of the living body in a vicinity of the wound hole.

The present disclosure can provide a compression device that easily performs hemostasis on a puncture site. In addition, the present disclosure can provide a new compression method.

DETAILED DESCRIPTION

Figure 1:
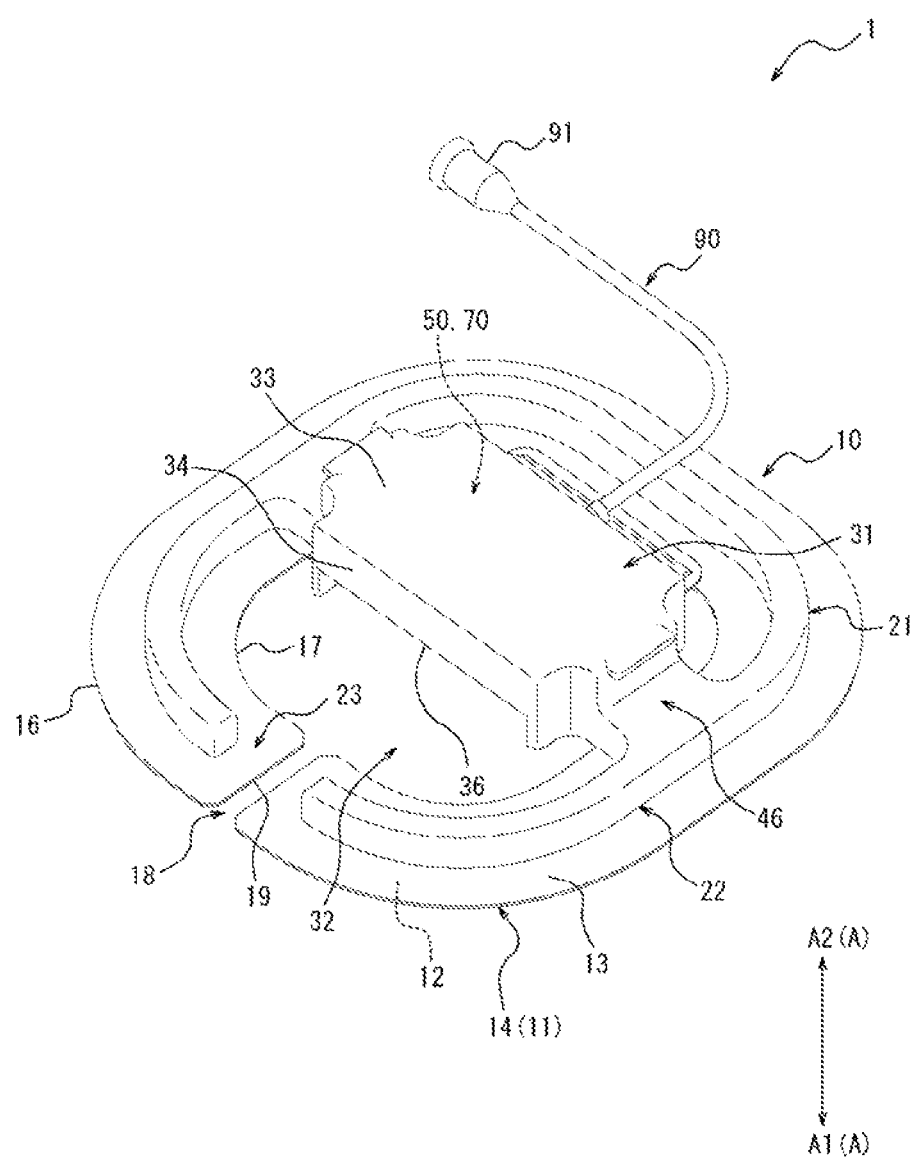
FIG. 1 is a perspective view of a compression device as one embodiment.

Set forth below with reference to the accompanying drawings is a detailed description of embodiments of a compression device and a compression method representing examples of the inventive compression device and a compression method disclosed here. The dimensions or scales on the drawings may be exaggerated or different from actuality/reality for convenience of description and illustration. Components common between the drawings are denoted with the same reference characters.

First Embodiment

Figure 2:
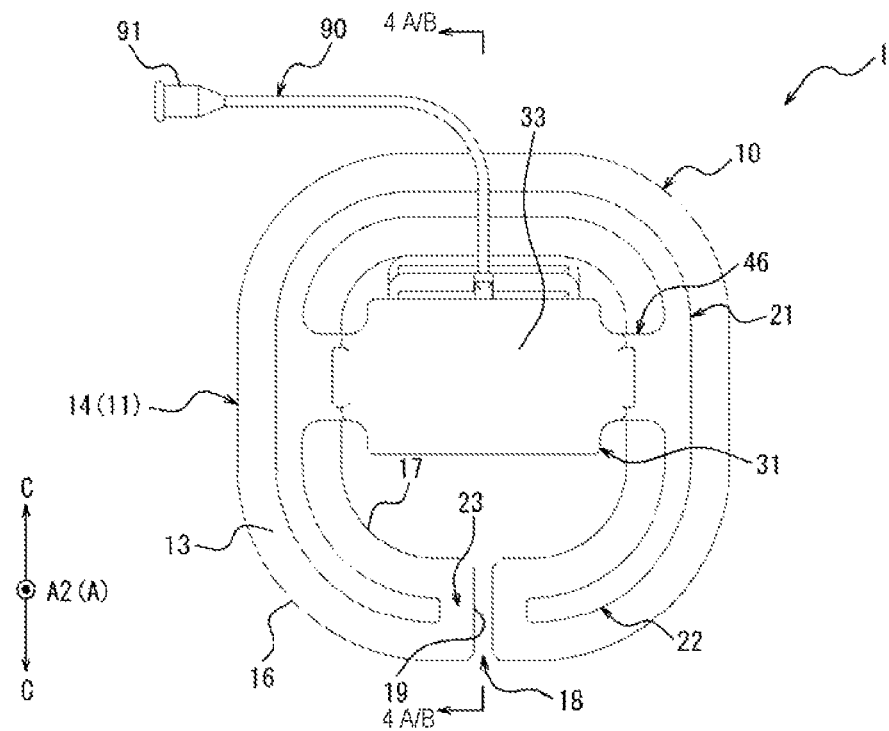
FIG. 2 is a top view of the compression device illustrated in FIG. 1.
Figure 3:
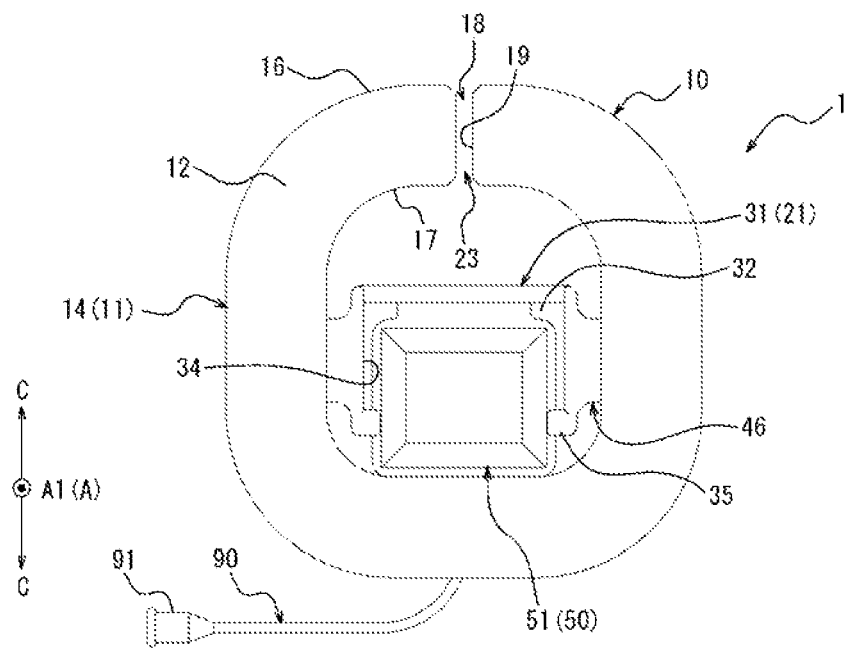
FIG. 3 is a bottom view of the compression device illustrated in FIG. 1.
Figure 4A:
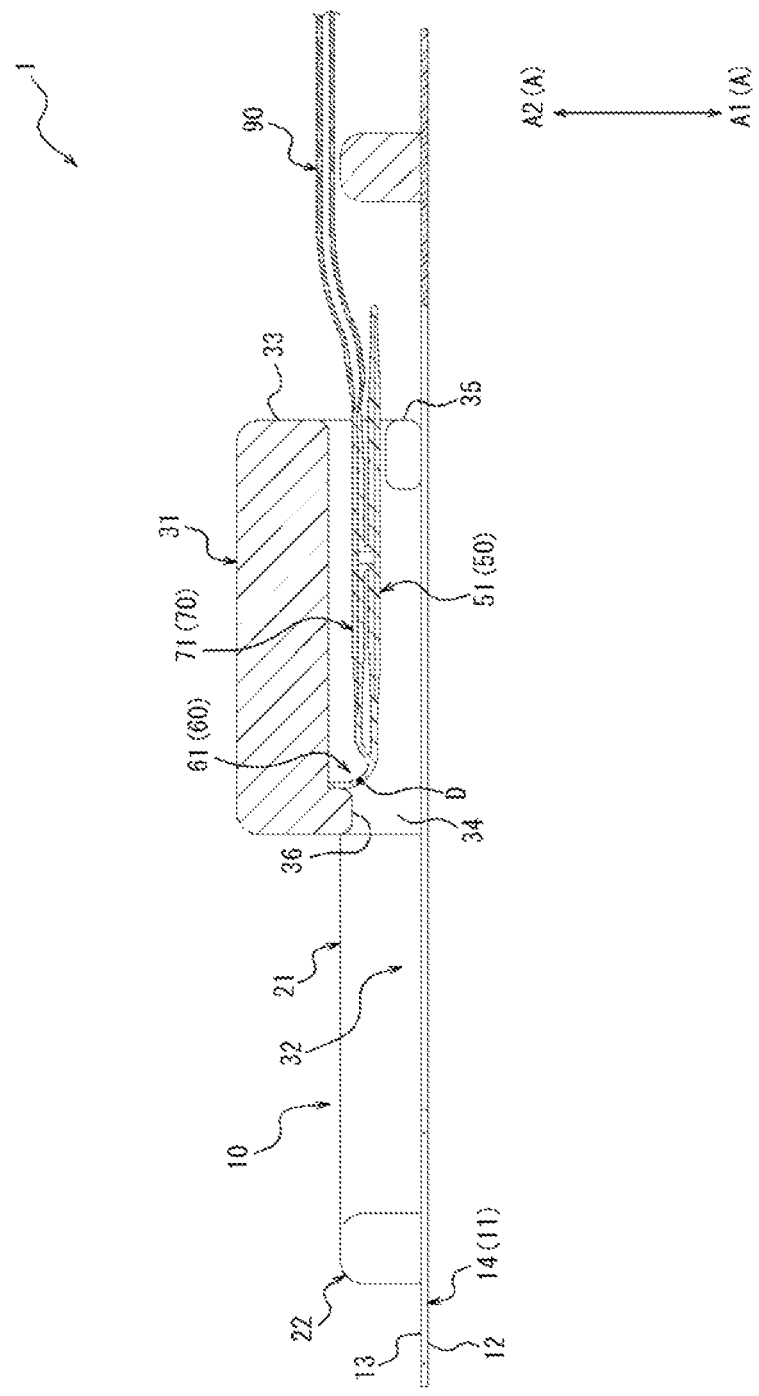
FIG. 4A is a cross-sectional view along the section line 4A/B-4A/B of FIG. 2, and is a view illustrating a state where a compression portion is in a retracted form.
Figure 4B:
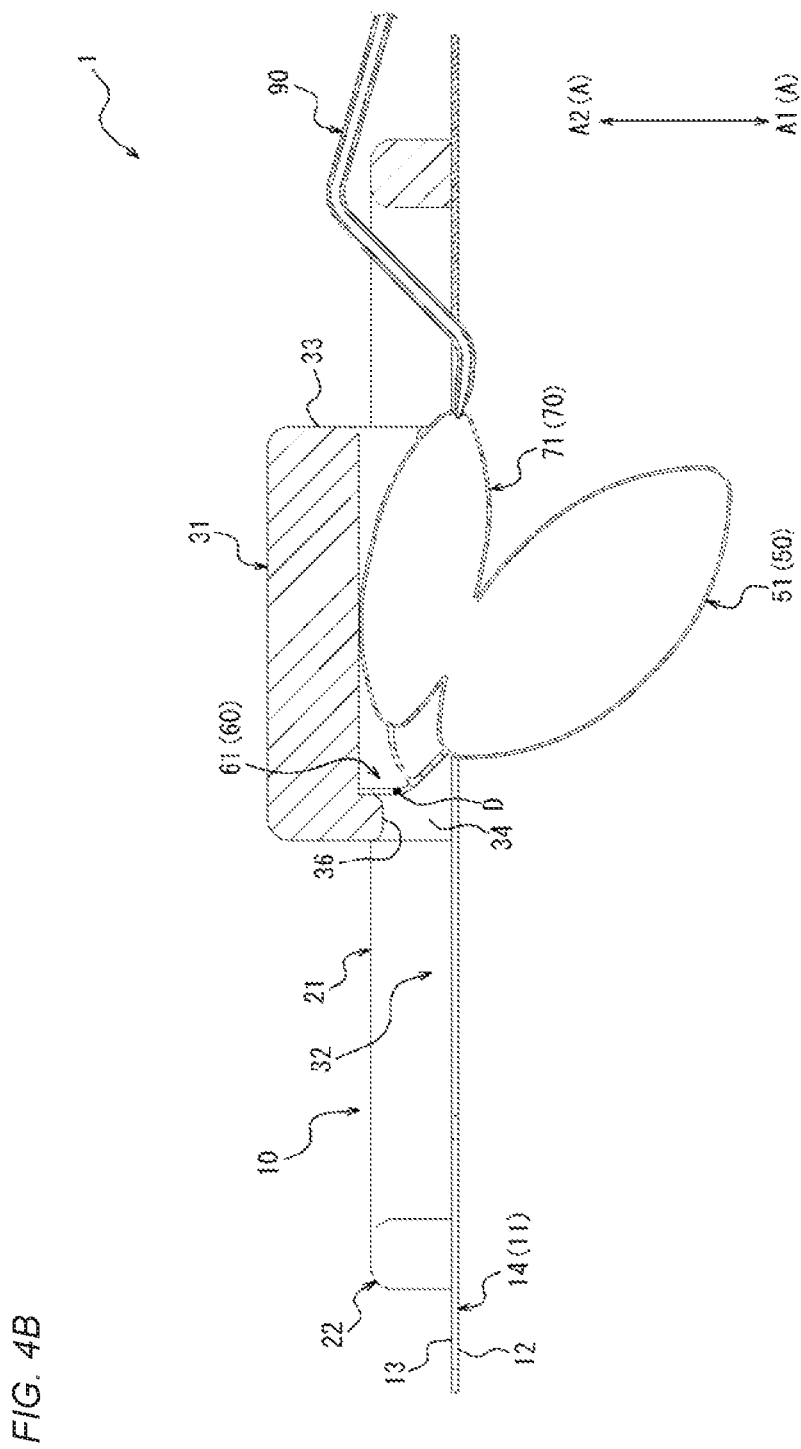
FIG. 4B is a cross-sectional view along the section line 4A/B-4A/B of FIG. 2, and is a view illustrating a state where the compression portion is in a protruding form.

FIGS. 1 to 4B are views of a compression device 1 as a first embodiment. Specifically, FIG. 1 is a perspective view of the compression device 1. FIGS. 2 and 3 are plan views of the compression device 1. Specifically, FIG. 2 is a top view of the compression device 1. FIG. 3 is a bottom view of the compression device 1. FIGS. 4A and 4B are cross-sectional views along the section line of FIG. 2. As will be described in detail later, FIGS. 4A and 4B illustrate different states of the compression device 1.

The compression device 1 includes a main body portion 10, a compression portion 50, a hinge portion 60, and a pressing portion 70.

The main body portion 10 is fixable to a biological surface. The compression portion 50 can compress the biological surface. The hinge portion 60 supports the compression portion 50 so as to be rotatable around a rotational axis D (refer to FIGS. 4A and 4B) with respect to the main body portion 10. Namely, the compression portion 50 rotates around the rotational axis D to be able to compress the biological surface. The pressing portion 70 can press the compression portion 50 in one rotational direction around the rotational axis D. In such a manner, when the main body portion 10 is fixed to the biological surface, the position of the compression device 1 on the biological surface is fixed. In addition, according to the compression device 1, in a state where the position on the biological surface is fixed, the compression portion 50 is pressed in the one rotational direction (right-handed direction in FIGS. 4A and 4B) around the rotational axis D by the pressing portion 70, so that a predetermined site on the biological surface can be compressed by the compression portion 50. Examples of the predetermined site on the biological surface include a wound hole or the vicinity of the wound hole which is formed when a tubular member as a medical device such as a puncture needle, a catheter, or a sheath is inserted into a blood vessel of a living body. Hemostasis can be performed by removing the above-described tubular member from the living body and then compressing the wound hole or the vicinity of the wound hole on the biological surface with the compression portion 50.

Hereinafter, each member and each portion of the compression device 1 are described in detail.

<Main Body Portion 10>

The main body portion 10 is fixable to a biological surface. The main body portion 10 of the present embodiment includes a fixing member 11 that is fixable to the biological surface and a holding member 21 that is mounted on the fixing member 11 to hold the compression portion 50 and the pressing portion 70.

The fixing member 11 includes a lower surface 12 on one side of the fixing member 11 in a thickness direction A and an upper surface 13 on the other side of the fixing member 11 in the thickness direction A. The lower surface 12 of the fixing member 11 forms a fixing surface fixable to the biological surface. Hereinafter, for convenience of description, the one side of the thickness direction A, which is a direction from the upper surface 13 toward the lower surface 12 in the thickness direction A, is simply referred to as a "downward direction A1". In addition, for convenience of description, the other side of the thickness direction A, which is a direction from the lower surface 12 toward the upper surface 13 in the thickness direction A, is simply referred to as an "upward direction A2". Furthermore, among plan views (refer to FIGS. 2 and 3) of the compression device 1 as seen along the thickness direction A of the fixing member 11, for convenience of description, a plan view (refer to FIG. 2) seen from an upper surface 13 side of the fixing member 11 is simply referred to as a "top view". In addition, among the plan views (refer to FIGS. 2 and 3) of the compression device 1 as seen along the thickness direction A of the fixing member 11, for convenience of description, a plan view (refer to FIG. 3) seen from a lower surface 12 side of the fixing member 11 is simply referred to as a "bottom view".

The fixing member 11 of the present embodiment is formed of an adhesion sheet 14 that is adherable to the biological surface. The lower surface 12 of the adhesion sheet 14 forms an adhesion surface as the fixing surface which is fixable to the biological surface by adhesion. The holding member 21 is mounted on the upper surface 13 of the adhesion sheet 14. The adhesion sheet 14 is flexible. For this reason, the adhesion sheet 14 is deformable along the shape of the biological surface. In addition, the lower surface 12 easily follows a deformation of the biological surface (i.e., the adhesion sheet 12 is able to generally conform to or generally follow the shape or contour of the biological surface). As a result, the compression device 1 can be suppressed from unintentionally peeling off from the biological surface.

The adhesion sheet 14 is formed of a plurality of layers including, for example, a base material layer, an adhesion layer, and a surface layer.

The base material layer is made of, for example, a thin resin sheet. More specifically, the base material layer is made of, for example, a white spunlace non-woven fabric made of polyester fibers, and the thickness of the base material layer is in a range of 5 µm to 150 µm, for example, 30 µm. The material of the base material layer is not limited to polyester, and for example, acrylic polymer, polyethylene, ethylene-vinyl acetate copolymer, polyurethane, polyamide derivative, and the like may be used.

The adhesion layer is made of an adhesive such as a rubber adhesive, an acrylic adhesive, or a silicone adhesive. The adhesion layer is laminated on the base material layer directly or indirectly with another layer interposed therebetween. The lower surface 12 of the adhesion sheet 14 of the present embodiment is formed of the adhesion layer.

The surface layer is made of, for example, a resin having a thickness of approximately 5 µm to 50 µm. More specifically, as the material of the surface layer, polyester, polyamide, polyamide-imide, polyethylene, polypropylene, polycarbonate, polyurethane, polyvinyl chloride, fluororesin, and the like can be used. The surface layer is laminated on an opposite side of the base material layer from the adhesion layer with the base material layer interposed therebetween, directly or indirectly with another layer interposed between the surface layer and the base material layer. The upper surface 13 of the adhesion sheet 14 of the present embodiment is formed of the surface layer.

The adhesion sheet 14 is not limited to a three-layer structure including the base material layer, the adhesion layer, and the surface layer, and may have, for example, four or more layers of structure further including other layers. In addition, the adhesion sheet 14 may be formed of only two layers including the base material layer and the adhesion layer.

In such a manner, the adhesion sheet 14 of the present embodiment is made of non-woven tape having one surface to which a pressure sensitive adhesive as an adhesive is applied, but may be made of double-sided tape in which the adhesion layers are provided on both sides of the base material layer. When the adhesion sheet is made of the double-sided tape, a mounting portion 22 (to be described later) of the holding member 21 adheres to one adhesion layer of the adhesion sheet, so that the holding member 21 can be fixed to the adhesion sheet 14.

As illustrated in FIGS. 2 and 3, the adhesion sheet 14 of the present embodiment extends in an annular shape. In other words, the adhesion sheet 14 of the present embodiment defines or includes a central opening region.

In addition, a slit 18 extending from an outer edge 16 to an inner edge 17 is formed in the adhesion sheet 14 of the present embodiment. In a plan view (refer to FIGS. 2 and 3), the slit 18 extends in a radial direction C of a circle centered around the center position of the adhesion sheet 14 (hereinafter, simply referred to as a "radial direction C"). In other words, both end edges 19 of the adhesion sheet 14, the both end edges 19 being opposite to each other with the slit 18 interposed therebetween, extend parallel to each other along the radial direction C. An extending direction of the slit 18 is not limited to the radial direction C, and the slit 18 may extend in a direction that is inclined with respect to the radial direction C. Since the slit 18 is provided, the tubular member such as a catheter or a sheath is movable from outside the adhesion sheet 14 into the central opening region through the slit 18.

In a state before the lower surface 12 is adhered to the biological surface (hereinafter, referred to as a "pre-use state"), the lower surface 12 of the adhesion sheet 14 is covered with a separation sheet 20 (to be described later) (refer to FIG. 6C). When the adhesion sheet 14 is to be adhered to the biological surface, the separation sheet 20 is peeled off and removed from the lower surface 12 by a user. Since the lower surface 12 is exposed due to the removal of the separation sheet 20 from the lower surface 12, the lower surface 12 of the adhesion sheet 14 is adherable to the biological surface. The separation sheet 20 can be made of, for example, separation paper or a resin sheet material. In FIGS. 1 to 4B, the separation sheet 20 is unillustrated.

The holding member 21 of the present embodiment includes the mounting portion 22 that is mounted on the fixing member 11 and a holding main body portion 31 that holds the compression portion 50 and the pressing portion 70. As illustrated in FIG. 2, the mounting portion 22 of the present embodiment extends in an annular shape along the adhesion sheet 14, and is mounted on the upper surface 13 of the adhesion sheet 14. The mounting portion 22 of the present embodiment is thin in the thickness direction A and is deformable to follow (conform to) the adhesion sheet 14.

The mounting portion 22 may not be deformable to follow the adhesion sheet 14. In that case, the mounting portion 22 can further disperse the force applied to the mounting portion 22.

In addition, a gap 23 is formed in the mounting portion 22 of the present embodiment at the same position as the slit 18 of the adhesion sheet 14 in a circumferential direction of the adhesion sheet 14. Therefore, the tubular member such as a catheter or a sheath is movable from outside the adhesion sheet 14 into the central opening region through the slit 18 and the gap 23.

The holding main body portion 31 supports the compression portion 50 via the hinge portion 60 so as to be rotatable around the rotational axis D. The holding main body portion 31 of the present embodiment supports also the pressing portion 70 so as to be rotatable around the rotational axis D. The details will be described later.

In a plan view (refer to FIGS. 2 and 3), the holding main body portion 31 of the present embodiment is located in a portion that does not overlap the adhesion sheet 14. Specifically, the holding main body portion 31 is located in the central opening region defined by the adhesion sheet 14. A region which is closer to a slit 18 side in the central opening region than the holding main body portion 31 forms a receiving portion 32. Namely, the receiving portion 32 is a region that can receive the tubular member such as a catheter or a sheath from outside the adhesion sheet 14 through the slit 18 and the gap 23. In a cross-sectional view orthogonal to the rotational axis D (refer to FIGS. 4A and 4B), the receiving portion 32 is located in a direction where the compression portion 50 rotates when the pressing portion 70 presses the compression portion 50 (on the left side in FIGS. 4A and 4B) with respect to the rotational axis D.

The holding main body portion 31 of the present embodiment defines a recessed portion that accommodates the compression portion 50 and the pressing portion 70. The recessed portion of the holding main body portion 31 is open toward the downward direction A1, and is defined by a bottom portion 33 that is located on an upward direction A2 side and a side wall portion 34 that continues to the bottom portion 33 to surround the compression portion 50 and the pressing portion 70. A temporary fastening portion 35 which protrudes toward the inside of the recessed portion in a direction orthogonal to the thickness direction A to temporarily fasten the compression portion 50 and the pressing portion 70 in the recessed portion is provided in an end portion in the downward direction A1 of the side wall portion 34.

The main body portion 10 of the present embodiment includes a guide portion 36 that guides the position of the tubular member puncturing the biological surface. In a cross-sectional view orthogonal to the rotational axis D (refer to FIGS. 4A and 4B), the guide portion 36 is located in the direction where the compression portion 50 rotates when the pressing portion 70 presses the compression portion 50 with respect to the rotational axis D. In detail, the guide portion 36 can guide the position of the tubular member at a predetermined distance from a position on the biological surface, which is compressed by the compression portion 50. The guide portion 36 of the present embodiment is formed of an end portion on a downward direction A1 side of the side wall portion 34 facing the receiving portion 32 of the holding main body portion 31, and can come into contact with the tubular member received by the receiving portion 32, to guide the tubular member. The guide portion 36 is not limited to such a configuration, and may be a mark that is formed in the holding main body portion 31 by printing or the like. In this case, the holding main body portion 31 is made of a visible light transmitting material, and thus the tubular member can be guided to slip into a downward direction A1 side of the holding main body portion 31 such that the mark and the tubular member are located at the same position in a top view from the eyes of a health care worker or the like.

The holding member 21 of the present embodiment further includes an arm portion 46 that connects the mounting portion 22 and the holding main body portion 31. The arm portion 46 protrudes linearly from an outer wall of the holding main body portion 31 in the direction orthogonal to the thickness direction A to continue to the mounting portion 22 on a downward direction A1 side. A plurality (two in the present embodiment) of the arm portions 46 are provided, and protrude from the outer wall of the holding main body portion 31 toward opposite directions.

Examples of the material of the holding member 21 of the present embodiment include a resin material. Examples of the resin material include thermoplastic resins used in injection molding such as ABS resin, AS resin, polyethylene, polypropylene, polystyrene, polyvinyl chloride, polyvinylidene chloride resin, polyphenylene oxide, thermoplastic polyurethane, polymethylene methacrylate, polyoxyethylene, fluororesin, polycarbonate, polyamide, acetal resin, acrylic resin, and polyethylene terephthalate, and thermosetting resins such as phenol resin, epoxy resin, silicone resin, and unsaturated polyester.

It is preferable that at least the holding main body portion 31 of the holding member 21 is made of an ultrasound transmitting material. In addition, it is preferable that the compression portion 50 and the pressing portion 70 are also made of an ultrasound transmitting material. When an inflatable compression body 51 (to be described later) is used as the compression portion 50, not only the inflatable compression body 51 is made of an ultrasound transmitting material, but also an ultrasound transmitting fluid such as water or gel is used as a fluid to be supplied to the inflatable compression body 51. When an inflatable pressing body 71 (to be described later) is used as the pressing portion 70, not only the inflatable pressing body 71 is made of an ultrasound transmitting material, but also an ultrasound transmitting fluid such as water or gel is used as the fluid to be supplied to the inflatable pressing body 71. In such a manner, an obstructed state of a vessel caused by the compression device 1 can be detected by an ultrasound device. The details will be described later.

<Compression Portion 50 and Hinge Portion 60>

The compression portion 50 can compress the biological surface. The hinge portion 60 supports the compression portion 50 so as to be rotatable around a rotational axis D (refer to FIGS. 4A and 4B) with respect to the main body portion 10. Namely, the compression portion 50 rotates around the rotational axis D to be able to compress the biological surface. The compression portion 50 of the present embodiment is formed of the inflatable compression body 51 that is flexible and inflatable by supply of the fluid. The hinge portion 60 of the present embodiment is formed of a material hinge 61 that includes a deformation portion which is flexible, and that is integrally connected to the inflatable compression body 51. The material hinge 61 is fixed to the holding main body portion 31 of the main body portion 10. In detail, one end on an opposite side of the material hinge 61 from a side where the inflatable compression body 51 is located is joined to the holding main body portion 31 over a predetermined length along a direction perpendicular to the drawing sheets of FIGS. 4A and 4B by fusion or the like. The deformation portion of the material hinge 61 is deformably formed, for example, by making the deformation portion thinner than a portion other than the deformation portion in the material hinge 61. In such a manner, since the material hinge 61 includes the deformation portion that is fixed to the holding main body portion 31 and is deformable, the material hinge 61 supports the inflatable compression body 51 integrally connected to the material hinge 61, so as to be rotatable around the deformation portion. Namely, the deformation portion of the material hinge 61 forms the rotational axis D. The deformation portion of the material hinge 61 may form a part of the material hinge 61, which includes the rotational axis D, or may form the entirety of the material hinge 61.

In a state where the adhesion sheet 14 as the fixing member 11 is fixed to the biological surface by adhesion, the inflatable compression body 51 as the compression portion 50 rotates around the rotational axis D to be deformable in form between the retracted form and the protruding form where the inflatable compression body 51 is located closer to, or moved more in, the downward direction A1 in the thickness direction A than in the retracted form to more strongly compress the biological surface. When in the retracted form, the inflatable compression body 51 of the present embodiment is located closer to, or moved more in, the upward direction A2 in the thickness direction A than the lower surface 12 of the adhesion sheet 14, and when in the protruding form, the inflatable compression body 51 is located closer to the downward direction A1 in the thickness direction A than the lower surface 12 of the adhesion sheet 14. When in the retracted form, the inflatable compression body 51 as the compression portion 50 may be located at the same position as the lower surface 12 of the adhesion sheet 14 in the thickness direction A, or may be located closer to the downward direction A1 than the lower surface 12. FIG. 4A illustrates the retracted form of the inflatable compression body 51. FIG. 4B illustrates the protruding form of the inflatable compression body 51. When the inflatable compression body 51 is changed in form from the retracted form (refer to FIG. 4A) to the protruding form (refer to FIG. 4B), while rotating around the rotational axis D, the inflatable compression body 51 is configured to protrude further toward the downward direction A1 in the thickness direction A than the lower surface 12 of the adhesion sheet 14. Therefore, in a state where the adhesion sheet 14 adheres to the biological surface, the inflatable compression body 51 can press and compress the biological surface in the central opening region. The inflatable compression body 51 will be described in detail later.

<Pressing Portion 70>

The pressing portion 70 can press the compression portion 50 in the one rotational direction around the rotational axis D (refer to FIGS. 4A and 4B). Specifically, in a state where the adhesion sheet 14 as the fixing member 11 is fixed to the biological surface by adhesion, the pressing portion 70 can press the compression portion 50 in a rotational direction around the rotational axis D toward the biological surface (right-handed direction in FIGS. 4A and 4B). The pressing portion 70 of the present embodiment is formed of the inflatable pressing body 71 that is located between the main body portion 10 and the compression portion 50 and is inflatable by supply of the fluid. Specifically, the inflatable pressing body 71 of the present embodiment is located between the bottom portion 33 of the holding main body portion 31 and the inflatable compression body 51. The inflatable pressing body 71 will be described in detail later.

<Inflatable Compression Body 51 and Inflatable Pressing Body 71>

The inflatable compression body 51 and the inflatable pressing body 71 of the present embodiment will be described in detail mainly with reference to FIGS. 4A and 4B. As illustrated in FIGS. 4A and 4B, an internal space defined by the inflatable pressing body 71 communicates with a tube 90 as a fluid supply portion. A fluid such as air is supplied through the tube 90 to the internal space of the inflatable pressing body 71 from a fluid supply device to be connected to an inflation port as a connection portion 91 (refer to FIG. 1 and the like) provided in an end portion of the tube 90. Therefore, the inflatable pressing body 71 can be inflated. The fluid supplied to the internal space of the inflatable pressing body 71 is not limited to gas, and may be liquid.

As illustrated in FIGS. 4A and 4B, the internal space defined by the inflatable pressing body 71 and an internal space defined by the inflatable compression body 51 communicate with each other. For this reason, the fluid supplied from the tube 90 as a fluid supply portion is supplied to the internal space of the inflatable compression body 51 through the internal space of the inflatable pressing body 71. Therefore, the inflatable pressing body 71 can be inflated and the inflatable compression body 51 can be inflated. The internal space defined by the inflatable compression body 51 may directly communicate with the tube 90 as a fluid supply portion. Specifically, the tube 90 may include a branch portion having, for example, a Y shape which branches in three directions, and include the connection portion 91 (refer to FIG. 1 and the like) in a first end portion thereof, and may communicate with the internal space, which is defined by the inflatable pressing body 71, through a second end portion thereof and communicate with the internal space, which is defined by the inflatable compression body 51, through a third end portion thereof. In that case, the internal space defined by the inflatable pressing body 71 and the internal space defined by the inflatable compression body 51 may not directly communicate with each other.

When the fluid is supplied from the tube 90, the inflatable pressing body 71 and the inflatable compression body 51 are inflated. The inflation of an upward direction A2 side of the inflatable pressing body 71 is restricted by the bottom portion 33. In addition, the inflation of the inflatable pressing body 71 is restricted by the side wall portion 34 that is located around the direction orthogonal to the thickness direction A. Namely, since the inflatable pressing body 71 is restricted by the bottom portion 33 and the side wall portion 34 of the recessed portion, the inflatable pressing body 71 is inflated to protrude toward the downward direction A1 side.

When the inflatable pressing body 71 is inflated to protrude toward the downward direction A1 side, the inflatable compression body 51 located on a downward direction A1 side of the inflatable pressing body 71 is pressed to the downward direction A1 side by the inflatable pressing body 71. Since the inflatable compression body 51 is supported to be rotatable around the rotational axis D by the hinge portion 60, in the cross-sectional views orthogonal to the rotational axis D illustrated in FIGS. 4A and 4B, the inflatable compression body 51 rotates in the right-handed direction around the rotational axis D. In addition, the inflation of an upward direction A2 side of the inflatable compression body 51 is restricted by the inflatable pressing body 71, and is restricted by the side wall portion 34 located around the direction orthogonal to the thickness direction A. Namely, the inflatable compression body 51 is inflated while rotating, so as to protrude in the right-handed direction around the rotational axis D. For this reason, in a state where the adhesion sheet 14 as the fixing member 11 is fixed to the biological surface by adhesion, the inflatable compression body 51 can press and compress the biological surface toward the right-handed direction around the rotational axis D. In addition, since the inflatable compression body 51 is inflated while following the shape of the biological surface, damage to the living body can be suppressed.

The inflatable compression body 51 as the compression portion 50 may include an anti-slip portion at a position where the inflatable compression body 51 comes into contact with the biological surface. The anti-slip portion may be formed by using a non-slip material as the forming material of the inflatable compression body 51 in its entirety, or may be formed by forming a part of a surface on the downward direction A1 side of the inflatable compression body 51 as a non-slip member. With such a configuration, the biological surface with which the inflatable compression body 51 as the compression portion 50 is in contact can be compressed to be pressed toward the rotational direction. One example of the anti-slip portion will be described later (refer to FIGS. 10A and 10B).

In the present embodiment, the size of the inflatable compression body 51 in an inflated state is larger than the size of the inflatable pressing body 71 in an inflated state; however, the size of the inflatable compression body 51 in an inflated state may be smaller than the size of the inflatable pressing body 71 in an inflated state. With such a configuration, the area of the biological surface which is compressed by the inflatable compression body 51 can be further reduced, and thus the compression pressure is more easily increased. The size of the inflatable compression body 51 in an inflated state may be equal to the size of the inflatable pressing body 71 in an inflated state. With such a configuration, the inflatable compression body 51 and the inflatable pressing body 71 can be made of the same member, and thus the types of members required to produce the compression device 1 can be reduced.

The inflatable compression body 51 and the inflatable pressing body 71 may be balloons that are inflated by gas such as air. As the forming material of the inflatable compression body 51 and the inflatable pressing body 71, for example, a flexible material such as soft polyvinyl chloride, polyurethane, polyethylene, polypropylene, polyester, ethylene-vinyl acetate copolymer (EVA), silicone, or a mixture of any of these materials can be used.

<Compression Method Performed Using Compression Device 1>

Figure 5:
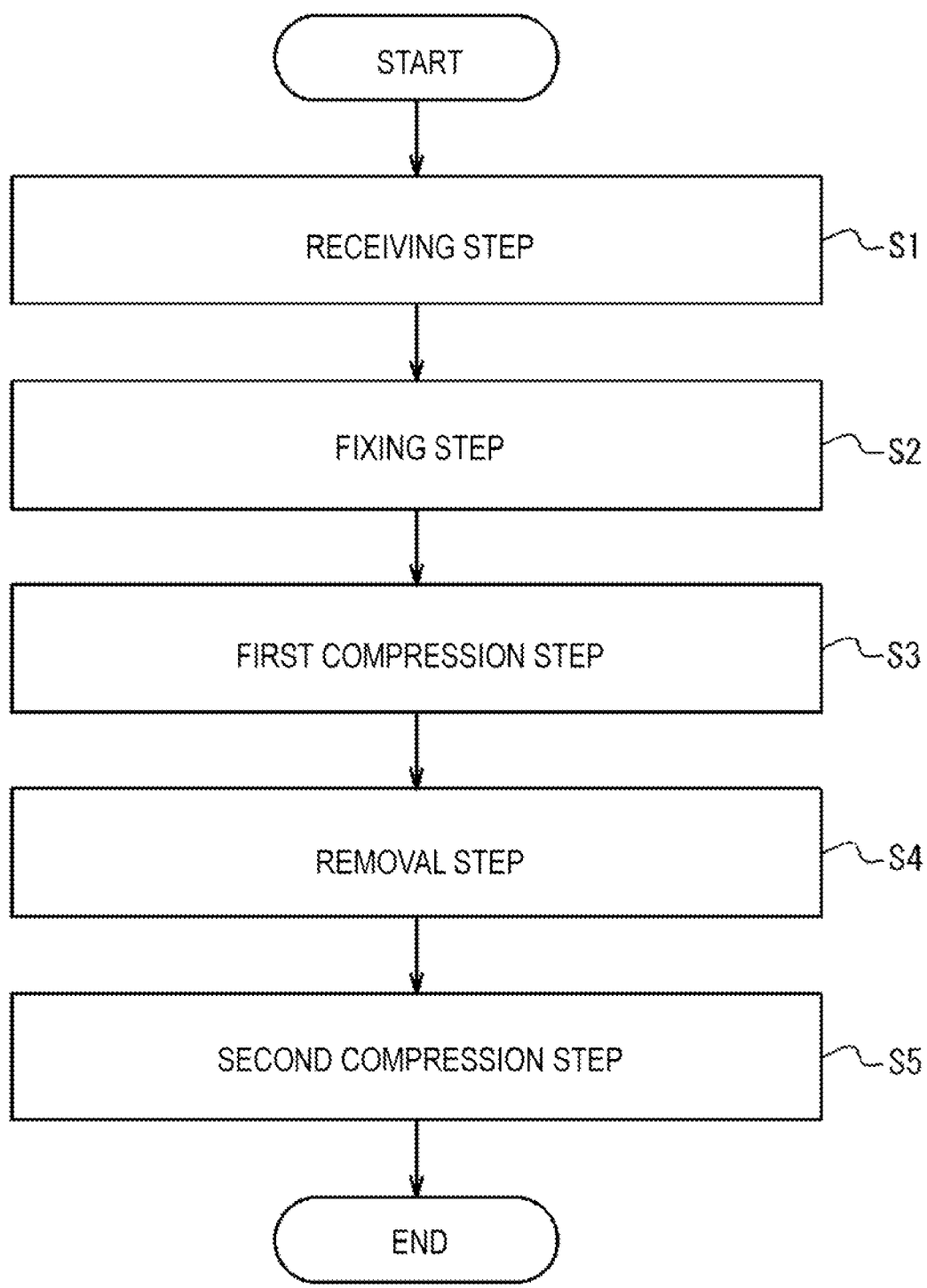
FIG. 5 is a flowchart illustrating a compression method as one embodiment.
Figure 6A:
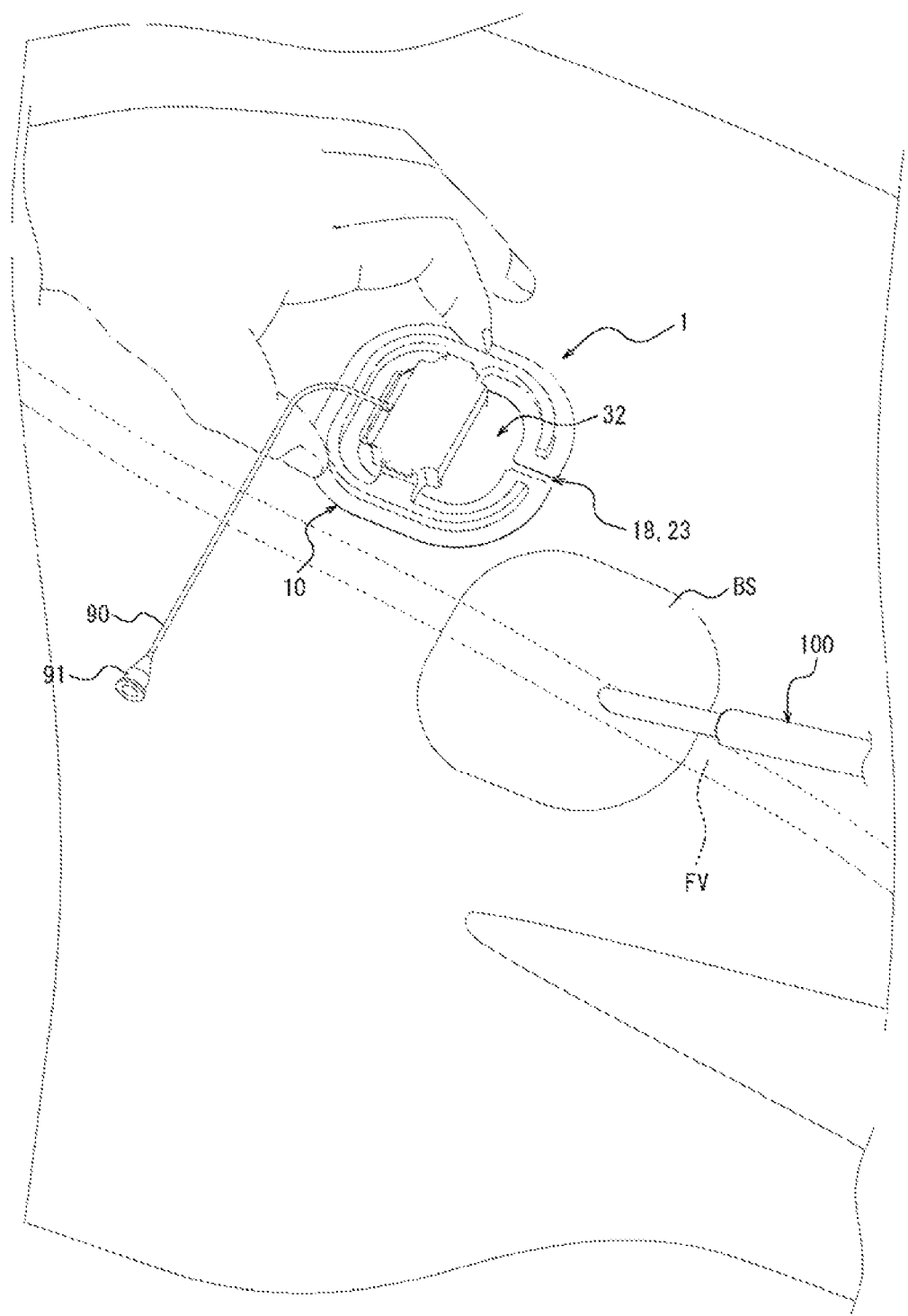
FIG. 6A is a view illustrating an outline of a receiving step of FIG. 5.
Figure 6B:
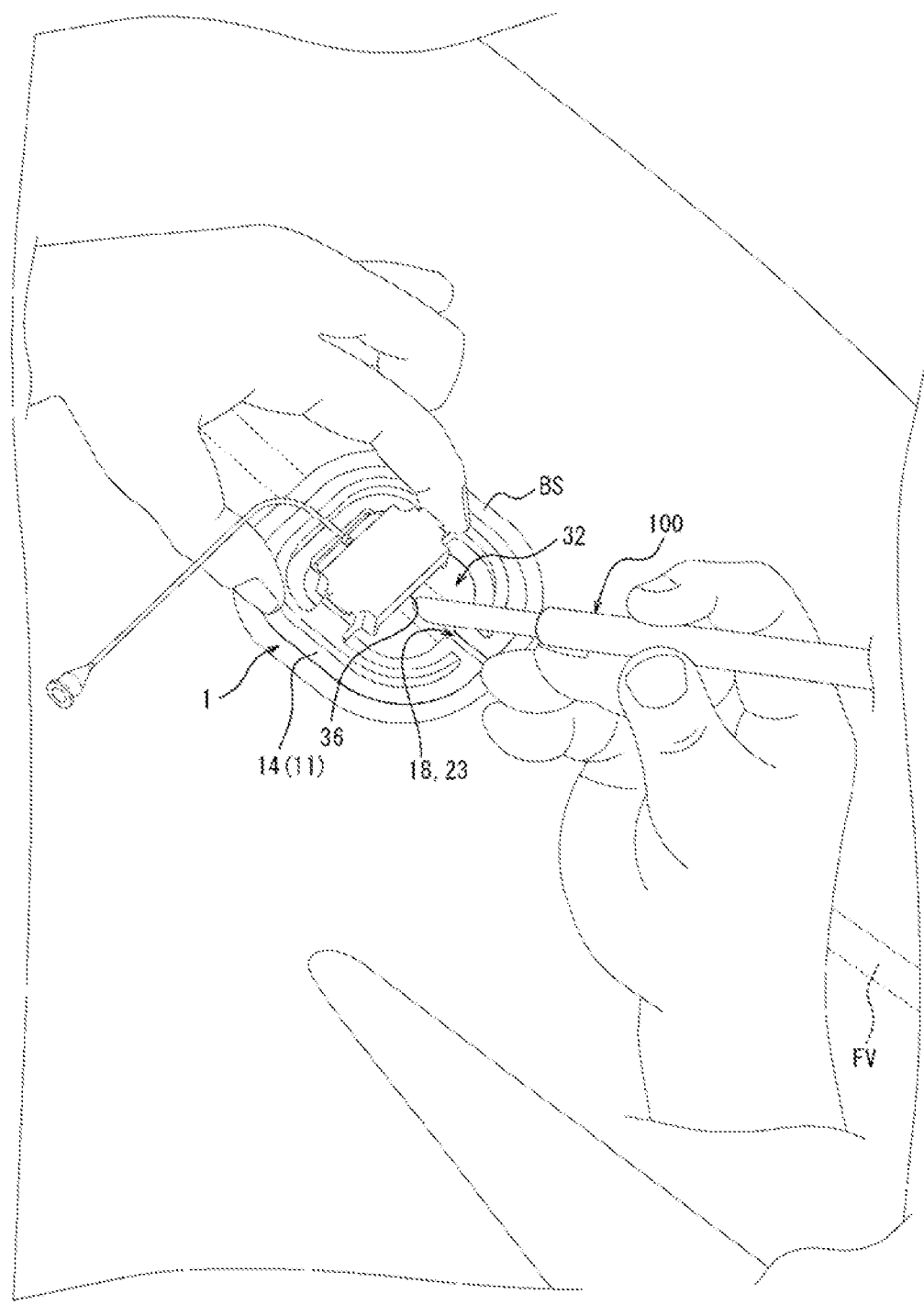
FIG. 6B is a view illustrating an outline of the receiving step of FIG. 5.

Next, a method for compressing a biological surface which is performed using the compression device 1 will be described. FIG. 5 is a flowchart illustrating one example of the method for compressing a biological surface. The compression method illustrated in FIG. 5 includes a receiving step S1, a fixing step S2, a first compression step S3, a removal step S4, and a second compression step S5. FIGS. 6A and 6B are views illustrating an outline of the receiving step S1. FIGS. 6C and 6D are views illustrating an outline of the fixing step S2. FIG. 6E is a view illustrating an outline of the first compression step S3. FIG. 6F is a view illustrating an outline of the removal step S4. FIG. 6G is a view illustrating an outline of the second compression step S5.

The compression method illustrated in FIGS. 5 and 6A to 6G is a compression method by which a biological surface BS is compressed to narrow or obstruct a perforation, which is formed when the tubular member as a medical device 100 that is inserted into a vessel, for example, a vein such as a femoral vein from the biological surface BS through a connective tissue is removed, without obstructing the vein. Therefore, after the tubular member as the medical device 100 is removed, hemostasis can be performed. First, the perforation formed after the medical device 100 is removed will be described with reference to FIGS. 7A and 7B. FIG. 7A illustrates a state where the tubular members as the medical devices 100 are inserted into a femoral vein FV from the biological surface BS through a connective tissue CT. FIG. 7A illustrates three tubular members as the medical devices 100; however, two or less tubular members may be used or four or more tubular members may be used. FIG. 7B illustrates a state after the tubular members as the medical devices 100 are removed from the state illustrated in FIG. 7A. As illustrated in FIG. 7B, when the tubular members as the medical devices 100 are removed, a perforation P is formed or exists between the biological surface BS and the femoral vein FV. In the compression method illustrated in FIGS. 5 and 6A to 6G, the perforation P can be narrowed or obstructed without obstructing the femoral vein FV. For this reason, even when hemostasis is performed for bleeding from the vein at a deep position from the biological surface, hemostasis can be more efficiently performed without the need to narrow or obstruct the vein itself. Hereinafter, steps S1 to S5 will be described in detail with reference to FIGS. 6A to 6G.

FIG. 6A illustrates a state where the tubular member as the medical device 100 is inserted into the femoral vein FV (refer to FIGS. 7A and 7B) from the biological surface BS. First, in this state, the compression device 1 is mounted on the biological surface BS. Before the compression device 1 is mounted on the biological surface BS, the compression device 1 is disposed close to a patient.

FIG. 6B illustrates a state where the position of the tubular member as the medical device 100 is received at the receiving portion 32. As illustrated in FIG. 6B, a portion of the medical device 100, the portion extending outside the living body, is moved from outside the adhesion sheet 14 into the receiving portion 32 through the slit 18 and the gap 23. Therefore, the fixing position of the compression device 1 on the biological surface BS can be specified in the range of the receiving portion 32 where the portion of the medical device 100, the portion extending outside the living body, is located. After the portion of the medical device 100, the portion extending outside the living body, is moved to the receiving portion 32, the medical device 100 may be guided by the guide portion 36. Specifically, in a state where the guide portion 36 is in contact with the tubular member as the medical device 100, the compression device 1 is moved to a biological surface BS side while the guide portion 36 is slid on the surface of the tubular member, so that the compression device 1 can be guided to the fixing position on the biological surface BS.

Figure 6C:
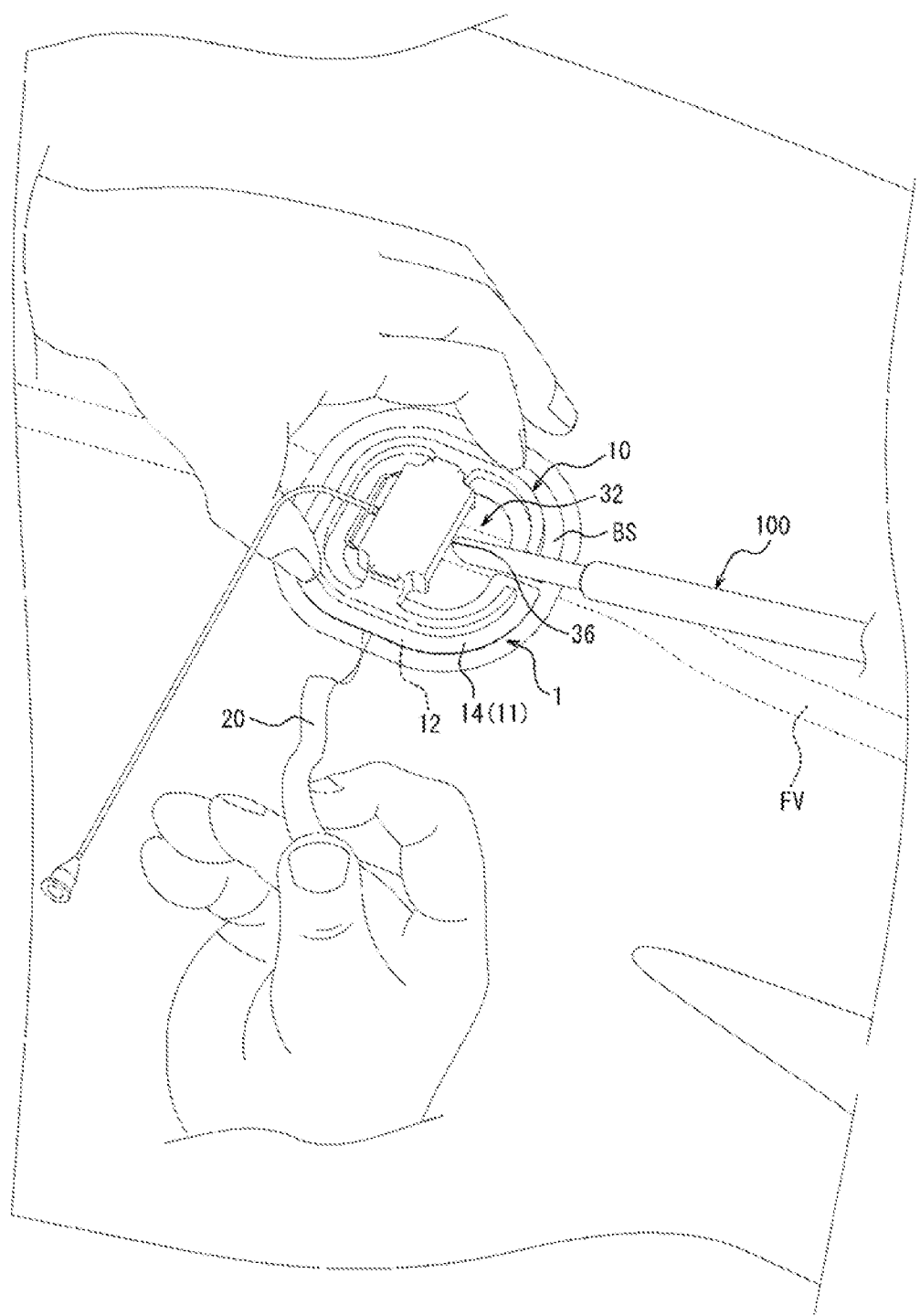
FIG. 6C is a view illustrating an outline of a fixing step of FIG. 5.
Figure 6D:
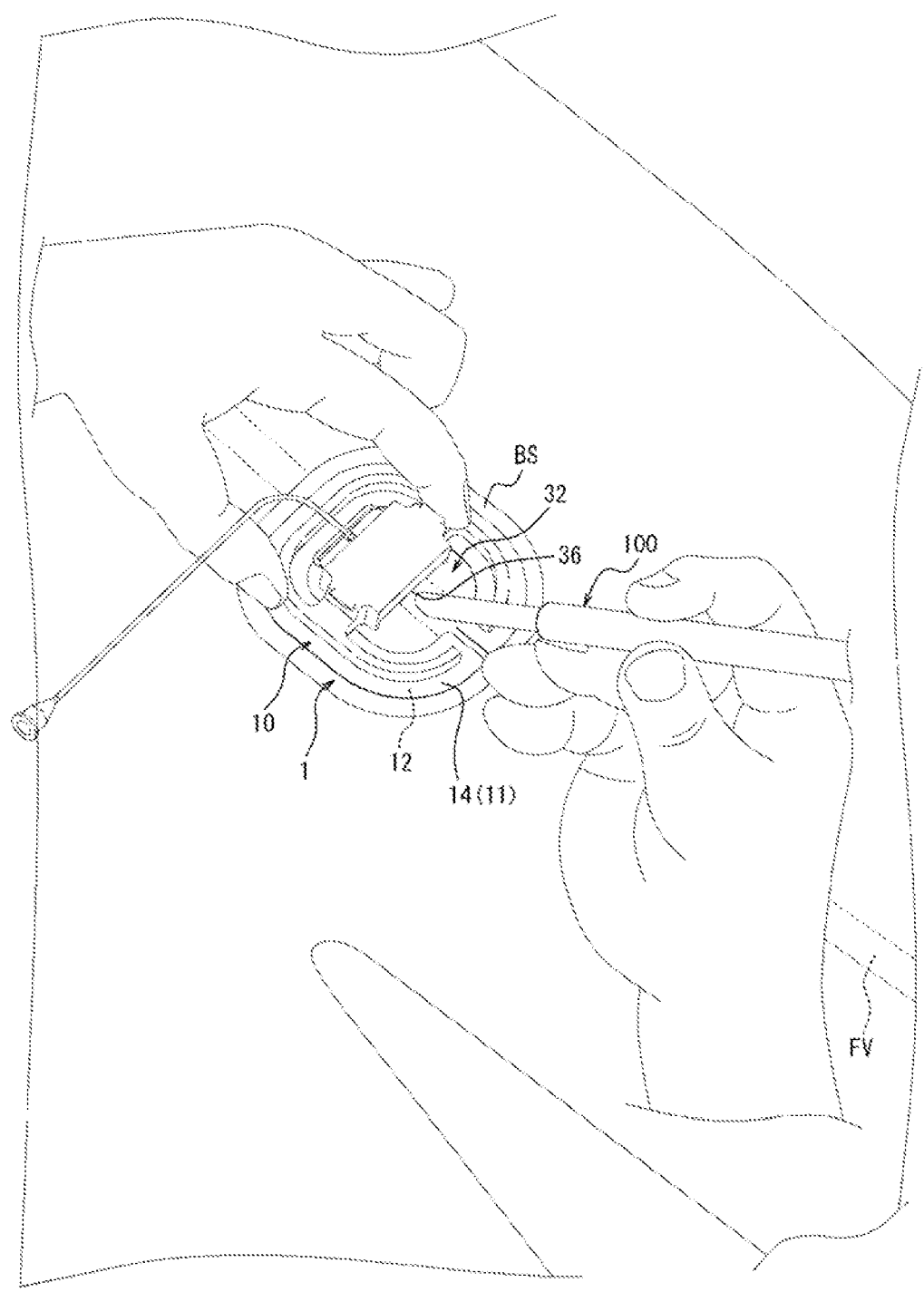
FIG. 6D is a view illustrating an outline of the fixing step of FIG. 5.
Figure 6E:
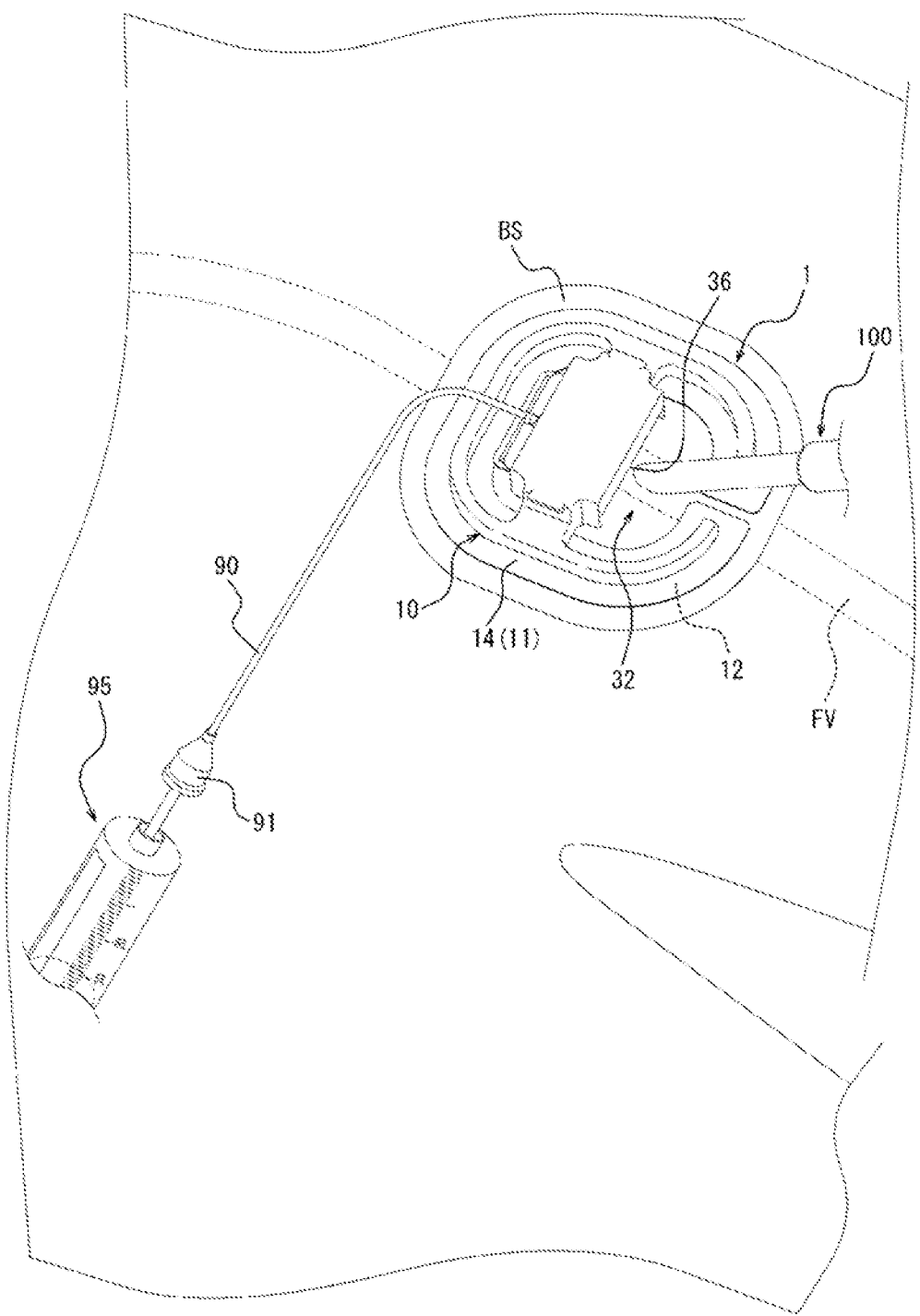
FIG. 6E is a view illustrating an outline of a first compression step of FIG. 5.
Figure 6F:
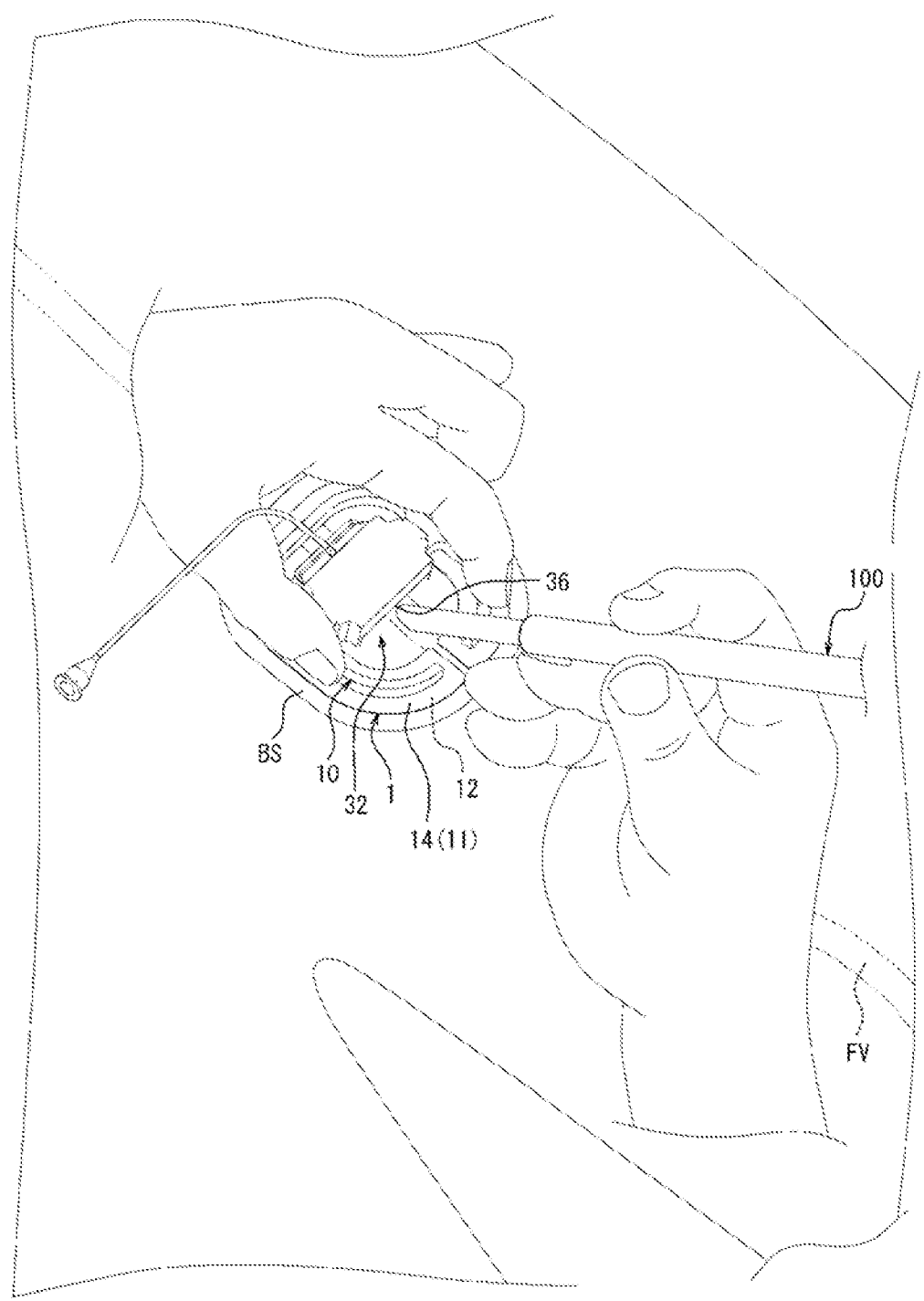
FIG. 6F is a view illustrating an outline of a removal step of FIG. 5.
Figure 6G:
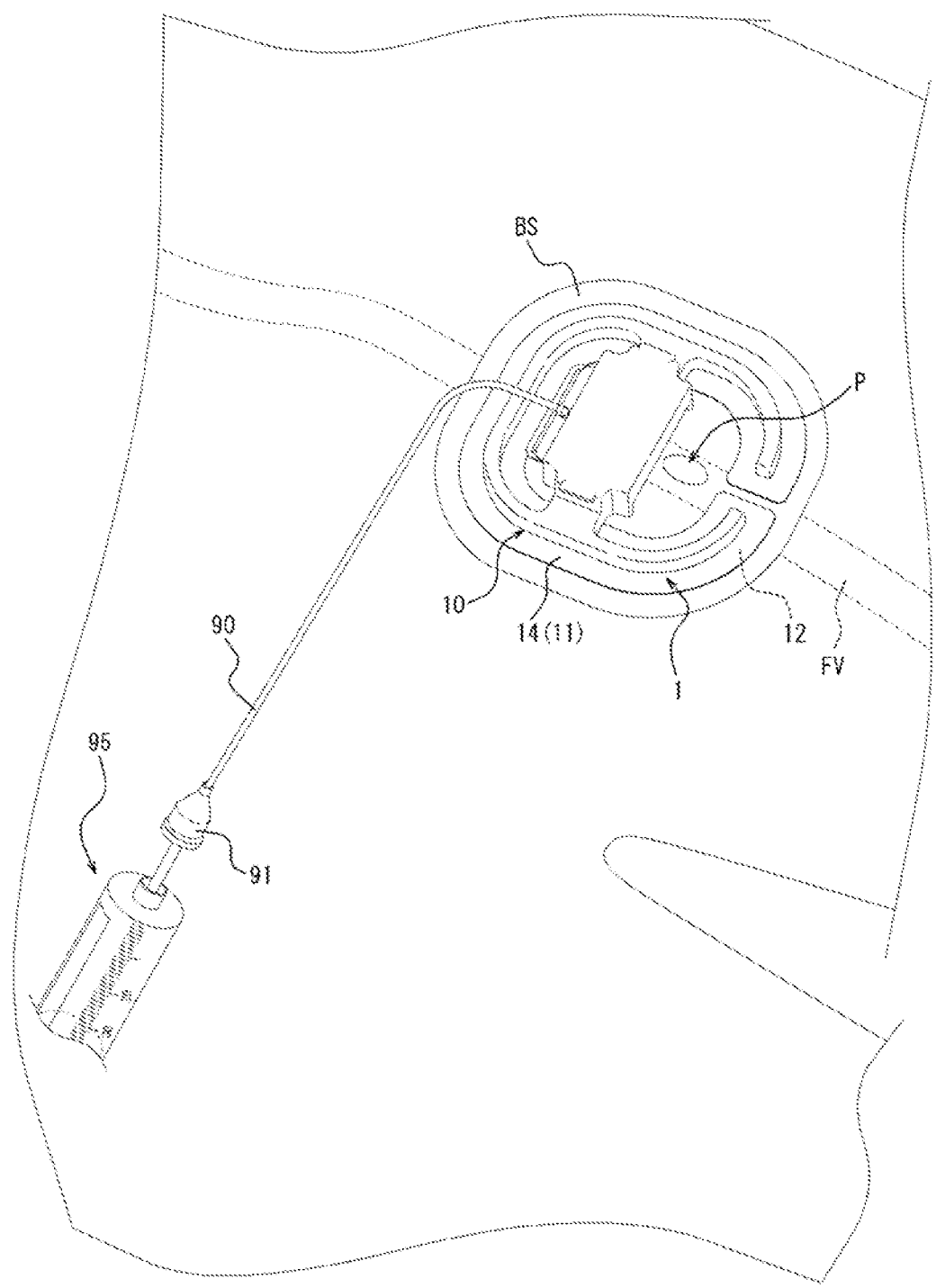
FIG. 6G is a view illustrating an outline of a second compression step of FIG. 5.
Figure 7A:
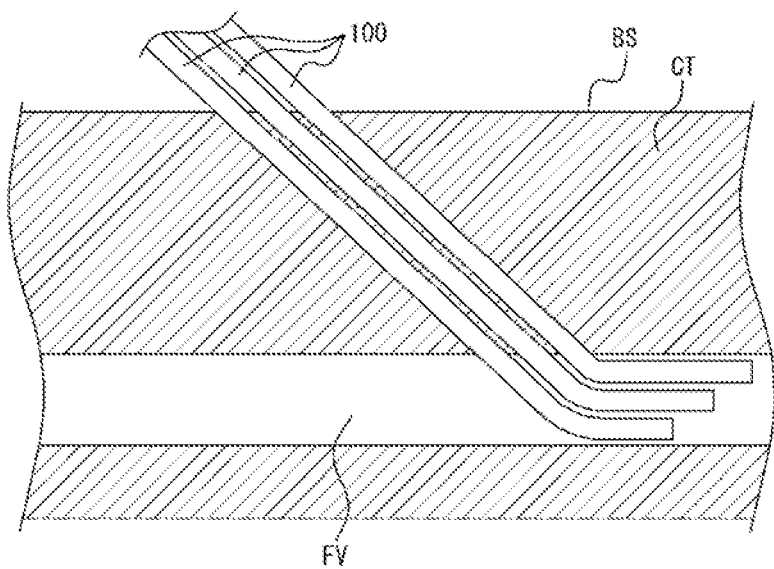
FIG. 7A is a view illustrating a state where medical devices are inserted into a femoral vein from a biological surface through a connective tissue.
Figure 7B:
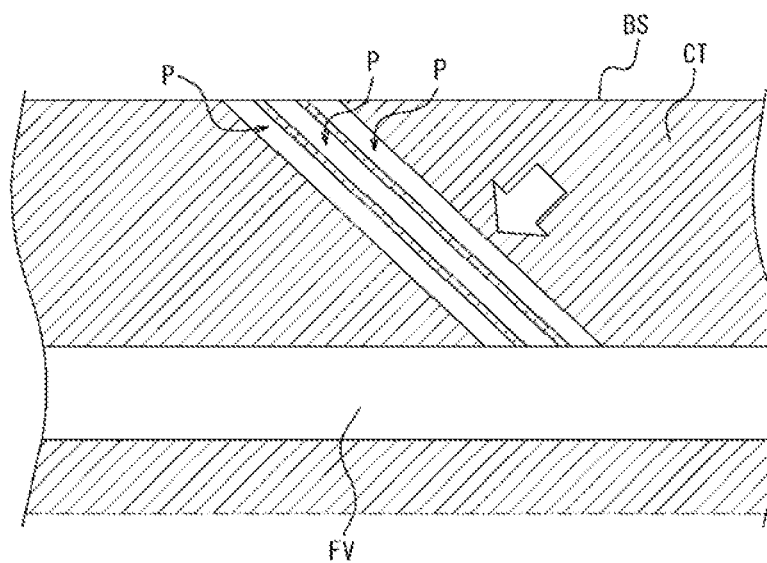
FIG. 7B is a view illustrating a state after the medical devices are removed from the state illustrated in FIG. 7A.

As illustrated in FIG. 6C, after the fixing position of the compression device 1 on the biological surface BS is determined, the separation sheet 20 laminated on the lower surface 12 of the adhesion sheet 14 is peeled off, so that the lower surface 12 is exposed. Thereafter, as illustrated in FIG. 6D, the lower surface 12 of the adhesion sheet 14 adheres to the position determined in FIG. 6B, so that the main body portion 10 of the compression device 1 is fixed to the biological surface BS.

Next, as illustrated in FIG. 6E, a syringe 95 as a fluid supply device is connected to the connection portion 91 of the tube 90. Air is supplied to the inflatable pressing body 71 (refer to FIGS. 4A and 4B) and the inflatable compression body 51 (refer to FIGS. 4A and 4B) of the compression device 1 through the tube 90 to inflate the inflatable pressing body 71 and the inflatable compression body 51. In such a manner, before the tubular member as the medical device 100 is removed from the biological surface BS, the vicinity of a wound hole of the biological surface BS can be compressed in advance. In other words, in a state where the tubular member as the medical device 100 is inserted into the femoral vein FV as a vessel from the biological surface BS through the connective tissue CT (refer to FIGS. 7A and 7B), the compression of the biological surface BS is started. In such a manner, since compression is performed before the medical device 100 is removed from the biological surface BS, immediately after the tubular member as the medical device 100 is removed, the biological surface BS can be compressed such that the perforation P (refer to FIG. 7B) that extends from the biological surface BS to the femoral vein FV (refer to FIGS. 7A and 7B) is narrowed or obstructed.

Next, as illustrated in FIG. 6F, the tubular member as the medical device 100 is removed from the biological surface BS. More specifically, the tubular member as the medical device 100 of the present embodiment is removed to outside the living body through the receiving portion 32. The perforation P illustrated in FIG. 7B is formed by the removal of the tubular member. If the biological surface BS is not compressed at all in this state, there occurs bleeding outside the living body from the femoral vein FV through the perforation P and the wound hole on the biological surface BS. However, in the compression method illustrated here, as illustrated in FIG. 6E, before the tubular member as the medical device 100 is removed from the biological surface BS, the biological surface BS is compressed in advance. For this reason, immediately after the tubular member is removed, the biological surface BS can be compressed such that the perforation P (refer to FIG. 7B) is narrowed or obstructed, and the amount of bleeding immediately after the removal of the tubular member can be suppressed.

Next, as illustrated in FIG. 6G, the syringe 95 as a fluid supply device is connected again to the connection portion 91 of the tube 90. Air is supplied again to the inflatable pressing body 71 (refer to FIGS. 4A and 4B) and the inflatable compression body 51 (refer to FIGS. 4A and 4B) of the compression device 1 through the tube 90 to apply pressure, or air is removed to reduce pressure. In other words, after the tubular member as the medical device 100 is removed, the compression force on the biological surface BS is adjusted. Therefore, the compression force on the biological surface BS is adjusted to further narrow or obstruct the perforation P (refer to FIG. 7B) without obstructing the femoral vein FV (refer to FIGS. 7A and 7B), and thus the amount of bleeding can be greatly reduced, or bleeding can be stopped.

More specifically, when bleeding is confirmed after the tubular member is removed, the compression force is gradually increased to apply pressure until hemostasis is achieved. On the other hand, when hemostasis is confirmed after the tubular member is removed, the compression force is gradually decreased to reduce pressure until bleeding is confirmed. Then, after bleeding is confirmed, the compression force is gradually increased to apply pressure until hemostasis is achieved. In such a manner, the obstruction of the femoral vein FV (refer to FIGS. 7A and 7B) by overpressurization can be prevented.

In addition, since the inflatable compression body 51 rotates in the right-handed direction around the rotational axis D to compress the biological surface BS on the right side of the perforation P in FIG. 7B (refer to a white arrow in FIG. 7B), the biological surface BS can be compressed toward a direction intersecting an extending direction of the perforation P. Therefore, the perforation P can be narrowed or obstructed by a smaller pressure than when the direction of compression is a direction substantially orthogonal to the biological surface BS.

In addition, whether or not the biological surface BS is properly compressed may be detected by using the ultrasound device. Specifically, since the holding main body portion 31, the inflatable compression body 51, and the inflatable pressing body 71 (refer to FIGS. 4A and 4B) are made of an ultrasound transmitting material and an ultrasound transmitting fluid such as water is supplied to the inflatable compression body 51 and the inflatable pressing body 71, a compressed state obtained by the compression device 1 can be diagnosed by ultrasound waves. Namely, the ultrasound device can detect whether or not the femoral vein FV (refer to FIGS. 7A and 7B) is obstructed. The compression force of the compression device 1 may be adjusted according to a result of diagnosis by the ultrasound device.

The compressed state is maintained for several hours (for example, 2 to 6 hours) as it is, so that hemostasis can be completed. After hemostasis is completed, the lower surface 12 of the adhesion sheet 14 is peeled off from the biological surface BS to remove the compression device 1 from the biological surface BS.

In the compression method illustrated here, the perforation P (refer to FIG. 7B) is narrowed or obstructed without obstructing the femoral vein FV (refer to FIGS. 7A and 7B). In the case of hemostasis at a vein, hemostasis can be performed by narrowing or obstructing the perforation P (refer to FIG. 7B). On the other hand, for example, in the case of hemostasis at a femoral artery, even if only the perforation is obstructed, the blood leaks to spread in the connective tissue CT (refer to FIGS. 7A and 7B), so that hemostasis cannot be achieved. In the case of hemostasis at the femoral artery, large-scale measures such as a method for applying strong compression to the extent that the artery itself is narrowed or obstructed and a method for closing a hole in an artery wall are required.

Therefore, in the above-described compression method, it is preferable that the biological surface BS is compressed to a position where the compression depth from the biological surface BS is 5 mm to 20 mm. When the compression depth is in the above range, a compressed state where the perforation P (refer to FIG. 7B) is narrowed or obstructed without obstructing the vein is easily realized. The compression depth is more preferably 5 mm to 15 mm and further preferably 8 mm to 12 mm. Since the inflatable compression body 51 of the present embodiment compresses the biological surface BS in the rotational direction around the rotational axis D, control is more easily performed to not make the compression depth too deep than when the biological surface BS is compressed in the direction substantially orthogonal to the biological surface BS.

Furthermore, in the above-described compression method, it is preferable that the biological surface BS is compressed at 100 g/cm2 to 400 g/cm2 from the biological surface BS. The compression pressure is a pressure after the tubular member as the medical device 100 is removed, and does not mean the above-described compression force before the tubular member is removed. When the compression pressure is in the above range, a compressed state where the perforation P (refer to FIG. 7B) is narrowed or obstructed without obstructing the vein is easily realized. The compression pressure is more preferably 200 g/cm2 to 400 g/cm2 and further preferably 200 g/cm2 to 300 g/cm2.

According to the compression method illustrated in FIGS. 5 and 6A to 6G, hemostasis can be performed by narrowing or obstructing the perforation P (refer to FIG. 7B) without obstructing the vein such as the femoral vein FV. Particularly, since the above-described compression method is realized by the compression device 1, compression by the hand of a health care worker or the use of a large-scale hemostatic device is not required, and hemostasis can be performed by a simple method. Furthermore, as illustrated in FIG. 7B, even when a plurality of the perforations P are collectively formed, the plurality of perforations P can be collectively narrowed or obstructed.

Second Embodiment

Next, a compression device 101 as a second embodiment will be described with reference to FIGS. 8 to 10B. The description below will mainly focus on differences in this second embodiment relative to the compression device 1 (refer to FIG. 1 and the like) described above, and features that are the same or similar to those described above are identified by the same reference numerals and a detailed description of such features is not repeated.

Figure 8:
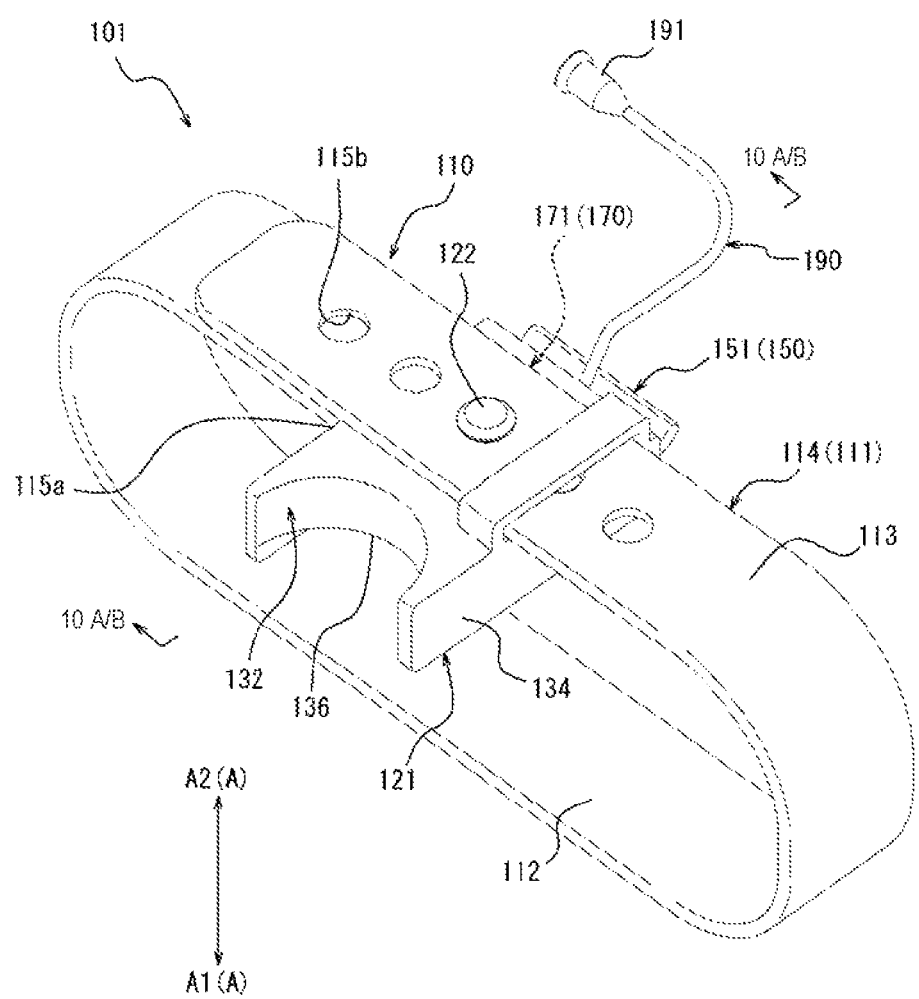
FIG. 8 is a perspective view of a compression device as one embodiment.
Figure 9:
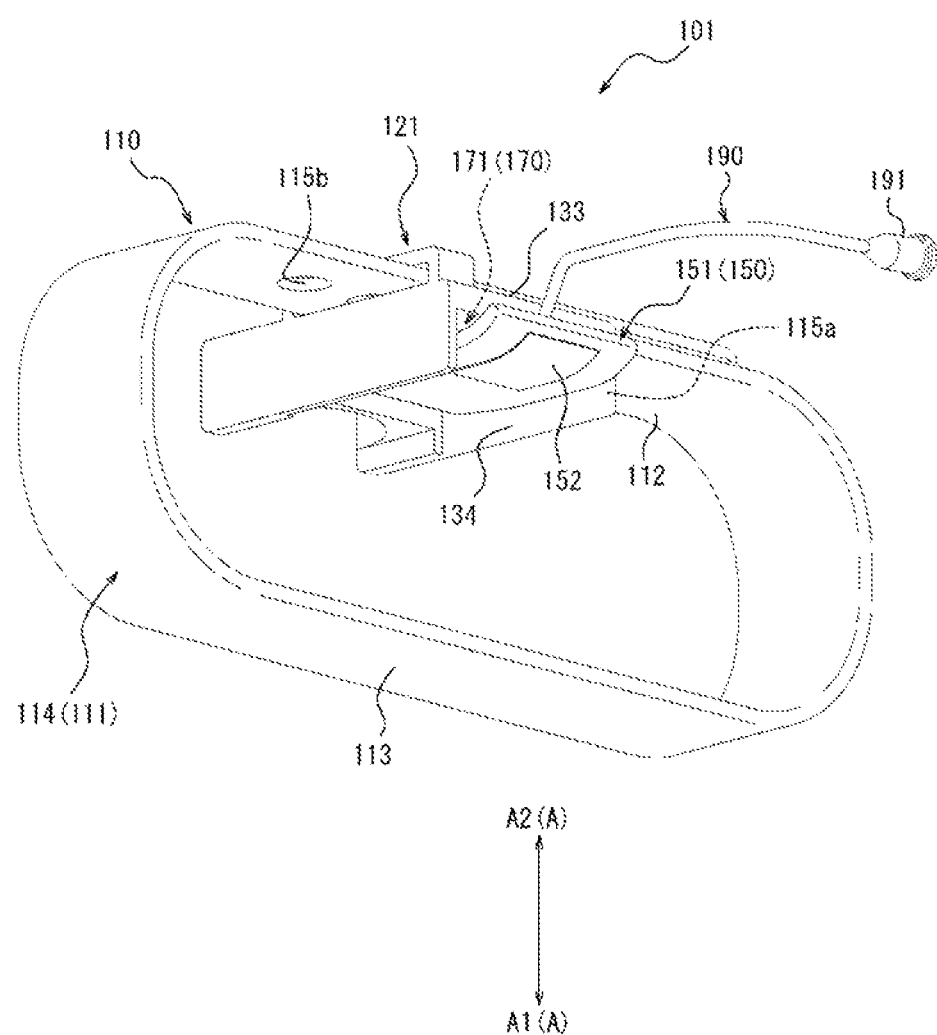
FIG. 9 is another perspective view of the compression device illustrated in FIG. 8.
Figure 10A:
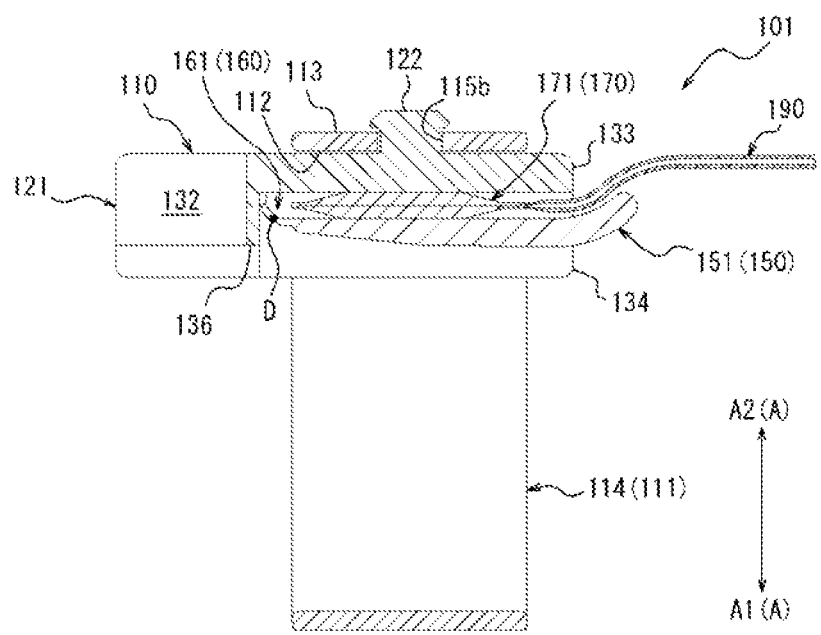
FIG. 10A is a cross-sectional view along the section line 10A/B-10A/B of FIG. 8, and is a view illustrating a state where a compression portion is in a retracted form.
Figure 10B:
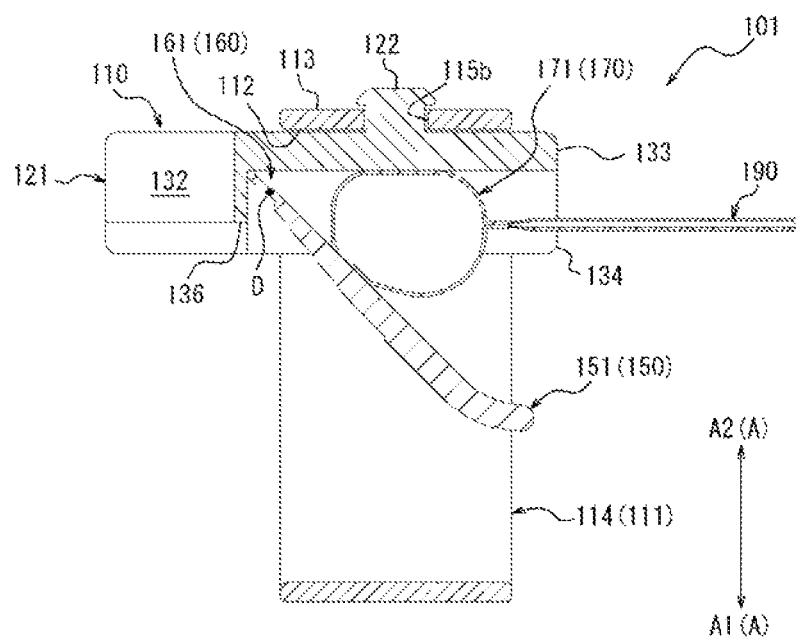
FIG. 10B is a cross-sectional view along the section line 10A/B-10A/B of FIG. 8, and is a view illustrating a state where the compression portion is in a protruding form.

FIG. 8 is a perspective view of the compression device 101. FIG. 9 is another perspective view of the compression device 101. FIGS. 10A and 10B are cross-sectional views along the section line 10A/B-10A/B of FIG. 8. Specifically, FIG. 10A illustrates a state where a compression portion 150 (to be described later) of the compression device 101 is in a retracted form. FIG. 10B illustrates a state where the compression portion 150 (to be described later) of the compression device 101 is in a protruding form.

The compression device 101 includes a main body portion 110, the compression portion 150, a hinge portion 160, and a pressing portion 170.

<Main Body Portion 110>

The main body portion 110 of the present embodiment includes a fixing member 111 that is fixable to a biological surface and a holding member 121 that is mounted on the fixing member 111 to hold the compression portion 150 and the pressing portion 170.

The fixing member 111 of the present embodiment is a belt portion (belt) 114 that extends in a direction along the rotational axis D (to be described later) (refer to FIGS. 10A and 10B) and is configured to be wound around a living body. The expression that the belt portion 114 "extends along a direction along the rotational axis D" means that the belt portion 114 includes at least a component extending in the direction along the rotational axis D. As a result, the belt portion 114 may extend obliquely with respect to the direction along the rotational axis D, or may not be linear, for example, may not extend in a curved shape. The belt portion 114 is flexible. For this reason, the belt portion 114 can be wound around and fixed to the living body while being deformed along the shape of the biological surface. The belt portion 114 as the fixing member 111 of the present embodiment includes a lower surface 112 on the downward direction A1 side and an upper surface 113 on the upward direction A2 side in a state where the belt portion 114 is not wound. The lower surface 112 of the fixing member 111 forms a fixing surface fixable to the biological surface. FIGS. 8 to 10B illustrate a state where the belt portion 114 is wound or is in a wound state.

The circumferential length in an extending direction of the belt portion 114 can be adjusted according to the total length around the living body. Specifically, the belt portion 114 includes a connection portion 115a, which is connected to the holding member 121, at one end in the extending direction, and includes a plurality of mounting holes 115b, which are adjacent to each other along the extending direction, in the vicinity of the other end in the extending direction. Each of the mounting holes 115b is a hole penetrating through the belt portion 114 from the lower surface 112 to the upper surface 113. When a mounting projection 122 (to be described later) of the holding member 121 is fitted into a desired mounting hole 115b of the plurality of mounting holes 115b, the circumferential length along the extending direction of the belt portion 114 can be set to a desired length.

The belt portion 114 is connected to the holding member 121 of the present embodiment by the connection portion 115a. In addition, the holding member 121 includes the mounting projection 122, by which the belt portion 114 is fixed to the living body in a state where the belt portion 114 is wound therearound, in an end portion on the upward direction A2 side. In a state where the belt portion 114 is wound around the living body, the holding member 121 is disposed between the belt portion 114 and the periphery of the living body in the thickness direction A. Namely, in a state where the belt portion 114 is wound around the living body, a side wall portion 134 (to be described later) of the holding member 121 is in direct contact with the biological surface.

As illustrated in FIG. 9, the holding member 121 of the present embodiment defines a recessed portion that accommodates the compression portion 150 and the pressing portion 170. The recessed portion of the holding member 121 is open toward the downward direction A1, and is defined by a bottom portion 133 that is located on the upward direction A2 side and the side wall portion 134 that continues to the bottom portion 133 to surround the compression portion 150 and the pressing portion 170.

The holding member 121 of the present embodiment defines a receiving portion 132 that is a recessed portion having a semicircular shape in a top view as illustrated in FIG. 8. The receiving portion 132 is a region that can receive a tubular member such as a catheter or a sheath from outside the main body portion 110. In a cross-sectional view orthogonal to the rotational axis D (refer to FIGS. 10A and 10B), the receiving portion 132 is located in a direction where the compression portion 150 rotates when the pressing portion 170 presses the compression portion 150 (on the left side in FIGS. 10A and 10B) with respect to the rotational axis D.

The main body portion 110 of the present embodiment includes a guide portion 136 that guides the position of the tubular member puncturing the biological surface. In a cross-sectional view orthogonal to the rotational axis D (refer to FIGS. 10A and 10B), the guide portion 136 is located in the direction where the compression portion 150 rotates when the pressing portion 170 presses the compression portion 150 with respect to the rotational axis D. In detail, the guide portion 136 can position the tubular member at a predetermined distance from a position on the biological surface, which is compressed by the compression portion 150. The guide portion 136 of the present embodiment is formed of an end portion on the downward direction A1 side of the side wall portion 134 facing the receiving portion 132 of the holding member 121, and can come into contact with the tubular member received by the receiving portion 132, to guide the tubular member. The guide portion 136 is not limited to such a configuration and, similar to the compression device 1 described above, may be a mark that is formed in the holding member 121 by printing or the like.

In this case, guiding can be performed similar to the compression device 1 described above.

The material from which the holding member 121 of the present embodiment may be fabricated can be the same as the material forming the holding member 21 of the compression device 1 described above.

<Compression Portion 150 and Hinge Portion 160>

The compression portion 150 can compress the biological surface. The hinge portion 160 supports the compression portion 150 so as to be rotatable around the rotational axis D (refer to FIGS. 10A and 10B) with respect to the main body portion 110. Namely, the compression portion 150 rotates around the rotational axis D to be able to compress the biological surface. The compression portion 150 of the present embodiment is formed of a plate-shaped member 151 extending along a plane parallel to the rotational axis D. The hinge portion 160 of the present embodiment is formed of a material hinge 161 that includes a deformation portion which is flexible, and that is integrally connected to the plate-shaped member 151. The material hinge 161 is fixed to the holding member 121 as the main body portion 110. In detail, one end on an opposite side of the material hinge 161 from a side where the plate-shaped member 151 is located is joined to the holding member 121 over a predetermined length along a direction perpendicular to the drawing sheets of FIGS. 10A and 10B by fusion or the like. The deformation portion of the material hinge 161 is deformably formed, for example, by making the deformation portion thinner than a portion other than the deformation portion in the material hinge 161. In such a manner, since the material hinge 161 includes the deformation portion that is fixed to the holding member 121 and is deformable, the material hinge 161 supports the plate-shaped member 151 integrally connected to the material hinge 161, so as to be rotatable around the deformation portion. Namely, the deformation portion of the material hinge 161 forms the rotational axis D. The deformation portion of the material hinge 161 may form a part of the material hinge 161, which includes the rotational axis D, or may form the entirety of the material hinge 161.

In a state where the belt portion 114 as the fixing member 111 is fixed to the biological surface, the plate-shaped member 151 as the compression portion 150 rotates around the rotational axis D to be deformable in form between the retracted form and the protruding form where the plate-shaped member 151 is located closer to the downward direction A1 in the thickness direction A than in the retracted form to more strongly compress the biological surface. When in the retracted form, the plate-shaped member 151 of the present embodiment is located closer to the upward direction A2 in the thickness direction A than a lower end of the holding member 121, and when in the protruding form, the plate-shaped member 151 is located closer to the downward direction A1 in the thickness direction A than the lower end of the holding member 121. When in the retracted form, the plate-shaped member 151 as the compression portion 150 may be located at the same position as the lower end of the holding member 121 in the thickness direction A, or may be located closer to the downward direction A1 than the lower end of the holding member 121. FIG. 10A illustrates the retracted form of the plate-shaped member 151. FIG. 10B illustrates the protruding form of the plate-shaped member 151. When the plate-shaped member 151 is changed in form from the retracted form (refer to FIG. 10A) to the protruding form (refer to FIG. 10B), while rotating around the rotational axis D, the plate-shaped member 151 protrudes further toward the downward direction A1 in the thickness direction A than the lower end of the holding member 121. Therefore, in a state where the belt portion 114 is fixed to the biological surface, the plate-shaped member 151 can press and compress the biological surface. The plate-shaped member 151 will be described in detail later.

<Pressing Portion 170>

The pressing portion 170 can press the compression portion 150 in one rotational direction around the rotational axis D (refer to FIGS. 10A and 10B). Specifically, in a state where the belt portion 114 as the fixing member 111 is fixed to the biological surface, the pressing portion 170 can press the compression portion 150 in a rotational direction around the rotational axis D toward the biological surface (right-handed direction in FIGS. 10A and 10B). The pressing portion 170 of the present embodiment is formed of an inflatable pressing body 171 that is located between the main body portion 110 and the compression portion 150 and is inflatable by supply of a fluid. Specifically, the inflatable pressing body 171 of the present embodiment is located between the bottom portion 133 of the holding member 121 and the plate-shaped member 151. The inflatable pressing body 171 will be described in detail later.

<Plate-Shaped Member 151 and Inflatable Pressing Body 171>

The plate-shaped member 151 and the inflatable pressing body 171 of the present embodiment will be described mainly with reference to FIGS. 10A and 10B. As illustrated in FIGS. 10A and 10B, an internal space defined by the inflatable pressing body 171 communicates with a tube 190 as a fluid supply portion. A fluid such as air is supplied through the tube 190 to the internal space of the inflatable pressing body 171 from a fluid supply device to be connected to an inflation port as a connection portion 191 (refer to FIG. 8 and the like) provided in an end portion of the tube 190. Therefore, the inflatable pressing body 171 can be inflated. The fluid supplied to the internal space of the inflatable pressing body 171 is not limited to gas, and may be liquid.

When the fluid is supplied from the tube 190, the inflatable pressing body 171 is inflated. The inflation of an upward direction A2 side of the inflatable pressing body 171 is restricted by the bottom portion 133. In addition, the inflation of the inflatable pressing body 171 is restricted by the side wall portion 134 that is located around a direction orthogonal to the thickness direction A. Because the inflatable pressing body 171 is restricted by the bottom portion 133 and the side wall portion 134 of the recessed portion, the inflatable pressing body 171 is inflated to protrude toward the downward direction A1 side.

When the inflatable pressing body 171 is inflated to protrude toward the downward direction A1 side, the plate-shaped member 151 located on a downward direction A1 side of the inflatable pressing body 171 is pressed to the downward direction A1 side by the inflatable pressing body 171. Since the plate-shaped member 151 is supported to be rotatable around the rotational axis D by the hinge portion 160, in the cross-sectional views orthogonal to the rotational axis D illustrated in FIGS. 10A and 10B, the plate-shaped member 151 rotates in the right-handed direction around the rotational axis D. For this reason, in a state where the belt portion 114 as the fixing member 111 is fixed to the biological surface, the plate-shaped member 151 can press and compress the biological surface in the right-handed direction around the rotational axis D.

The plate-shaped member 151 as the compression portion 150 includes an anti-slip sheet 152 as an anti-slip portion at a position where the plate-shaped member 151 comes into contact with the biological surface. The anti-slip sheet 152 is a non-slip member that is located in a part of a surface on the downward direction A1 side of the plate-shaped member 151. With such a configuration, the biological surface with which the plate-shaped member 151 as the compression portion 150 is in contact can be compressed to be pressed toward the rotational direction.

The inflatable pressing body 171 may be a balloon that is inflated by gas such as air. The forming material of the inflatable pressing body 171 can be the same as that of the inflatable pressing body 71 of the compression device 1 described above.

Third Embodiment

Next, a compression device 201 as a third embodiment will be described with reference to FIGS. 11 to 14B. The description below will mainly focus on differences in this third embodiment relative to the compression device 1 (refer to FIG. 1 and the like) described above. Features that are the same or similar to those described above are identified by the same reference numerals and a detailed description of such features will not be repeated.

Figure 11:
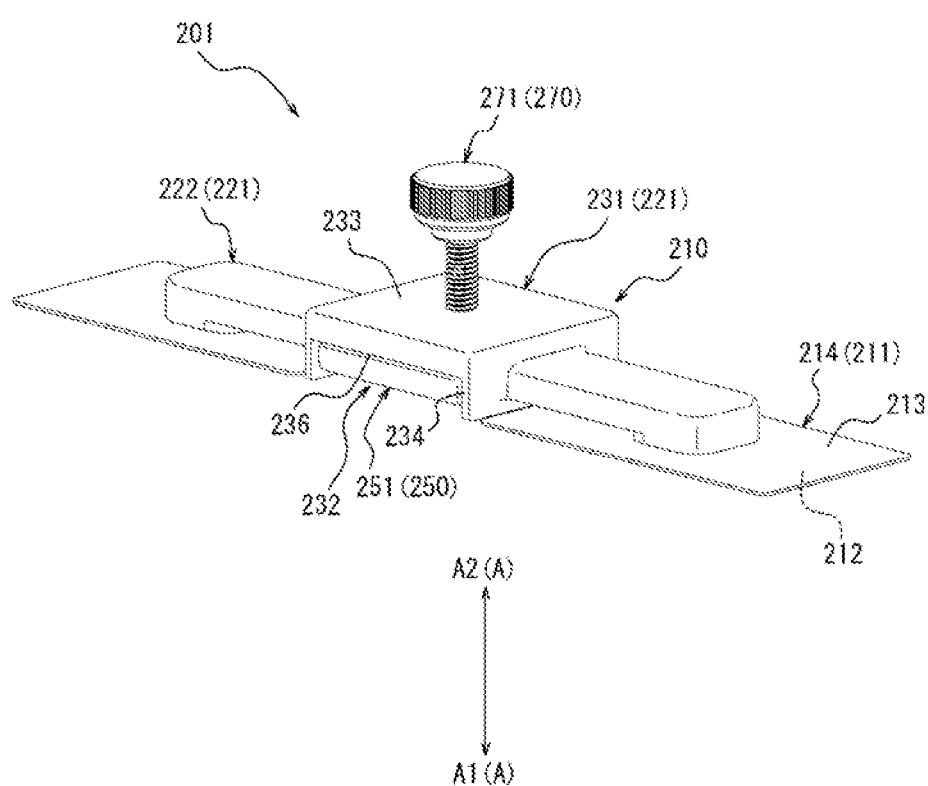
FIG. 11 is a perspective view of a compression device as one embodiment.
Figure 12:
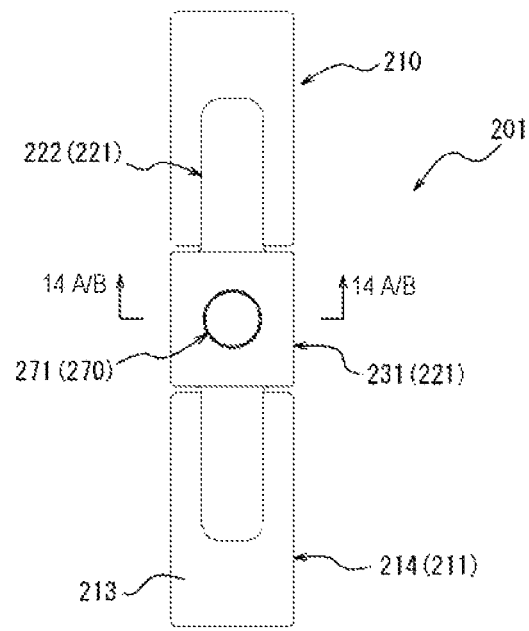
FIG. 12 is a top view of the compression device illustrated in FIG. 11.
Figure 13:
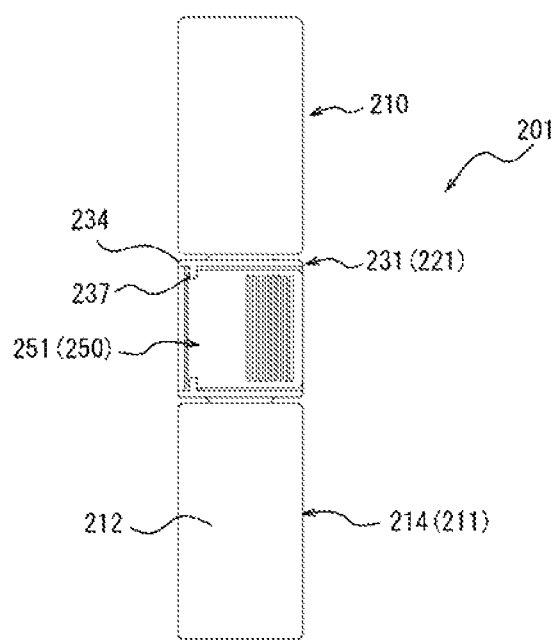
FIG. 13 is a bottom view of the compression device illustrated in FIG. 11.
Figure 14A:
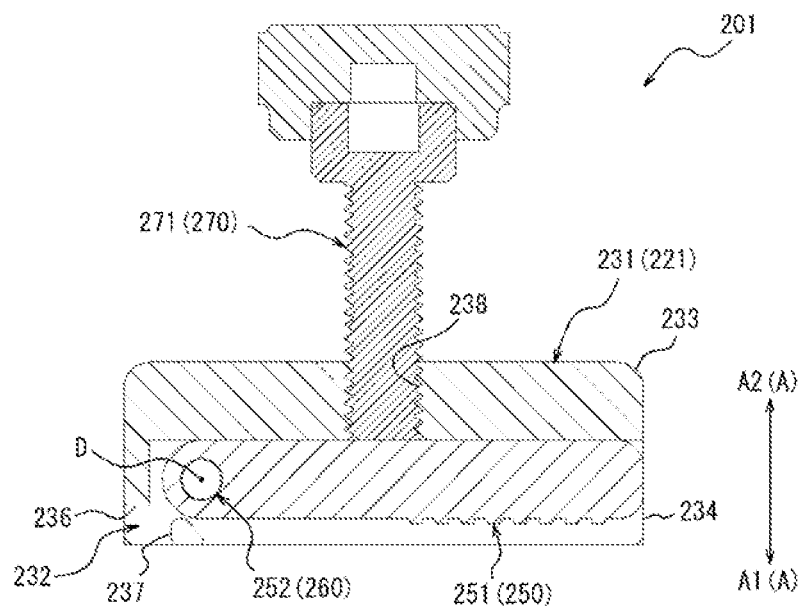
FIG. 14A is a cross-sectional view along the section line 14A/B-14A/B of FIG. 12, and is a view illustrating a state where a compression portion is in a retracted form.
Figure 14B:
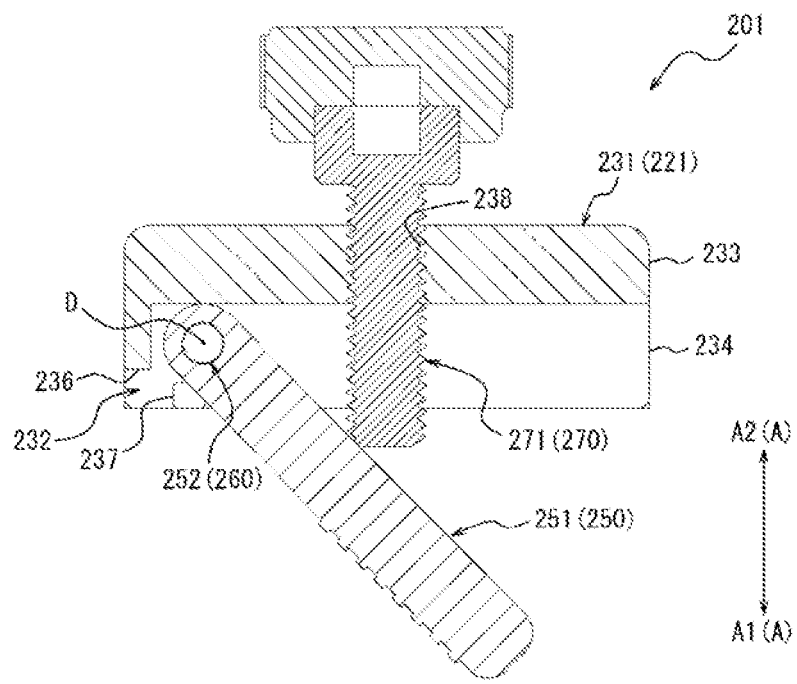
FIG. 14B is a cross-sectional view along the section line 14A/B-14A/B of FIG. 12, and is a view illustrating a state where the compression portion is in a protruding form.

FIG. 11 is a perspective view of the compression device 201. FIGS. 12 and 13 are plan views of the compression device 201. Specifically, FIG. 12 is a top view of the compression device 201. FIG. 13 is a bottom view of the compression device 201. FIGS. 14A and 14B are cross-sectional views along the section line 14A/B-14A/B of FIG. 12. Specifically, FIG. 14A illustrates a state where a compression portion 250 (to be described later) of the compression device 201 is in a retracted form. FIG. 14B illustrates a state where the compression portion 250 (to be described later) of the compression device 201 is in a protruding form.

The compression device 201 includes a main body portion 210, the compression portion 250, a hinge portion 260, and a pressing portion 270.

<Main Body Portion 210>

The main body portion 210 of the present embodiment includes a fixing member 211 that is fixable to a biological surface and a holding member 221 that is mounted on the fixing member 211 to hold the compression portion 250 and the pressing portion 270.

The fixing member 211 of the present embodiment includes a lower surface 212 on the downward direction A1 side, and an upper surface 213 on the upward direction A2 side. The lower surface 212 of the fixing member 211 forms a fixing surface fixable to the biological surface. The fixing member 211 of the present embodiment is formed of an adhesion sheet 214 that is adherable to the biological surface. In a plan view (refer to FIGS. 12 and 13), the adhesion sheet 214 of the present embodiment has a substantially rectangular shape, and two adhesion sheets 214 are provided at a predetermined interval in a longitudinal direction. Since the adhesion sheet 214 is the same as the adhesion sheet 14 of the compression device 1 described above except the number of the adhesion sheets 214 and the shape in a plan view, omitted detailed description will not be repeated.

The holding member 221 of the present embodiment includes a mounting portion 222 that is mounted on the fixing member 211 and a holding main body portion 231 that holds the compression portion 250 and the pressing portion 270. The mounting portion 222 of the present embodiment protrudes linearly from an outer wall of the holding main body portion 231 in a direction orthogonal to the thickness direction A to be mounted on the adhesion sheet 214 as the fixing member 211 on the downward direction A1 side. Two mounting portions 222 are provided, and each of the two mounting portions 222 corresponds to one of the two adhesion sheets 214 described above. The mounting portion 222 of the present embodiment is thin in the thickness direction A and is deformable to follow (conform to) the adhesion sheet 214. The mounting portion 222 may not be deformable to follow the adhesion sheet 214. In that case, the mounting portion 222 can further disperse the force applied to the mounting portion 222.

In a plan view (refer to FIGS. 12 and 13), the holding main body portion 231 of the present embodiment is located in a portion that does not overlap the adhesion sheets 214. Specifically, the holding main body portion 231 is located in a region between the two adhesion sheets 214.

The holding main body portion 231 of the present embodiment defines a recessed portion that accommodates a part of the compression portion 250 and the pressing portion 270. The recessed portion of the holding main body portion 231 is open toward the downward direction A1, and is defined by a bottom portion 233 that is located on the upward direction A2 side and a side wall portion 234 that continues to the bottom portion 233 to surround the part of the compression portion 250 and the pressing portion 270. In addition, the holding main body portion 231 of the present embodiment defines or includes a communication hole (internally threaded through hole) 238 that penetrates through a part of the bottom portion 233 in the thickness direction A. A female screw thread is formed in an inner peripheral surface of the communication hole 238. That is, the communication hole 238 may be an internally threaded through hole.

The holding main body portion 231 of the present embodiment further includes an angle restriction portion 237 that restricts the rotation range of the compression portion 250 around the rotational axis D (refer to FIGS. 14A and 14B). In detail, the angle restriction portion 237 specifies an upper limit of the angle of rotation where the compression portion 250 compresses the biological surface. Therefore, the compression depth from the biological surface can be controlled. The angle restriction portion 237 is formed of a projection that protrudes, for example, on the downward direction A1 side of the rotational axis D from the side wall portion 234 toward a recessed portion side in the direction orthogonal to the thickness direction A. Therefore, when the compression portion 250 rotates by a predetermined angle to a side where the biological surface is compressed, the compression portion 250 comes into contact with the projection to be restricted from rotating beyond the projection.

As illustrated in FIG. 11, the holding main body portion 231 of the present embodiment includes a receiving portion 232 that is a space on the downward direction A1 side defined by the side wall portion 234. In a cross-sectional view orthogonal to the rotational axis D (refer to FIGS. 14A and 14B), the receiving portion 232 is located in a direction where the compression portion 250 rotates when the pressing portion 270 presses the compression portion 250 (on the left side in FIGS. 14A and 14B) with respect to the rotational axis D.

The main body portion 210 of the present embodiment includes a guide portion 236 that guides the position of a tubular member puncturing the biological surface. In a cross-sectional view orthogonal to the rotational axis D (refer to FIGS. 14A and 14B), the guide portion 236 is located in the direction where the compression portion 250 rotates when the pressing portion 270 presses the compression portion 250 with respect to the rotational axis D. In detail, the guide portion 236 can position the tubular member at a predetermined distance from a position on the biological surface, which is compressed by the compression portion 250. The guide portion 236 of the present embodiment is formed of an end portion on the downward direction A1 side of the side wall portion 234 of the holding main body portion 231, and can come into contact with and guide the tubular member. The guide portion 236 is not limited to such a configuration and, for example, similar to the compression device 1 described above, may be a mark that is formed in the holding main body portion 231 by printing or the like. In this case, guiding can be performed similar to the compression device 1 described above.

The material from which the holding member 221 of the present embodiment may be fabricated can be the same as the material forming the holding member 21 of the compression device 1.

<Compression Portion 250 and Hinge Portion 260>

The compression portion 250 can compress the biological surface. The hinge portion 260 supports the compression portion 250 so as to be rotatable around the rotational axis D (refer to FIGS. 14A and 14B) with respect to the main body portion 210. Namely, the compression portion 250 rotates around the rotational axis D to be able to compress the biological surface. The compression portion 250 of the present embodiment is formed of a plate-shaped member 251 extending along a plane parallel to the rotational axis D. One end of the plate-shaped member 251 extends along a direction perpendicular to the drawing sheets of FIGS. 14A and 14B, and is rotatably supported by a mechanical hinge 252 supported by the side wall portion 234 of the holding member 221. In other words, the hinge portion 260 of the present embodiment is formed of or constituted by the mechanical hinge 252. Namely, the rotational axis D is the rotational axis of the mechanical hinge 252 as the hinge portion 260. The mechanical hinge 252 is interposed between the holding member 221 as the main body portion 210 and the plate-shaped member 251 as the compression portion 250.

In a state where the adhesion sheets 214 as the fixing member 211 are fixed to the biological surface by adhesion, the plate-shaped member 251 as the compression portion 250 rotates around the rotational axis D to be deformable in form between the retracted form and the protruding form where the plate-shaped member 251 is located closer to the downward direction A1 in the thickness direction A than in the retracted form to more strongly compress the biological surface. When in the retracted form, the plate-shaped member 251 of the present embodiment is located closer to the upward direction A2 in the thickness direction A than the lower surface 212 of the adhesion sheet 214, and when in the protruding form, the plate-shaped member 251 is located closer to the downward direction A1 in the thickness direction A than the lower surface 212 of the adhesion sheet 214. When in the retracted form, the plate-shaped member 251 as the compression portion 250 may be located at the same position as the lower surface 212 of the adhesion sheet 214 in the thickness direction A, or may be located closer to the downward direction A1 than the lower surface 212. FIG. 14A illustrates the retracted form of the plate-shaped member 251. FIG. 14B illustrates the protruding form of the plate-shaped member 251. When the plate-shaped member 251 changes in form from the retracted form (refer to FIG. 14A) to the protruding form (refer to FIG. 14B), while rotating around the rotational axis D, the plate-shaped member 251 protrudes further toward the downward direction A1 in the thickness direction A than the lower surface 212 of the adhesion sheet 214. Therefore, in a state where the adhesion sheets 214 adhere to the biological surface, the plate-shaped member 251 can press and compress the biological surface in a region where the adhesion sheets 214 are not disposed.

<Pressing Portion 270>

The pressing portion 270 can press the compression portion 250 in one rotational direction around the rotational axis D (refer to FIGS. 14A and 14B). Specifically, in a state where the adhesion sheets 214 as the fixing member 211 are fixed to the biological surface by adhesion, the pressing portion 270 can press the compression portion 250 in a rotational direction around the rotational axis D toward the biological surface (right-handed direction in FIGS. 14A and 14B). The pressing portion 270 of the present embodiment is a bar-shaped member (elongated member) 271 in which a male screw screwable (threadably engageable) with the female screw of the communication hole 238 defined in the bottom portion 233 of the holding main body portion 231 is formed and which is configured to protrude from the communication hole 238 to a compression portion 250 side. Namely, when the bar-shaped member 271 rotates in one direction with respect to the holding main body portion 231 in a top view, the bar-shaped member 271 moves in the downward direction A1 with respect to the holding main body portion 231, and when the bar-shaped member 271 rotates in the other direction with respect to the holding main body portion 231, the bar-shaped member 271 moves in the upward direction A2 with respect to the holding main body portion 231.

When the bar-shaped member 271 moves in the downward direction A1 with respect to the holding main body portion 231, the free end of the bar-shaped member 271 protrudes toward the downward direction A1 side. When the bar-shaped member 271 protrudes toward the downward direction A1 side, the plate-shaped member 251 as the compression portion 250 located on a downward direction A1 side of the bar-shaped member 271 is pressed to the downward direction A1 side by the bar-shaped member 271. Since the plate-shaped member 251 is supported to be rotatable around the rotational axis D by the hinge portion 260, in the cross-sectional views orthogonal to the rotational axis D illustrated in FIGS. 14A and 14B, the plate-shaped member 251 rotates in the right-handed direction around the rotational axis D. For this reason, in a state where the adhesion sheets 214 as the fixing member 211 are fixed to the biological surface by adhesion, the plate-shaped member 251 can press and compress the biological surface in the right-handed direction around the rotational axis D.

Fourth Embodiment

Next, a compression device 301 as a fourth embodiment will be described with reference to FIGS. 15 to 17B. The description below will mainly focus on differences in this fourth embodiment relative to the compression device 1 (refer to FIG. 1 and the like) described above. Features that are the same or similar to those described above are identified by the same reference numerals and a detailed description of such features will not be repeated.

Figure 15:
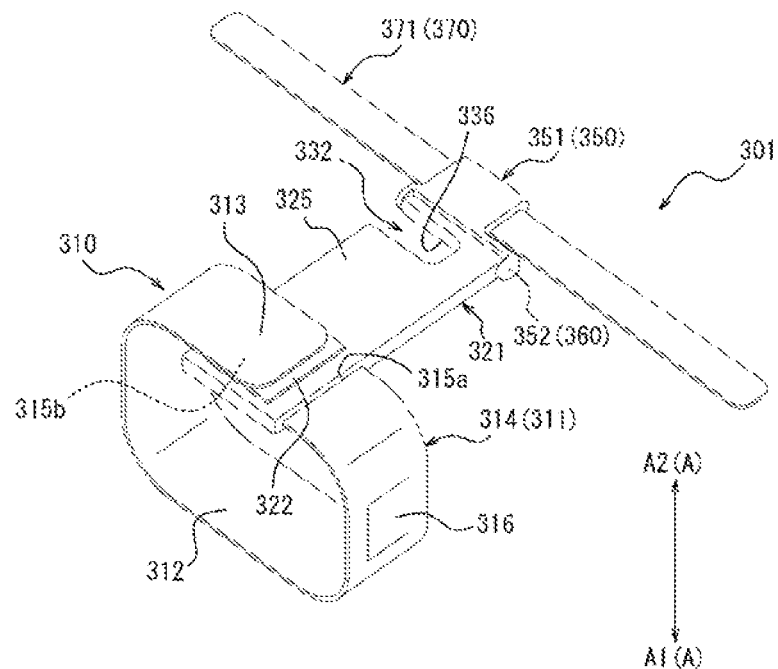
FIG. 15 is a perspective view of a compression device as one embodiment.
Figure 16:
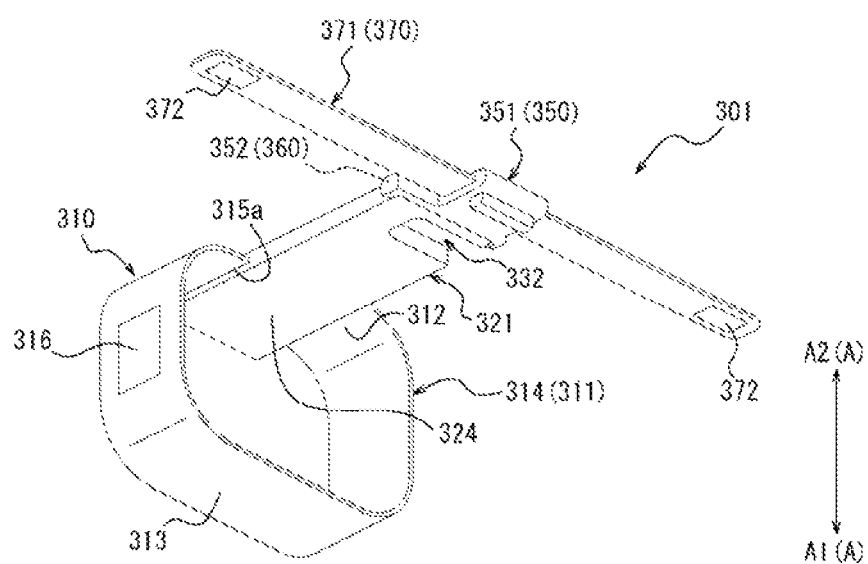
FIG. 16 is another perspective view of the compression device illustrated in FIG. 15.
Figure 17A:
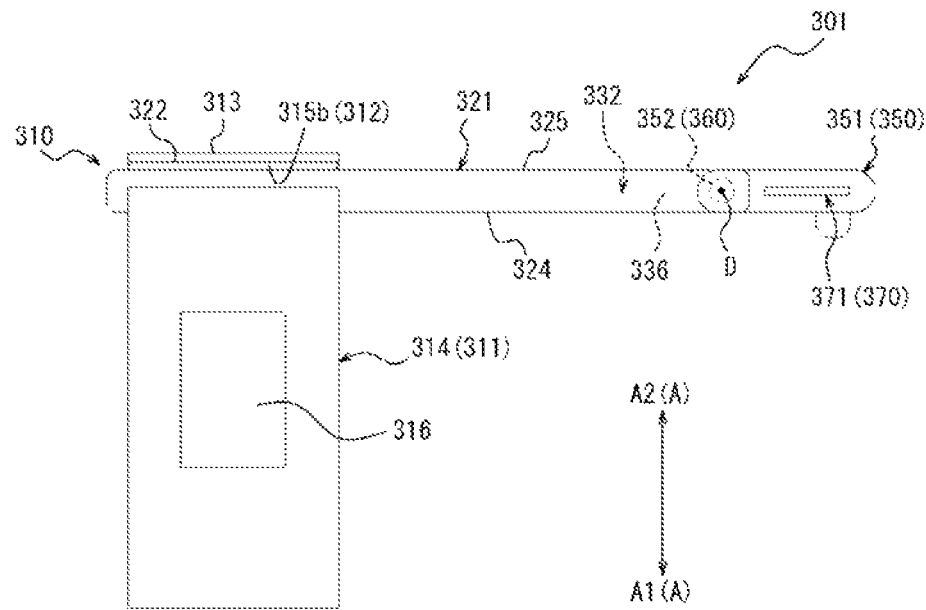
FIG. 17A is a side view of the compression device illustrated in FIG. 15, and is a view illustrating a state where a compression portion is in a retracted form.
Figure 17B:
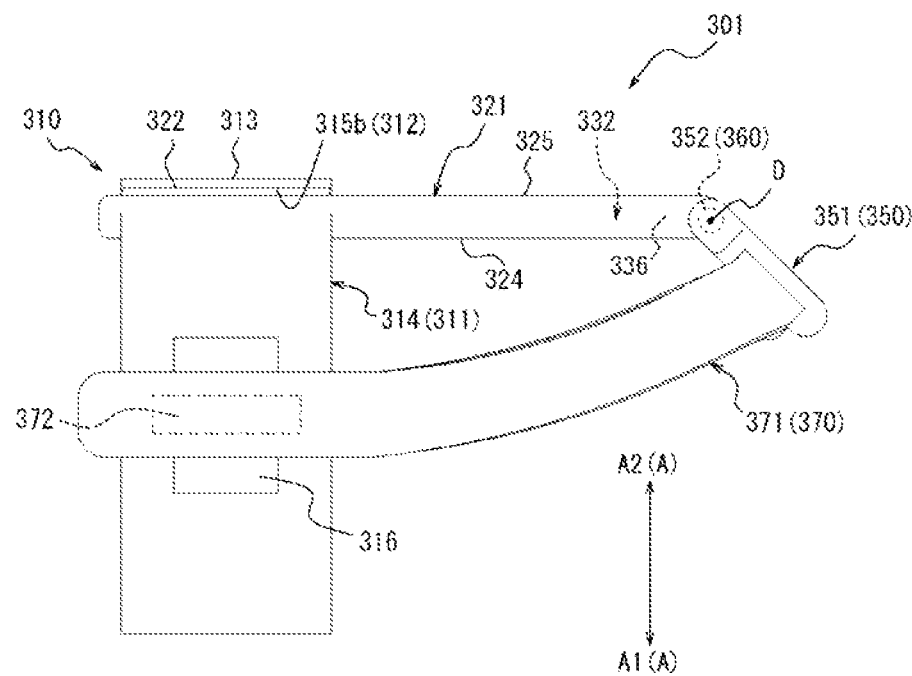
FIG. 17B is a side view of the compression device illustrated in FIG. 15, and is a view illustrating a state where the compression portion is in a protruding form.

FIG. 15 is a perspective view of the compression device 301. FIG. 16 is another perspective view of the compression device 301. FIGS. 17A and 17B are side views of the compression device 301. Specifically, FIG. 17A illustrates a state where a compression portion 350 (to be described later) of the compression device 301 is in a retracted form. FIG. 17B illustrates a state where the compression portion 350 (to be described later) of the compression device 301 is in a protruding form.

The compression device 301 includes a main body portion 310, the compression portion 350, a hinge portion 360, and a pressing portion 370.

<Main Body Portion 310>

The main body portion 310 of the present embodiment includes a fixing member 311 that is fixable to a biological surface and a holding member 321 that is mounted on the fixing member 311 to hold the compression portion 350 and the pressing portion 370.

The fixing member 311 of the present embodiment is a belt portion (belt) 314 that extends in a direction along the rotational axis D (to be described later) (refer to FIGS. 17A and 17B) and is configured to be wound around a living body. The expression that the belt portion 314 "extends along a direction along the rotational axis D" means that the belt portion 314 includes at least a component extending in the direction along the rotational axis D. As a result, the belt portion 314 may extend obliquely with respect to the direction along the rotational axis D, or may not be linear, for example, may not extend in a curved shape. The belt portion 314 is flexible. For this reason, the belt portion 314 can be wound around and fixed to the living body while being deformed along the shape of the biological surface. The belt portion 314 as the fixing member 311 of the present embodiment includes a lower surface 312 on the downward direction A1 side and an upper surface 313 on the upward direction A2 side in a state where the belt portion 314 is not wound. The lower surface 312 of the fixing member 311 forms a fixing surface fixable to the biological surface. FIGS. 15 to 17B illustrate a state where the belt portion 314 is wound.

The circumferential length in an extending direction of the belt portion 314 can be adjusted according to the total length around the living body. Specifically, the belt portion 314 includes a connection portion 315a, which is connected to the holding member 321, at one end in the extending direction, and includes a mounting surface 315b, which extends along the extending direction, in the vicinity of the other end in the extending direction. The mounting surface 315b is detachably mountable at any position on a mounting surface 322 (to be described later) of the holding member 321. The mounting surface 315b and the mounting surface 322 are formed of, for example, a set of surface fasteners. When the mounting surface 315b is mounted at a desired position on the mounting surface 322, the circumferential length along the extending direction of the belt portion 314 can be set to a desired length.

The holding member 321 of the present embodiment is an extending portion extending form the belt portion 314 toward a direction orthogonal to the rotational axis D. The holding member 321 includes a lower surface 324 on the downward direction A1 side, and an upper surface 325 on the upward direction A2 side. One end portion in an extending direction of the holding member 321 is connected to the belt portion 314 by the connection portion 315a, and the mounting surface 322 by which the belt portion 314 is fixed to the living body in a state where the belt portion 314 is wound around the living body, on the upward direction A2 side. In a state where the belt portion 314 is wound around the living body, the holding member 321 is disposed between the belt portion 314 and the periphery of the living body in the thickness direction A. Namely, in a state where the belt portion 314 is wound around the living body, the lower surface 324 of the holding member 321 is in direct contact with the biological surface. As will be described in detail later, the compression portion 350 is supported by the hinge portion 360 in an end portion on an opposite side of the holding member 321 from the belt portion 314 between end portions in the extending direction of the holding member 321.

The holding member 321 of the present embodiment defines a receiving portion 332 that is a recessed portion in a top view as illustrated in FIG. 15. The receiving portion 332 is a region that can receive a tubular member such as a catheter or a sheath from outside the main body portion 310. In a cross-sectional view orthogonal to the rotational axis D (refer to FIGS. 17A and 17B), the receiving portion 332 is located in a direction where the compression portion 350 rotates when the pressing portion 370 presses the compression portion 350 (on the left side in FIGS. 17A and 17B) with respect to the rotational axis D. Here, FIGS. 17A and 17B are side views but are drawings viewed from the same direction as the cross-sectional view orthogonal to the rotational axis D, and thus the positional relationship among components in FIGS. 17A and 17B is the same as the cross-sectional view orthogonal to the rotational axis D.

The main body portion 310 of the present embodiment includes a guide portion 336 that guides the position of the tubular member puncturing the biological surface. In a cross-sectional view orthogonal to the rotational axis D (refer to FIGS. 17A and 17B), the guide portion 336 is located in the direction where the compression portion 350 rotates when the pressing portion 370 presses the compression portion 350 with respect to the rotational axis D. In detail, the guide portion 336 can position the tubular member at a predetermined distance from a position on the biological surface, which is compressed by the compression portion 350. The guide portion 336 of the present embodiment is formed of a side wall on a rotational axis D side among side walls defining the receiving portion 332 of the holding member 321, and can come into contact with the tubular member received by the receiving portion 332, to guide the tubular member. The guide portion 336 is not limited to such a configuration and, for example, similar to the compression device 1 described above, may be a mark that is formed in the holding member 321 by printing or the like. In this case, guiding can be performed similar to the compression device 1 described above.

The material from which the holding member 321 of the present embodiment may be fabricated can be the same as of the material forming the holding member 21 of the compression device 1 described above.

<Compression Portion 350 and Hinge Portion 360>

The compression portion 350 can compress the biological surface. The hinge portion 360 supports the compression portion 350 so as to be rotatable around the rotational axis D (refer to FIGS. 17A and 17B) with respect to the main body portion 310. Namely, the compression portion 350 rotates around the rotational axis D to be able to compress the biological surface. The compression portion 350 of the present embodiment is formed of a plate-shaped member 351 extending along a plane parallel to the rotational axis D. One end of the plate-shaped member 351 extends along a direction perpendicular to the drawing sheets of FIGS. 17A and 17B, and is rotatably supported by a mechanical hinge 352 supported by the end portion on the opposite side in the extending direction of the holding member 321 from the end portion to which the belt portion 314 is connected. In other words, the hinge portion 360 of the present embodiment is formed of or constituted by the mechanical hinge 352. Namely, the rotational axis D is the rotational axis of the mechanical hinge 352 as the hinge portion 360. The mechanical hinge 352 is interposed between the holding member 321 as the main body portion 310 and the plate-shaped member 351 as the compression portion 350.

In a state where the belt portion 314 as the fixing member 311 is fixed to the biological surface, the plate-shaped member 351 as the compression portion 350 rotates around the rotational axis D to be deformable in form between the retracted form and the protruding form where the plate-shaped member 351 is located closer to the downward direction A1 in the thickness direction A than in the retracted form to more strongly compress the biological surface. When in the retracted form, the plate-shaped member 351 of the present embodiment is located closer to the upward direction A2 in the thickness direction A than a lower end of the holding member 321, and when in the protruding form, the plate-shaped member 351 is located closer to the downward direction A1 in the thickness direction A than the lower end of the holding member 321. When in the retracted form, the plate-shaped member 351 as the compression portion 350 may be located at the same position as the lower end of the holding member 321 in the thickness direction A, or may be located closer to the downward direction A1 than the lower end of the holding member 321. FIG. 17A illustrates the retracted form of the plate-shaped member 351. FIG. 17B illustrates the protruding form of the plate-shaped member 351. When the plate-shaped member 351 is changed in form from the retracted form (refer to FIG. 17A) to the protruding form (refer to FIG. 17B), while rotating around the rotational axis D, the plate-shaped member 351 is protrusible further toward the downward direction A1 in the thickness direction A than the lower end of the holding member 321. Therefore, in a state where the belt portion 314 is fixed to the biological surface, the plate-shaped member 351 can press and compress the biological surface.

<Pressing Portion 370>

The pressing portion 370 can press the compression portion 350 in one rotational direction around the rotational axis D (refer to FIGS. 17A and 17B). Specifically, in a state where the belt portion 314 as the fixing member 311 is fixed to the biological surface, the pressing portion 370 can press the compression portion 350 in a rotational direction around the rotational axis D toward the biological surface (right-handed direction in FIGS. 17A and 17B). The pressing portion 370 of the present embodiment is a band portion 371 that is mounted on the plate-shaped member 351 as the compression portion 350 to extend from the compression portion 350 to both sides in the direction along the rotational axis D. The expression that the band portion 371 "extends along the direction along the rotational axis D" means that the band portion 371 includes at least a component extending in the direction along the rotational axis D. As a result, the band portion 371 may extend obliquely with respect to the direction along the rotational axis D, or may not be linear, for example, may not extend in a curved shape. When the band portion 371 is fixed to the belt portion 314 in a state where the belt portion 314 is wound around the biological surface, the band portion 371 presses the compression portion 350, so that the plate-shaped member 351 as the compression portion 350 maintains a state where the plate-shaped member 351 rotates in the above-described one rotational direction, namely, in the rotational direction toward the biological surface (right-handed direction in FIGS. 17A and 17B). Specifically, the vicinity of both ends in an extending direction of the band portion 371 and the belt portion 314 include mounting portions that are mountable to each other. More specifically, the band portion 371 has mounting surfaces 372 on a surface on the downward direction A1 side in the vicinity of both ends in the extending direction. The belt portion 314 has mounting surfaces 316 on an outer surface in a state where the belt portion 314 is wound around the biological surface. The mounting surfaces 372 of the band portion 371 are detachably mountable at the positions of the mounting surfaces 316 of the belt portion 314. The mounting surface 372 and the mounting surface 316 are formed of, for example, a set of surface fasteners. When the mounting surfaces 372 are mounted at desired positions of the mounting surfaces 316, the rotational angle of the plate-shaped member 351 as the compression portion 350 can be adjusted and fixed.

Fifth Embodiment

Next, a compression device 401 as a fifth embodiment will be described with reference to FIGS. 18 to 21B. The description below will mainly focus on differences in this fifth embodiment relative to the compression device 1 (refer to FIG. 1 and the like) described above. Features that are the same or similar to those described above are identified by the same reference numerals and a detailed description of such features will not be repeated.

Figure 18:
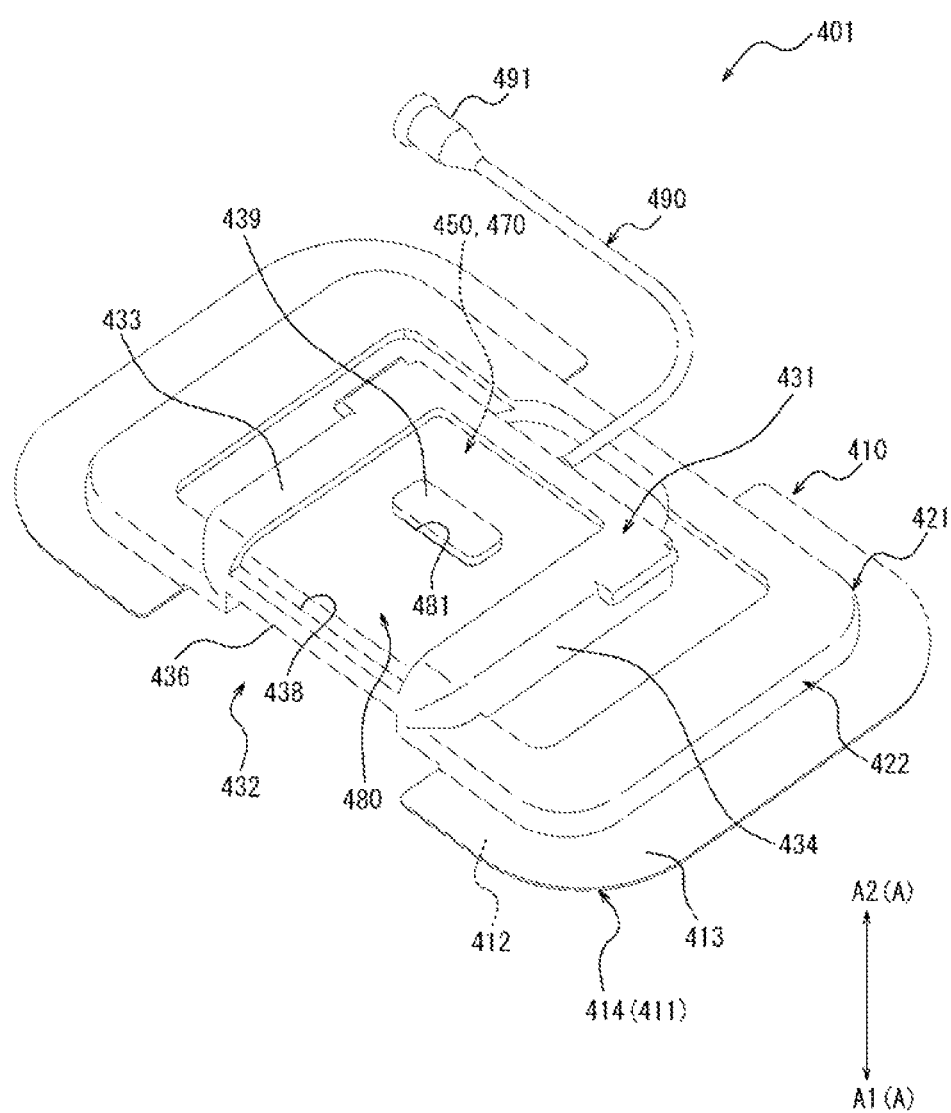
FIG. 18 is a perspective view of a compression device as one embodiment.
Figure 19:
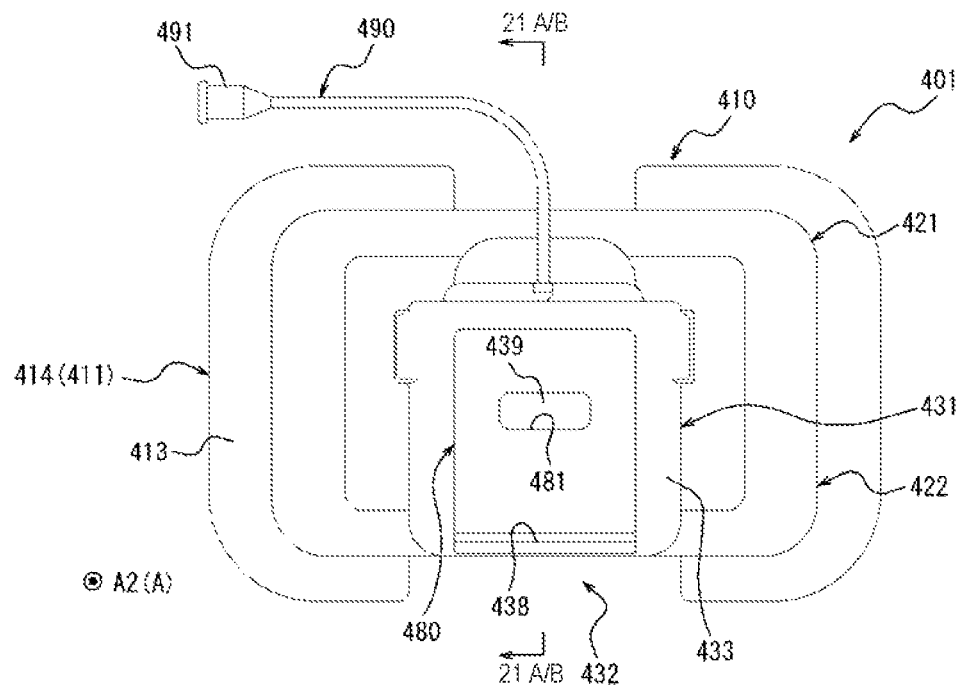
FIG. 19 is a top view of the compression device illustrated in FIG. 18.
Figure 20:
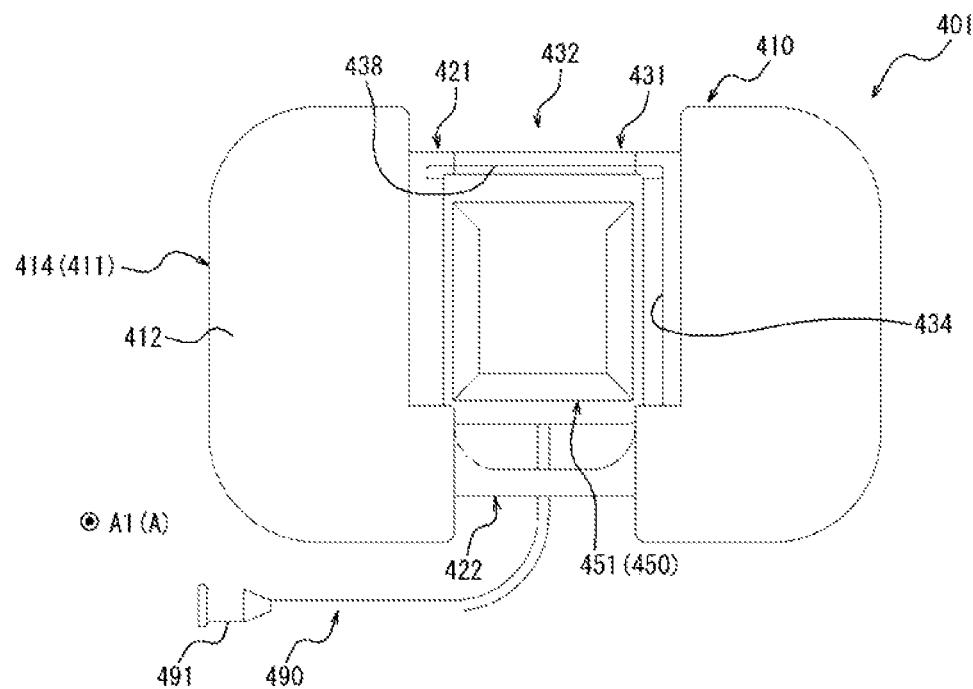
FIG. 20 is a bottom view of the compression device illustrated in FIG. 18.
Figure 21A:
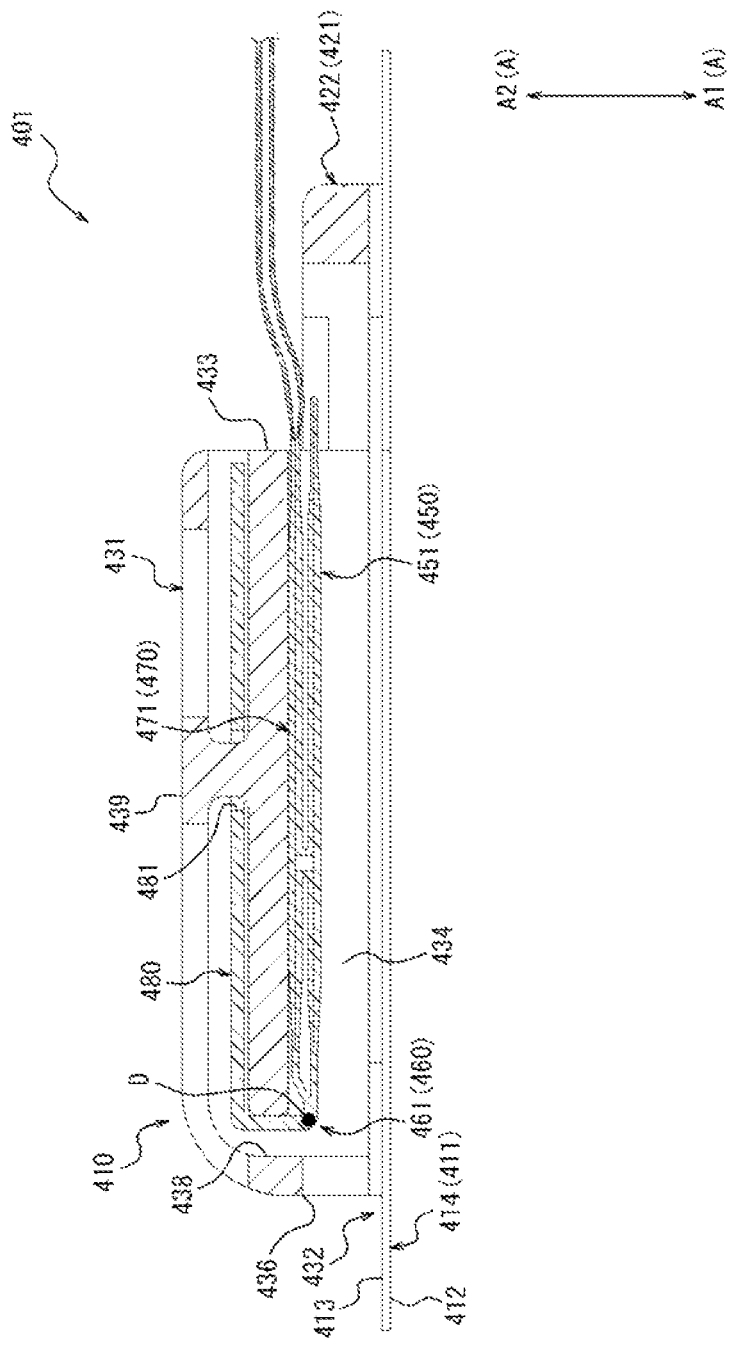
FIG. 21A is a cross-sectional view along the section line 21A/B-21A/B of FIG. 19, and is a view illustrating a state where a compression portion is in a retracted form.
Figure 21B:
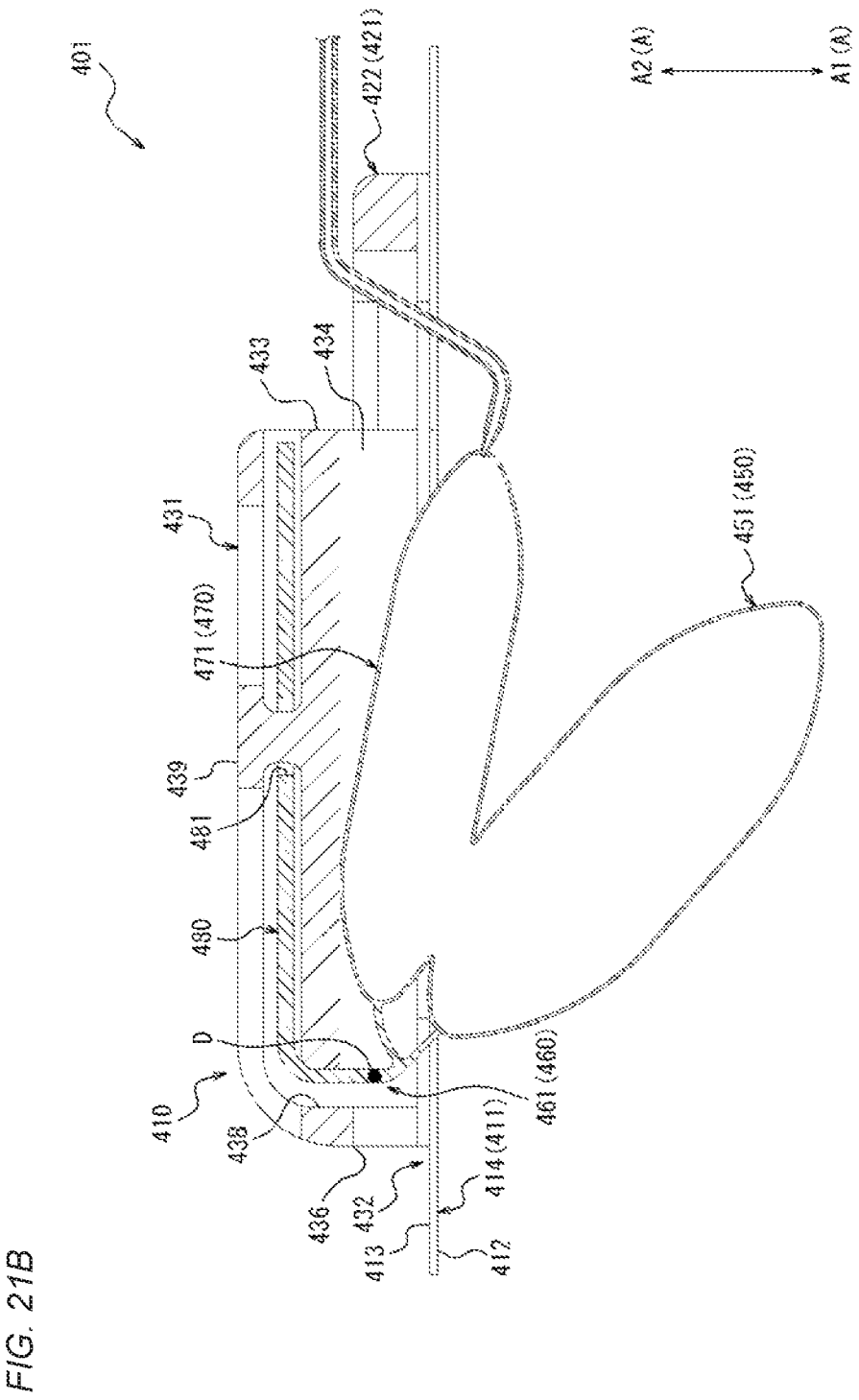
FIG. 21B is a cross-sectional view along the section line 21A/B-21A/B of FIG. 19, and is a view illustrating a state where the compression portion is in a protruding form.

FIG. 18 is a perspective view of the compression device 401. FIGS. 19 and 20 are plan views of the compression device 401. Specifically, FIG. 19 is a top view of the compression device 401. FIG. 20 is a bottom view of the compression device 401. FIGS. 21A and 21B are cross-sectional views along the section line 21A/B-21A/B of FIG. 19. Specifically, FIG. 21A illustrates a state where a compression portion 450 (to be described later) of the compression device 401 is in a retracted form. FIG. 21B illustrates a state where the compression portion 450 (to be described later) of the compression device 401 is in a protruding form.

The compression device 401 includes a main body portion 410, the compression portion 450, a hinge portion 460, and a pressing portion 470.

<Main Body Portion 410>

The main body portion 410 of the present embodiment includes a fixing member 411 that is fixable to a biological surface and a holding member 421 that is mounted on the fixing member 411 to hold the compression portion 450 and the pressing portion 470.

The fixing member 411 of the present embodiment includes a lower surface 412 on the downward direction A1 side, and an upper surface 413 on the upward direction A2 side. The lower surface 412 of the fixing member 411 forms a fixing surface fixable to the biological surface. The fixing member 411 of the present embodiment is formed of an adhesion sheet 414 that is adherable to the biological surface. In a plan view (refer to FIGS. 19 and 20), two adhesion sheets 414 of the present embodiment are provided at a predetermined interval. Since the adhesion sheet 414 is the same as the adhesion sheet 14 of the compression device 1 described above except the number of the adhesion sheets 414 and the shape in a plan view, descriptions will be omitted.

The holding member 421 of the present embodiment includes a mounting portion 422 that is mounted on the fixing member 411 and a holding main body portion 431 that holds the compression portion 450 and the pressing portion 470. The mounting portion 422 of the present embodiment extends in a U shape and as illustrated in FIG. 18, is mounted on the upper surfaces 413 of the two adhesion sheets 414 to cross both the two adhesion sheets 414 on the upward direction A2 side. The mounting portion 422 of the present embodiment is thin in the thickness direction A and is deformable to follow (conform to) the adhesion sheet 414.

The mounting portion 422 may not be deformable to follow the adhesion sheet 414. In that case, the mounting portion 422 can further disperse the force applied to the mounting portion 422.

The holding main body portion 431 supports the compression portion 450 via the hinge portion 460 so as to be rotatable around the rotational axis D. The holding main body portion 431 of the present embodiment supports also the pressing portion 470 so as to be rotatable around the rotational axis D. The details will be described later.

In a plan view (refer to FIGS. 19 and 20), the holding main body portion 431 of the present embodiment is located in a portion that does not overlap the adhesion sheets 414. Specifically, the holding main body portion 431 is located in a region between the two adhesion sheets 414. The holding main body portion 431 of the present embodiment is connected to the mounting portion 422, and in a top view (refer to FIG. 19), is located in a region defined in the mounting portion 422 having a U shape. The holding main body portion 431 may be integrally molded with the mounting portion 422.

As illustrated in FIG. 18, the main body portion 410 of the present embodiment includes the holding main body portion 431 and a receiving portion 432 that is a recessed portion defined by the two adhesion sheets 414. In a cross-sectional view orthogonal to the rotational axis D (refer to FIGS. 21A and 21B), the receiving portion 432 is located in a direction where the compression portion 450 rotates when the pressing portion 470 presses the compression portion 450 (on the left side in FIGS. 21A and 21B) with respect to the rotational axis D.

The holding main body portion 431 of the present embodiment defines a recessed portion that accommodates the compression portion 450 and the pressing portion 470. The recessed portion of the holding main body portion 431 is open toward the downward direction A1, and is defined by a bottom portion 433 that is located on the upward direction A2 side and a side wall portion 434 that continues to the bottom portion 433 to surround the compression portion 450 and the pressing portion 470.

The holding main body portion 431 of the present embodiment defines a slit 438 that penetrates through the holding main body portion 431 in the thickness direction A between the bottom portion 433 and the side wall portion 434. The slit 438 is defined between the side wall portion 434 facing the receiving portion 432 of the holding main body portion 431 and the bottom portion 433. In addition, a projection portion 439 that protrudes toward the upward direction A2 is formed on an upper surface of the bottom portion 433 of the holding main body portion 431 of the present embodiment.

The main body portion 410 of the present embodiment includes a guide portion 436 that guides the position of a tubular member puncturing the biological surface. In a cross-sectional view orthogonal to the rotational axis D (refer to FIGS. 21A and 21B), the guide portion 436 is located in the direction where the compression portion 450 rotates when the pressing portion 470 presses the compression portion 450 with respect to the rotational axis D. In detail, the guide portion 436 can guide the position of the tubular member at a predetermined distance from a position on the biological surface, which is compressed by the compression portion 450. The guide portion 436 of the present embodiment is formed of an end portion on the downward direction A1 side of the side wall portion 434 facing the receiving portion 432 of the holding main body portion 431, and can come into contact with the tubular member received by the receiving portion 432, to guide the tubular member. The guide portion 436 is not limited to such a configuration and, for example, similar to the compression device 1 described above, may be a mark that is formed in the holding member 421 by printing or the like. In this case, guiding can be performed similarly to the compression device 1 described above.

The material of the holding member 421 of the present embodiment can be the same as that of the holding member 21 of the compression device 1 described above.

<Compression Portion 450 and Hinge Portion 460>

The compression portion 450 can compress the biological surface. The hinge portion 460 supports the compression portion 450 so as to be rotatable around the rotational axis D (refer to FIGS. 21A and 21B) with respect to the main body portion 410. Namely, the compression portion 450 rotates around the rotational axis D to be able to compress the biological surface. The compression portion 450 of the present embodiment is formed of an inflatable compression body 451 that is flexible and inflatable by supply of the fluid. The hinge portion 460 of the present embodiment is formed of a material hinge 461 that includes a deformation portion which is flexible, and that is integrally connected to the inflatable compression body 451. The deformation portion of the material hinge 461 is deformably formed, for example, by making the deformation portion thinner than a portion other than the deformation portion in the material hinge 461. An extending portion 480 extends from one end on an opposite side of the material hinge 461 from a side where the inflatable compression body 451 is located. The extending portion 480 is a sheet-shaped member that is flexible, and defines a hole portion 481. The extending portion 480 protrudes to an upward direction A2 side of the holding main body portion 431 through the slit 438 defined in the holding main body portion 431. In a cross-sectional view orthogonal to the rotational axis D (refer to FIGS. 21A and 21B), a portion of the extending portion 480, which protrudes to the upward direction A2 side of the holding main body portion 431, extends along the upper surface of the bottom portion 433 of the holding main body portion 431 toward a side opposite to a side where the side wall portion 434 facing the receiving portion 432 is located. The extending portion 480 of the present embodiment is engaged with the projection portion 439 of the bottom portion 433, the projection portion 439 penetrating through the hole portion 481, so that the extending portion 480 is fixed to the bottom portion 433. Namely, the hole portion 481 of the extending portion 480 forms a fixing portion fixed to the bottom portion 433. The fixing portion of the extending portion 480 is not limited to the hole portion 481 that is engaged with the projection portion 439.

In such a manner, since the material hinge 461 includes the deformation portion that is supported via the extending portion 480 by the main body portion 410 and is deformable, the material hinge 461 supports the inflatable compression body 451 integrally connected to the material hinge 461, so as to be rotatable around the deformation portion. Namely, the deformation portion of the material hinge 461 forms the rotational axis D. The deformation portion of the material hinge 461 may form a part of the material hinge 461, which includes the rotational axis D, or may form the entirety of the material hinge 461. As in the present embodiment, the inflatable compression body 451, the material hinge 461, an inflatable pressing body 471, and the extending portion 480 are integrated and mounted on the holding member 421 in a winding manner, and thus the efficiency of the production process can be improved.

In a state where the adhesion sheets 414 as the fixing member 411 are fixed to the biological surface by adhesion, the inflatable compression body 451 as the compression portion 450 rotates around the rotational axis D to be deformable in form between the retracted form and the protruding form where the inflatable compression body 451 is located closer to the downward direction A1 in the thickness direction A than in the retracted form to more strongly compress the biological surface. When in the retracted form, the inflatable compression body 451 of the present embodiment is located closer to the upward direction A2 in the thickness direction A than the lower surface 412 of the adhesion sheet 414, and when in the protruding form, the inflatable compression body 451 is located closer to the downward direction A1 in the thickness direction A than the lower surface 412 of the adhesion sheet 414. When in the retracted form, the inflatable compression body 451 as the compression portion 450 may be located at the same position as the lower surface 412 of the adhesion sheet 414 in the thickness direction A, or may be located closer to the downward direction A1 than the lower surface 412. FIG. 21A illustrates the retracted form of the inflatable compression body 451. FIG. 21B illustrates the protruding form of the inflatable compression body 451. When the inflatable compression body 451 is changed in form from the retracted form (refer to FIG. 21A) to the protruding form (refer to FIG. 21B), while rotating around the rotational axis D, the inflatable compression body 451 is protrusible further toward the downward direction A1 in the thickness direction A than the lower surface 412 of the adhesion sheet 414. Therefore, in a state where the adhesion sheets 414 adhere to the biological surface, the inflatable compression body 451 can press and compress the biological surface. The inflatable compression body 451 will be described in detail later.

<Pressing Portion 470>

The pressing portion 470 can press the compression portion 450 in one rotational direction around the rotational axis D (refer to FIGS. 21A and 21B). Specifically, in a state where the adhesion sheets 414 as the fixing member 411 are fixed to the biological surface by adhesion, the pressing portion 470 can press the compression portion 450 in a rotational direction around the rotational axis D toward the biological surface (right-handed direction in FIGS. 21A and 21B). The pressing portion 470 of the present embodiment is formed of the inflatable pressing body 471 that is located between the main body portion 410 and the compression portion 450 and is inflatable by supply of a fluid. Specifically, the inflatable pressing body 471 of the present embodiment is located between the bottom portion 433 of the holding main body portion 431 and the inflatable compression body 451. In addition, one end of the inflatable pressing body 471 of the present embodiment is connected to the material hinge 461. The inflatable pressing body 471 will be described in detail later.

<Inflatable Compression Body 451 and Inflatable Pressing Body 471>

The inflatable compression body 451 and the inflatable pressing body 471 of the present embodiment will be described in detail mainly with reference to FIGS. 21A and 21B. As illustrated in FIGS. 21A and 21B, an internal space defined by the inflatable pressing body 471 communicates with a tube 490 as a fluid supply portion. A fluid such as air is supplied through the tube 490 to the internal space of the inflatable pressing body 471 from a fluid supply device to be connected to an inflation port as a connection portion 491 (refer to FIG. 18 and the like) provided in an end portion of the tube 490. Therefore, the inflatable pressing body 471 can be inflated. The fluid supplied to the internal space of the inflatable pressing body 471 is not limited to gas, and may be liquid.

As illustrated in FIGS. 21A and 21B, the internal space defined by the inflatable pressing body 471 and an internal space defined by the inflatable compression body 451 communicate with each other. For this reason, the fluid supplied from the tube 490 as a fluid supply portion is supplied to the internal space of the inflatable compression body 451 through the internal space of the inflatable pressing body 471. Therefore, the inflatable pressing body 471 can be inflated and the inflatable compression body 451 can be inflated. The internal space defined by the inflatable compression body 451 may directly communicate with the tube 490 as a fluid supply portion. Specifically, the tube 490 may include a branch portion having, for example, a Y shape which branches in three directions, and include the connection portion 491 (refer to FIG. 18 and the like) in a first end portion thereof, and may communicate with the internal space, which is defined by the inflatable pressing body 471, through a second end portion thereof and communicate with the internal space, which is defined by the inflatable compression body 451, through a third end portion thereof. In that case, the internal space defined by the inflatable pressing body 471 and the internal space defined by the inflatable compression body 451 may not directly communicate with each other.

When the fluid is supplied from the tube 490, the inflatable pressing body 471 and the inflatable compression body 451 are inflated. The inflation of an upward direction A2 side of the inflatable pressing body 471 is restricted by the bottom portion 433. In addition, the inflation of the inflatable pressing body 471 is restricted by the side wall portion 434 that is located around a direction orthogonal to the thickness direction A. Namely, since the inflatable pressing body 471 is restricted by the bottom portion 433 and the side wall portion 434 of the recessed portion, the inflatable pressing body 471 is inflated to protrude toward the downward direction A1 side.

When the inflatable pressing body 471 is inflated to protrude toward the downward direction A1 side, the inflatable compression body 451 located on a downward direction A1 side of the inflatable pressing body 471 is pressed to the downward direction A1 side by the inflatable pressing body 471. Since the inflatable compression body 451 is supported to be rotatable around the rotational axis D by the hinge portion 460, in the cross-sectional views orthogonal to the rotational axis D illustrated in FIGS. 21A and 21B, the inflatable compression body 451 rotates in the right-handed direction around the rotational axis D. In addition, the inflation of an upward direction A2 side of the inflatable compression body 451 is restricted by the inflatable pressing body 471, and is restricted by the side wall portion 434 located around the direction orthogonal to the thickness direction A. Namely, the inflatable compression body 451 is inflated while rotating, so as to protrude in the right-handed direction around the rotational axis D. For this reason, in a state where the adhesion sheets 414 as the fixing member 411 are fixed to the biological surface by adhesion, the inflatable compression body 451 can press and compress the biological surface toward the right-handed direction around the rotational axis D. In addition, since the inflatable compression body 451 is inflated while following or conforming to the shape of the biological surface, damage to the living body can be suppressed.

As described above (refer to FIGS. 10A and 10B), the inflatable compression body 451 as the compression portion 450 may include an anti-slip portion at a position where the inflatable compression body 451 comes into contact with the biological surface. The anti-slip portion may be formed by using a non-slip material as the forming material of the inflatable compression body 451 in its entirety, or may be formed by forming a part of a surface on the downward direction A1 side of the inflatable compression body 451 as a non-slip member. With such a configuration, the biological surface with which the inflatable compression body 451 as the compression portion 450 is in contact can be compressed to be pressed toward the rotational direction.

In the present embodiment, the size of the inflatable compression body 451 in an inflated state is larger than the size of the inflatable pressing body 471 in an inflated state; however, the size of the inflatable compression body 451 in an inflated state may be smaller than the size of the inflatable pressing body 471 in an inflated state. With such a configuration, the area of the biological surface which is compressed by the inflatable compression body 451 can be further reduced, and thus the compression pressure is more easily increased. The size of the inflatable compression body 451 in an inflated state may be equal to the size of the inflatable pressing body 471 in an inflated state. With such a configuration, the inflatable compression body 451 and the inflatable pressing body 471 can be made of the same member, and thus the types of members required to produce the compression device 401 can be reduced.

The inflatable compression body 451 and the inflatable pressing body 471 may be balloons that are inflated by gas such as air. The forming material of the inflatable compression body 451 and the inflatable pressing body 471 can be the same as that of the inflatable compression body 51 and the inflatable pressing body 71 of the compression device 1 described above.

Sixth Embodiment

Next, a compression device 501 as a sixth embodiment will be described with reference to FIGS. 22 to 25B. The description below will mainly focus on differences in this sixth embodiment relative to the compression device 1 (refer to FIG. 1 and the like) described above. Features that are the same or similar to those described above are identified by the same reference numerals and a detailed description of such features will not be repeated.

Figure 22:
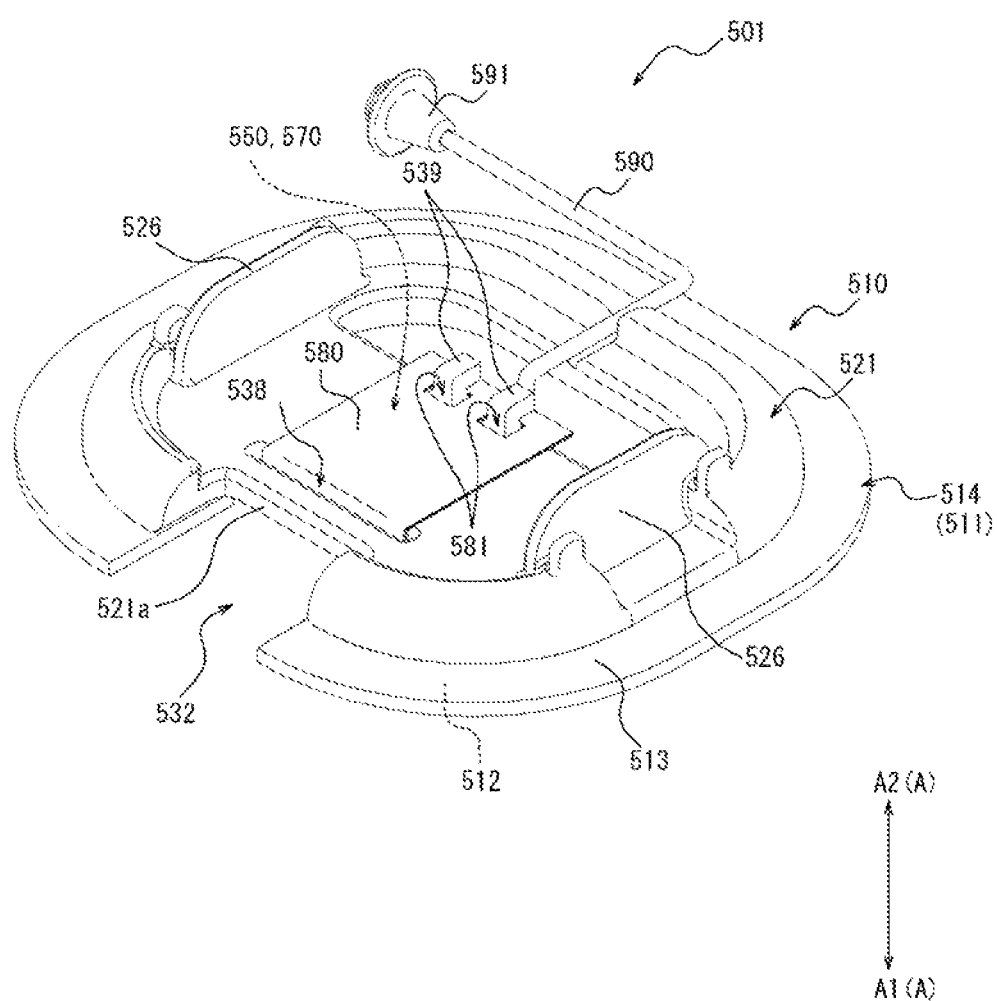
FIG. 22 is a perspective view of a compression device as one embodiment.
Figure 23:
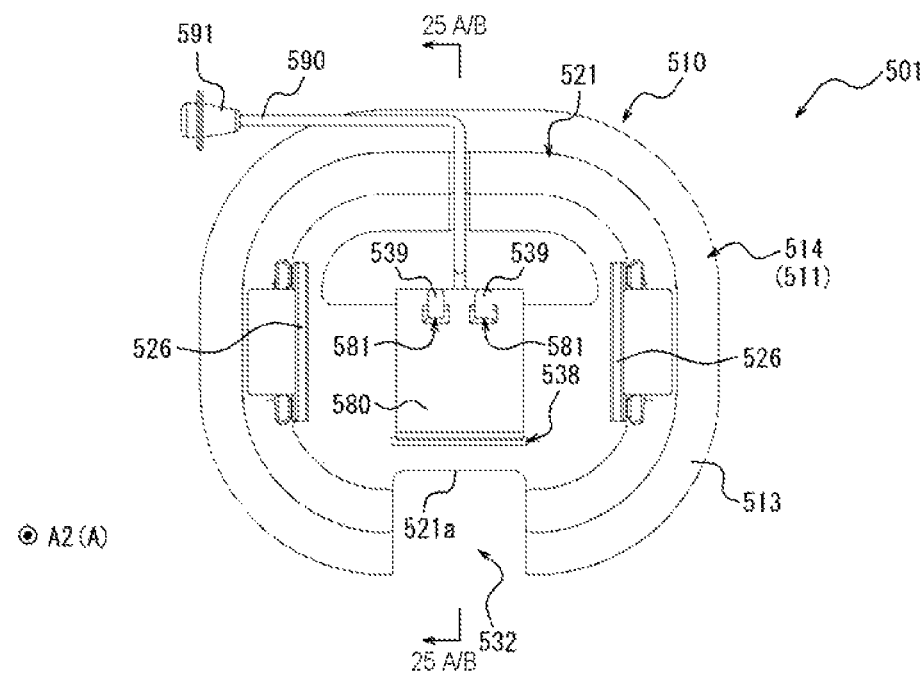
FIG. 23 is atop view of the compression device illustrated in FIG. 22.
Figure 24:
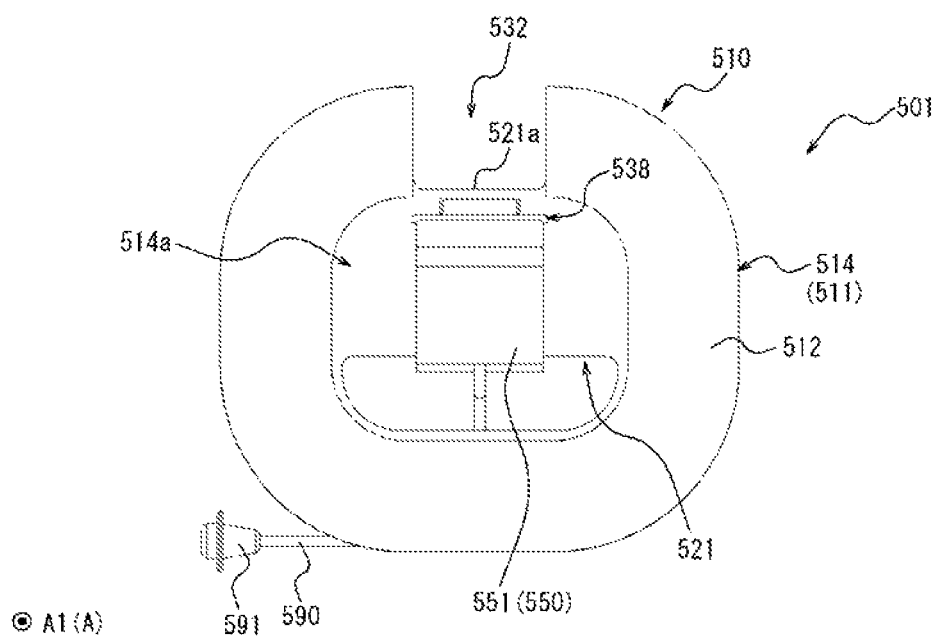
FIG. 24 is a bottom view of the compression device illustrated in FIG. 22.
Figure 25A:
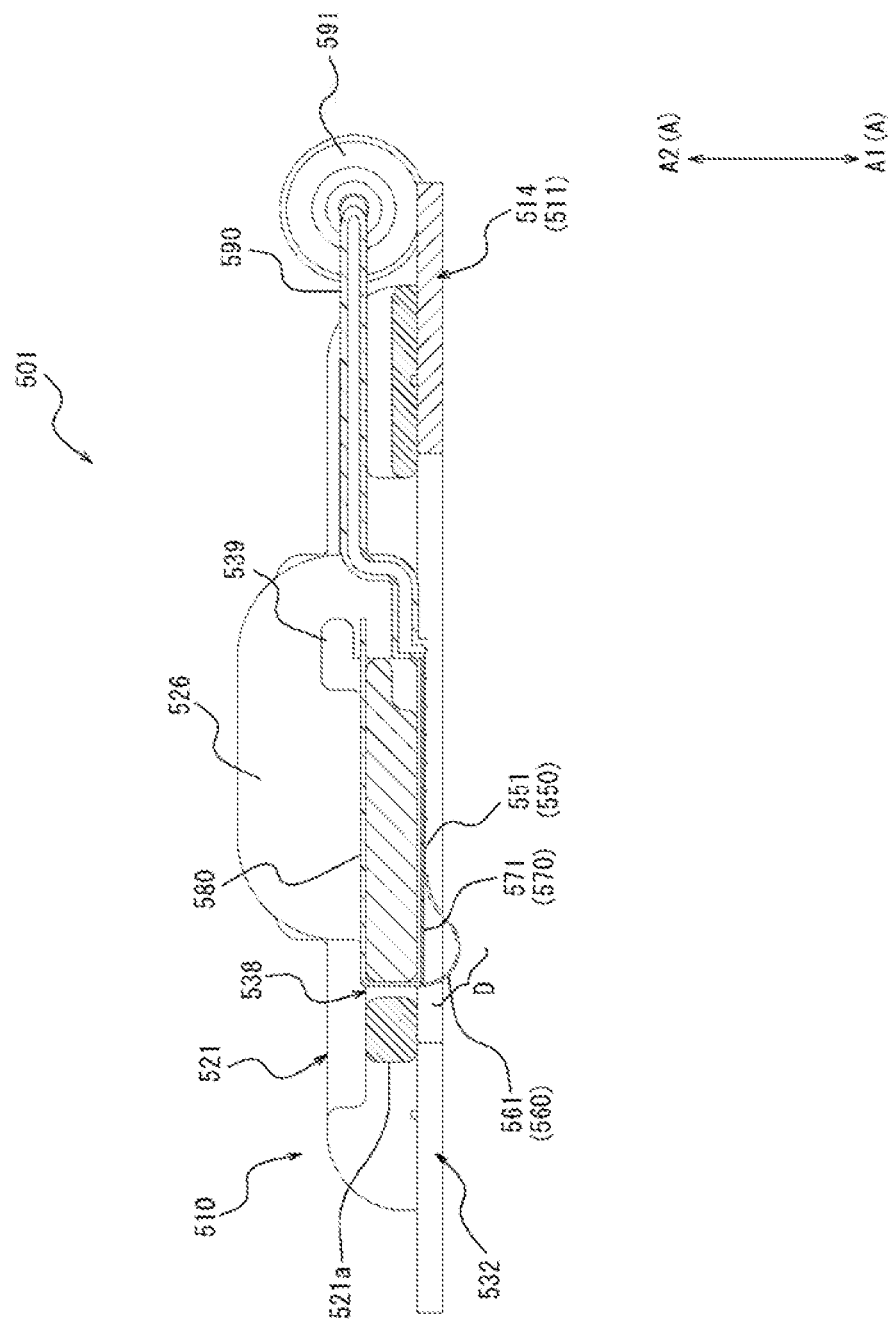
FIG. 25A is a cross-sectional view along the section line 25A/25B of FIG. 23, and is a view illustrating a state where a compression portion is in a retracted form.
Figure 25B:
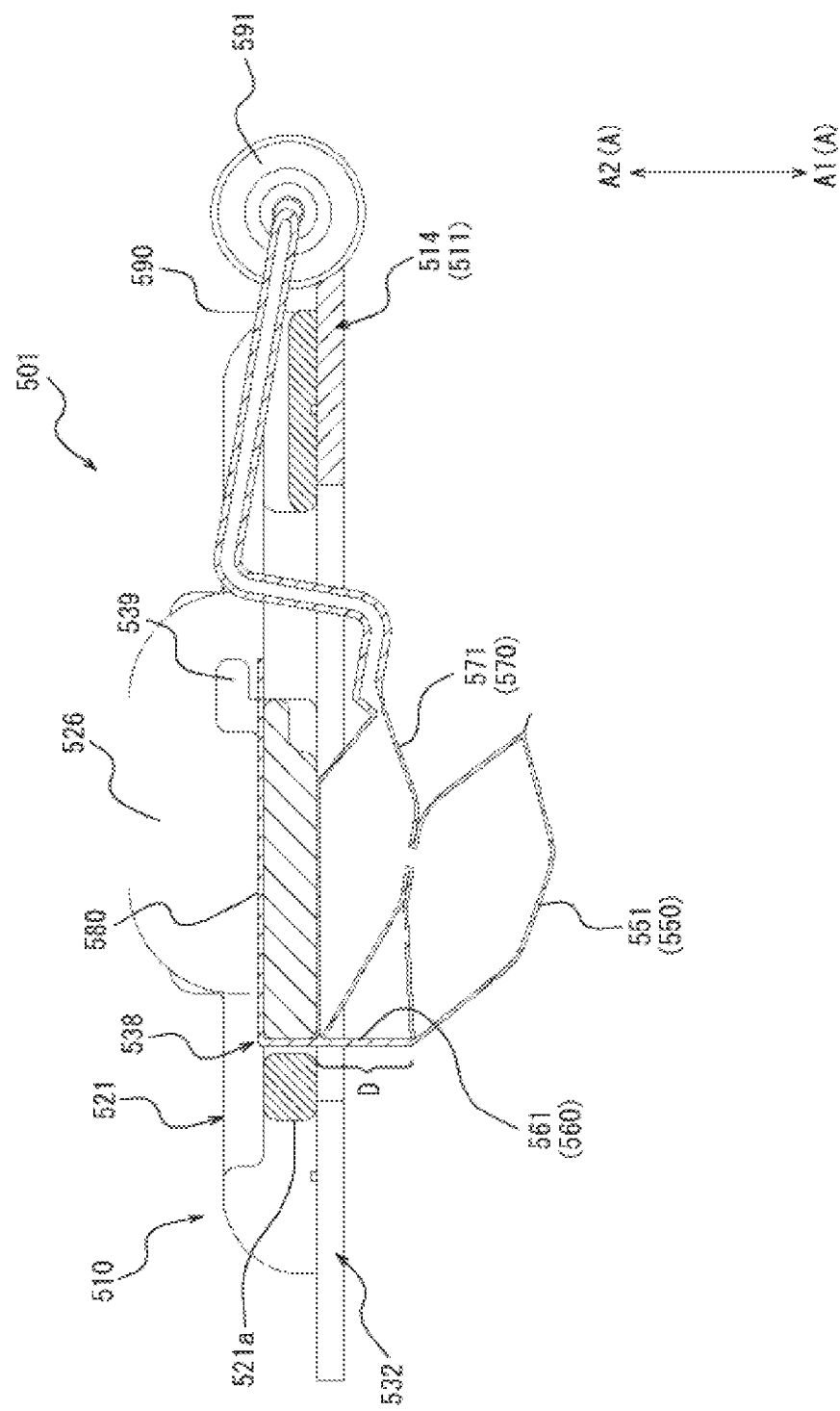
FIG. 25B is a cross-sectional view along the section line 25A/25B of FIG. 23, and is a view illustrating a state where the compression portion is in a protruding form.

FIGS. 22 to 25B are views illustrating the compression device 501 as the sixth embodiment. Specifically, FIG. 22 is a perspective view of the compression device 501. FIGS. 23 and 24 are plan views of the compression device 501. Specifically, FIG. 23 is a top view of the compression device 501. FIG. 24 is a bottom view of the compression device 501. FIGS. 25A and 25B are cross-sectional views along the section line 25A/B-25A/B of FIG. 23. Specifically, FIG. 25A illustrates a state where a compression portion 550 (to be described later) of the compression device 501 is in a retracted form. FIG. 25B illustrates a state where the compression portion 550 (to be described later) of the compression device 501 is in a protruding form.

The compression device 501 includes a main body portion 510, the compression portion 550, a hinge portion 560, and a pressing portion 570. In the present embodiment, the compression portion 550, the hinge portion 560, and the pressing portion 570 are joined and integrated by heat welding or the like.

<Main Body Portion 510>

The main body portion 510 of the present embodiment includes a fixing member 511 that is fixable to a biological surface and a holding member 521 that is mounted on the fixing member 511 to hold the compression portion 550 and the pressing portion 570.

The fixing member 511 of the present embodiment includes a lower surface 512 on the downward direction A1 side, and an upper surface 513 on the upward direction A2 side. The lower surface 512 of the fixing member 511 forms a fixing surface fixable to the biological surface. The fixing member 511 of the present embodiment is formed of an adhesion sheet 514 that is adherable to the biological surface. In a plan view seen along the thickness direction A (refer to FIG. 24), the adhesion sheet 514 of the present embodiment extends in a C shape so as to define a central opening 514a. As illustrated in FIG. 23, an outer edge portion of the holding member 521 is mounted on the upper surface 513 of the adhesion sheet 514 of the present embodiment having a C shape in a plan view. Since the other configuration of the adhesion sheet 514 is the same as the adhesion sheet 14 (refer to FIG. 1 and the like) of the compression device 1 described above, here, a description will not be repeated.

The holding member 521 of the present embodiment has a flat external shape, and is mounted on the upper surface 513 of the adhesion sheet 514 to cross the central opening 514a on an upward direction A2 side of the adhesion sheet 514 as the fixing member 511. In a plan view seen along the thickness direction A (refer to FIG. 23), the holding member 521 of the present embodiment has a substantially quadrilateral external shape of which four corners are chamfered in an arc shape, but is not limited to the shape and may have an oval external shape, a substantially circular external shape, or the like in the same plan view. In addition, as with the holding member 21 (refer to FIG. 1 and the like) of the compression device 1 described above, the holding member 521 of the present embodiment includes a mounting portion and a holding main body portion, but the mounting portion and the holding main body portion are not formed in a distinguishable manner. As with the holding member 21 (refer to FIG. 1 and the like) of the compression device 1 described above, the holding member 521 may be configured to include the mounting portion and the holding main body portion in a distinguishable manner. Furthermore, the holding member 521 of the present embodiment includes a grip portion 526. The grip portion 526 of the present embodiment is formed of a pair of plate-shaped portions that protrude toward the upward direction A2 and are opposite to each other. An operator of the compression device 501, such as a health care worker, can grip the pair of plate-shaped portions as the grip portion 526 in a pinching manner to use the compression device 501.

The holding member 521 of the present embodiment is unlikely to be deformed to follow (conform to) the adhesion sheet 514 that is flexible. For this reason, force applied from the holding member 521 to the adhesion sheet 514 can be suppressed from being unevenly applied to only a part of the adhesion sheet 514, and can be dispersed over a wide range.

The holding member 521 supports the compression portion 550 via the hinge portion 560 so as to be rotatable around the rotational axis D. The holding member 521 of the present embodiment supports also the pressing portion 570 via the hinge portion 560 so as to be rotatable around the rotational axis D. The details will be described later.

In addition, the main body portion 510 of the present embodiment includes a receiving portion 532 that can receive a tubular member puncturing the biological surface. Specifically, the receiving portion 532 of the present embodiment is a recessed portion that is located in a gap between both ends of the adhesion sheet 514 extending in a C shape and is defined by a cutout portion 521a formed in an outer edge of the holding member 521. In a cross-sectional view orthogonal to the rotational axis D (refer to FIGS. 25A and 25B), the receiving portion 532 is located in a direction where the compression portion 550 rotates when the pressing portion 570 presses the compression portion 550 (on the left side in FIGS. 25A and 25B) with respect to the rotational axis D.

A lower surface on the downward direction A1 side of the holding member 521 of the present embodiment is formed of a flat surface substantially orthogonal to the thickness direction A.

The holding member 521 of the present embodiment defines a slit 538 that penetrates through the holding member 521 in the thickness direction A. The slit 538 of the present embodiment extends linearly in a top view (refer to FIG. 23); however, the shape of the slit 538 in a top view is not particularly limited. The slit 538 is formed at a position adjacent to the cutout portion 521a of the holding member 521, the cutout portion 521a defining the recessed portion as the receiving portion 532. In addition, a projection portion 539 that protrudes toward the upward direction A2 is formed on an upper surface on the upward direction A2 side of the holding member 521. In the illustrated embodiment disclosed by way of example, several projection portions 539, two in the illustrated example, protrude toward the upward direction A2 from the an upper surface on the upward direction A2 side of the holding member 521.

The material from which the holding member 521 of the present embodiment may be fabricated can be the same as the material used to fabricate the holding member 21 (refer to FIG. 1 and the like) of the compression device 1 described above.

<Compression Portion 550 and Hinge Portion 560>

The compression portion 550 can compress the biological surface. The hinge portion 560 supports the compression portion 550 so as to be rotatable around the rotational axis D (refer to FIGS. 25A and 25B) with respect to the main body portion 510. Namely, the compression portion 550 rotates around the rotational axis D to be able to compress the biological surface. The compression portion 550 of the present embodiment is formed of an inflatable compression body 551 that is flexible and inflatable by supply of the fluid. The hinge portion 560 of the present embodiment is formed of a material hinge 561 that includes a deformation portion which is flexible, and that is integrally connected to the inflatable compression body 551. The deformation portion of the material hinge 561 is deformably formed, for example, by making the deformation portion thinner than a portion other than the deformation portion in the material hinge 561. In addition, the entirety of the material hinge 561 is formed of the deformation portion.

An extending portion 580 extends from one end on an opposite side of the material hinge 561 from a side where the inflatable compression body 551 is located. The extending portion 580 is a sheet-shaped member that is flexible, and defines a hole portion 581. The extending portion 580 extends from the downward direction A1 side of the holding member 521 to the upward direction A2 side through the slit 538 defined in the holding member 521. More specifically, the extending portion 580 of the present embodiment is connected to the material hinge 561 on the downward direction A1 side of the holding member 521. In addition, the extending portion 580 of the present embodiment is bent along the upper surface of the holding member 521 on the upward direction A2 side of the holding member 521. More specifically, the extending portion 580 extends on the upward direction A2 side of the holding member 521 from the position of the slit 538 along the upper surface of the holding member 521 toward a direction to separate from the receiving portion 532. The projection portion 539 of the holding member 521 is inserted into or passes through the hole portion 581 on the upward direction A2 side of the holding member 521, so that the extending portion 580 of the present embodiment is latched to the holding member 521. Namely, the extending portion 580 of the present embodiment is engaged with the projection portion 539 penetrating through the hole portion 581, so that the extending portion 580 is fixed to the holding member 521. Namely, the hole portion 581 of the extending portion 580 forms a fixing portion fixed to the holding member 521. The fixing portion of the extending portion 580 is not limited to the hole portion 581 that is engaged with the projection portion 539. In addition, the holding member 521 of the present embodiment includes two projection portions 539; however, the number of the projection portions 539 is not particularly limited.

In such a manner, since the material hinge 561 includes the deformation portion that is supported via the extending portion 580 by the main body portion 510 and is deformable, the material hinge 561 supports the inflatable compression body 551 integrally connected to the material hinge 561, so as to be rotatable around the deformation portion. Namely, the deformation portion of the material hinge 561 forms the rotational axis D. The material hinge 561 of the present embodiment is formed of the deformation portion in its entirety, and extends from a position in contact with an edge on the downward direction A1 side of the slit 538 to a position connected to the inflatable compression body 551 and an inflatable pressing body 571 as the pressing portion 570 (to be described later).

In addition, as illustrated in FIG. 25B, the material hinge 561 of the present embodiment extends in a sheet shape from the position in contact with the edge on the downward direction A1 side of the slit 538 toward the downward direction A1 and, unlike the configuration of the material hinge 61 (refer to FIG. 4B) described above, does not branch toward each of the inflatable compression body 551 (refer to FIG. 25B) and the inflatable pressing body 571 (refer to FIG. 25B). In such a manner, the configuration of the material hinge 561 can be appropriately changed and is not particularly limited. The configuration of the hinge portion 560 is appropriately designed to realize a desired compression force toward a desired direction of compression at a desired compression position on the biological surface according to the shape and size of the inflatable compression body 551 during inflation, the inflation direction of the inflatable compression body 551, and the like, and the configuration thereof is not particularly limited.

In a state where a distal end of the inflatable compression body 551 as the compression portion 550 is located in an end portion of the material hinge 561 and the adhesion sheet 514 as the fixing member 511 is fixed to the biological surface by adhesion, the inflatable compression body 551 rotates around the rotational axis D to be deformable in form between the retracted form and the protruding form where the inflatable compression body 551 is located closer to the downward direction A1 in the thickness direction A than in the retracted form to more strongly compress the biological surface. When in the retracted form, the inflatable compression body 551 of the present embodiment is located closer to the downward direction A1 in the thickness direction A than the lower surface 512 of the adhesion sheet 514. When in the retracted form, the inflatable compression body 551 as the compression portion 550 may be located at the same position as the lower surface 512 of the adhesion sheet 514 in the thickness direction A, or may be located closer to the upward direction A2 than the lower surface 512. FIG. 25A illustrates the retracted form of the inflatable compression body 551. FIG. 25B illustrates the protruding form of the inflatable compression body 551. When the inflatable compression body 551 is changed in form from the retracted form (refer to FIG. 25A) to the protruding form (refer to FIG. 25B), while rotating around the rotational axis D, the inflatable compression body 551 is inflated to protrude toward the downward direction A1 in the thickness direction A. Therefore, in a state where the adhesion sheet 514 adheres to the biological surface, the inflatable compression body 551 can press and compress the biological surface. The inflatable compression body 551 will be described in detail later.

<Pressing Portion 570>

The pressing portion 570 can press the compression portion 550 in one rotational direction around the rotational axis D (refer to FIGS. 25A and 25B). Specifically, in a state where the adhesion sheet 514 as the fixing member 511 is fixed to the biological surface by adhesion, the pressing portion 570 can press the compression portion 550 in a rotational direction around the rotational axis D toward the biological surface (clockwise direction in FIGS. 25A and 25B). The pressing portion 570 of the present embodiment is formed of the inflatable pressing body 571 that is located between the main body portion 510 and the compression portion 550 and is inflatable by supply of a fluid. Specifically, the inflatable pressing body 571 of the present embodiment is located between the lower surface of the holding member 521 and the inflatable compression body 551. In addition, one end of the inflatable pressing body 571 of the present embodiment is connected to the material hinge 561. The inflatable pressing body 571 will be described in detail later.

<Inflatable Compression Body 551 and Inflatable Pressing Body 571>

The inflatable compression body 551 and the inflatable pressing body 571 of the present embodiment will be described in detail mainly with reference to FIGS. 25A and 25B. As illustrated in FIGS. 25A and 25B, an internal space defined by the inflatable pressing body 571 communicates with a tube 590 as a fluid supply portion. A fluid such as air is supplied through the tube 590 to the internal space of the inflatable pressing body 571 from a fluid supply device to be connected to an inflation port as a connection portion 591 provided in an end portion of the tube 590. Therefore, the inflatable pressing body 571 can be inflated. The fluid supplied to the internal space of the inflatable pressing body 571 is not limited to gas, and may be liquid.

As illustrated in FIGS. 25A and 25B, the internal space defined by the inflatable pressing body 571 and an internal space defined by the inflatable compression body 551 communicate with each other. For this reason, the fluid supplied from the tube 590 as a fluid supply portion is supplied to the internal space of the inflatable compression body 551 through the internal space of the inflatable pressing body 571. Therefore, the inflatable pressing body 571 can be inflated and the inflatable compression body 551 can be inflated. The internal space defined by the inflatable compression body 551 may directly communicate with the tube 590 as a fluid supply portion. Specifically, the tube 590 may include a branch portion having, for example, a Y shape which branches in three directions, and include the connection portion 591 (refer to FIG. 22) in a first end portion thereof, and may communicate with the internal space, which is defined by the inflatable pressing body 571, through a second end portion thereof and communicate with the internal space, which is defined by the inflatable compression body 551, through a third end portion thereof. In that case, the internal space defined by the inflatable pressing body 571 and the internal space defined by the inflatable compression body 551 may not directly communicate with each other.

When the fluid is supplied from the tube 590, the inflatable pressing body 571 and the inflatable compression body 551 are inflated. The inflation of an upward direction A2 side of the inflatable pressing body 571 is restricted by the lower surface of the holding member 521. Namely, since the inflatable pressing body 571 is restricted by the lower surface of the holding member 521, the inflatable pressing body 571 is inflated to protrude toward the downward direction A1 side.

When the inflatable pressing body 571 is inflated to protrude toward the downward direction A1 side, the inflatable compression body 551 located on a downward direction A1 side of the inflatable pressing body 571 is pressed to the downward direction A1 side by the inflatable pressing body 571. Since the inflatable compression body 551 is supported to be rotatable around the rotational axis D by the hinge portion 560, in the cross-sectional views orthogonal to the rotational axis D illustrated in FIGS. 25A and 25B, the inflatable compression body 551 rotates in the clockwise direction (right-handed direction) around the rotational axis D. In addition, the inflation of an upward direction A2 side of the inflatable compression body 551 is restricted by the inflatable pressing body 571. Namely, the inflatable compression body 551 is inflated while rotating, so as to protrude in the clockwise direction around the rotational axis D. For this reason, in a state where the adhesion sheet 514 as the fixing member 511 are fixed to the biological surface by adhesion, the inflatable compression body 551 can press and compress the biological surface toward the clockwise direction around the rotational axis D. In addition, since the inflatable compression body 551 is inflated while following the shape of the biological surface, damage to a living body can be suppressed.

In addition, the inflatable compression body 551 rotates around an end portion in the downward direction A1 of the material hinge 561. Namely, in the cross-sectional view orthogonal to the rotational axis D illustrated in FIG. 25B, the inflatable compression body 551 rotates further to the downward direction A1 side than the main body portion 510. In addition, in the cross-sectional view orthogonal to the rotational axis D illustrated in FIG. 25B, the inflatable compression body 551 is located on the downward direction A1 side of the main body portion 510. For this reason, the biological surface can be compressed with a stronger force.

The compression device 501 of the present embodiment includes an inflator in which the inflatable compression body 551 as the compression portion 550, the material hinge 561 as the hinge portion 560, the inflatable pressing body 571 as the pressing portion 570, and the extending portion 580 are integrated. As described above, the inflator is mounted on the holding member 521 by using the hole portion 581 of the extending portion 580. In such a manner, the inflatable compression body 551, the material hinge 561, the inflatable pressing body 571, and the extending portion 580 are integrated and mounted on the holding member 521 in a winding manner, and thus the efficiency of the production process can be improved.

As with the compression device 101 (refer to FIGS. 10A and 10B) of the second embodiment described above, the inflatable compression body 551 as the compression portion 550 may include an anti-slip portion at a position where the inflatable compression body 551 comes into contact with the biological surface. The anti-slip portion may be formed by using a non-slip material as the forming material of the inflatable compression body 551 in its entirety, or may be formed by forming a part of a surface on the downward direction A1 side of the inflatable compression body 551 as a non-slip member. With such a configuration, the biological surface with which the inflatable compression body 551 as the compression portion 550 is in contact can be compressed to be pressed toward the rotational direction.

The inflatable compression body 551 and the inflatable pressing body 571 can be balloons that are inflated by gas such as air. The material from which the inflatable compression body 551 and the inflatable pressing body 571 may be fabricated can be the same as of the material forming the inflatable compression body 51 (refer to FIG. 1 and the like) and the inflatable pressing body 71 (refer to FIG. 1 and the like) of the compression device 1 (refer to FIG. 1 and the like) described above.

Seventh Embodiment

Figure 26:
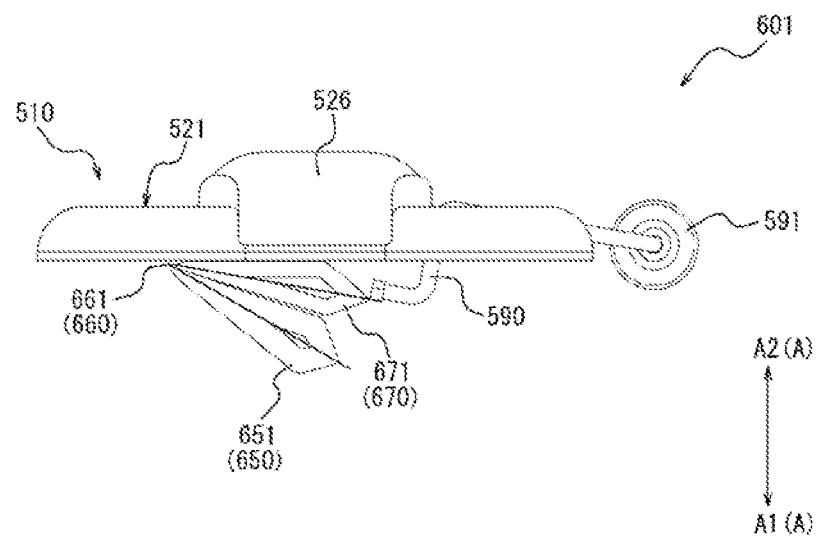
FIG. 26 is a side view of a compression device as one embodiment.

Next, a compression device 601 as a seventh embodiment will be described with reference to FIG. 26. FIG. 26 is a side view of the compression device 601. FIG. 26 illustrates a state where a compression portion 650 (to be described later) of the compression device 601 is in a protruding form. In FIG. 26, for convenience of description, the adhesion sheet 514 (refer to FIG. 22 and the like) as the fixing member 511 of the main body portion 510 is not illustrated. In the compression device 601 illustrated in FIG. 26, an inflatable compression body 651 as the compression portion 650, in comparison to the compression device 501 (refer to FIG. 22 and the like) described above, a material hinge 661 as a hinge portion 660, and an inflatable pressing body 671 as a pressing portion 670 have different shapes and the other configuration is common. Therefore, the description below will mainly focus on differences in this seventh embodiment relative to earlier embodiments and a detailed description of features common to earlier embodiments will not be repeated.

The compression device 601 includes the main body portion 510, the compression portion 650, the hinge portion 660, and the pressing portion 670. In the present embodiment, the compression portion 650, the hinge portion 660, and the pressing portion 670 are joined and integrated by heat welding or the like.

Since the main body portion 510 of the present embodiment is the same as the sixth embodiment described above, here, a description of the main body portion will not be repeated.

The compression portion 650 of the present embodiment is formed of the inflatable compression body 651 that is flexible and inflatable by supply of a fluid. In addition, the pressing portion 670 of the present embodiment is formed of the inflatable pressing body 671 that is located between the main body portion 510 and the compression portion 650 and is inflatable by supply of the fluid. The inflatable compression body 651 of the present embodiment is the same as the inflatable compression body 551 (refer to FIG. 25B and the like) of the sixth embodiment described above. In addition, the inflatable pressing body 671 of the present embodiment is the same as the inflatable pressing body 571 (refer to FIG. 25B and the like) of the sixth embodiment described above. However, the inflatable compression body 551 and the inflatable pressing body 571 of the sixth embodiment described above are configured such that the internal spaces thereof communicate with each other at a position separate from the hinge portion 560, whereas the internal spaces of the inflatable compression body 651 and the inflatable pressing body 671 of the present embodiment communicate with each other at a position adjacent to the hinge portion 660. In such a manner, pressing force to be applied to the inflatable compression body 651 by the inflation of the inflatable pressing body 671 is likely to be applied to the inflatable compression body 651 in the vicinity of the hinge portion 660. For this reason, the inflatable compression body 651 receives the pressing force caused by the inflation of the inflatable pressing body 671, to easily rotate around the hinge portion 660. Namely, since the internal spaces of the inflatable compression body 651 and the inflatable pressing body 671 are configured to communicate with each other at the position adjacent to the hinge portion 660, in comparison to the configuration where the internal spaces communicate with each other at the position separate from the hinge portion, the rotational angle of the inflatable compression body 651 around the hinge portion 660 can be further increased. For this reason, the compression force of the inflatable compression body 651 toward a direction orthogonal to the thickness direction A can be increased. In such a manner, the position where the internal spaces of the inflatable compression body and the inflatable pressing body communicate with each other is adjusted, so that the direction of compression of the inflatable compression body on the biological surface can be controlled to a desired direction.

In addition, the hinge portion 660 of the present embodiment is formed of the material hinge 661 that includes a deformation portion which is flexible, and that is integrally connected to the inflatable compression body 651 and the inflatable pressing body 671. The material hinge 661 as the hinge portion 660 of the present embodiment is formed of only the deformation portion. Specifically, the material hinge 661 of the present embodiment is formed of only the rotational axis D formed of a portion in contact with the edge on the downward direction A1 side of the slit 538 of the holding member 521 of the main body portion 510. In other words, in comparison to the deformation portion of the material hinge 561 (refer to FIG. 25B and the like) of the sixth embodiment described above, the deformation portion of the material hinge 661 of the present embodiment includes a shorter portion extending from the lower surface of the holding member 521 of the main body portion 510 to the downward direction A1 side. More specifically, the deformation portion of the material hinge 661 of the present embodiment does not extend from the lower surface of the holding member 521 of the main body portion 510 to the downward direction A1 side. In such a manner, the length of the deformation portion of the material hinge 661 which extends from the lower surface of the holding member 521 to the downward direction A1 may be shortened. In such a manner, the inflatable compression body 651 and the inflatable pressing body 671 during inflation are likely to interfere with each other. Namely, the pressing force caused by the inflation of the inflatable pressing body 671 is more likely to be applied to the inflatable compression body 651. In other words, the compression force of the inflatable compression body on the biological surface can be controlled to a desired magnitude.

As described above, the position where the internal spaces of the inflatable compression body 651 and the inflatable pressing body 671 communicate with each other and the length of the deformation portion of the material hinge 661 are adjusted, so that the compression force or the direction of compression of the inflatable compression body 651 on the biological surface can be controlled. Furthermore, the shapes of the inflatable compression body 651 and the inflatable pressing body 671 during inflation, or the like may be changed to control the compression force or the direction of compression of the inflatable compression body 651 on the biological surface.

Furthermore, the extending portion 580 extends from the material hinge 661 of the present embodiment to the upward direction A2. Since the configuration of the extending portion 580 is the same as the sixth embodiment described above, here, a description will be omitted.

Eighth Embodiment

Figure 27:
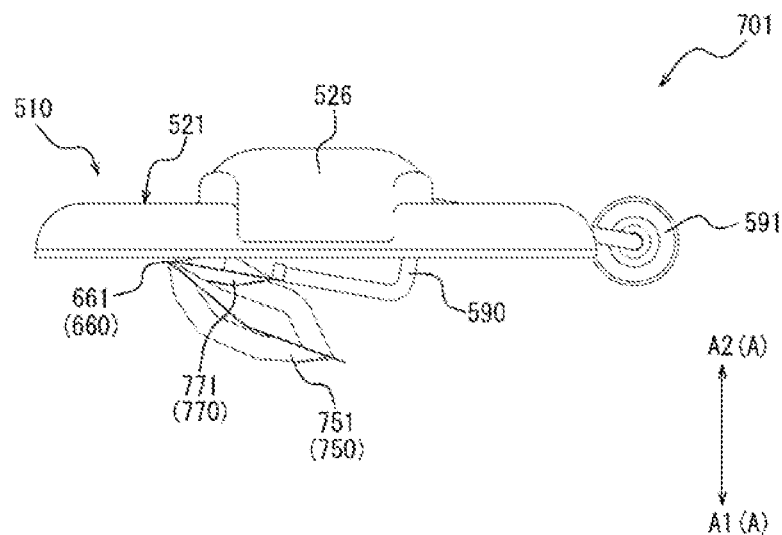
FIG. 27 is a side view of a compression device as one embodiment.

Next, a compression device 701 as an eighth embodiment will be described with reference to FIG. 27. FIG. 27 is a side view of the compression device 701. FIG. 27 illustrates a state where a compression portion 750 (to be described later) of the compression device 701 is in a protruding form. In FIG. 27, for convenience of description, the adhesion sheet 514 (refer to FIG. 22 and the like) as the fixing member 511 of the main body portion 510 is unillustrated. In the compression device 701 illustrated in FIG. 27, in comparison to the compression device 601 (refer to FIG. 26 and the like) described above, an inflatable compression body 751 as the compression portion 750 and an inflatable pressing body 771 as a pressing portion 770 have different sizes and shapes and the other configuration is common. Therefore, the description below will mainly focus on differences in this eighth embodiment relative to earlier embodiments and a detailed description of features common to earlier embodiments will not be repeated.

The compression device 701 includes the main body portion 510, the compression portion 750, the hinge portion 660, and the pressing portion 770. In the present embodiment, the compression portion 750, the hinge portion 660, and the pressing portion 770 are joined and integrated by heat welding or the like.

Since the main body portion 510 and the hinge portion 660 of the present embodiment are the same as the seventh embodiment described above, a detailed description of such features will not be repeated.

The compression portion 750 of the present embodiment is formed of the inflatable compression body 751 that is flexible and inflatable by supply of a fluid. In addition, the pressing portion 770 of the present embodiment is formed of the inflatable pressing body 771 that is located between the main body portion 510 and the compression portion 750 and is inflatable by supply of the fluid. The inflatable compression body 651 (refer to FIG. 26) and the inflatable pressing body 671 (refer to FIG. 26) of the seventh embodiment described above are configured to be substantially equal in size to each other during inflation and to entirely overlap each other in the thickness direction A, whereas the inflatable compression body 751 and the inflatable pressing body 771 of the present embodiment differ in size from each other during inflation and partially overlap each other in the thickness direction A. In such a manner, in comparison to the above-described configuration of the seventh embodiment, pressing force to be applied to the inflatable compression body 751 by the inflation of the inflatable pressing body 771 is more likely to be applied to only a part of the inflatable compression body 751.

More specifically, the inflatable pressing body 771 of the present embodiment is smaller than the inflatable compression body 751. In addition, the inflatable pressing body 771 of the present embodiment overlaps the inflatable compression body 751 in the thickness direction A only on a hinge portion 660 side, and does not overlap the inflatable compression body 751 in the thickness direction A on a side (on the right side in FIG. 27) opposite to the hinge portion 660 side. In such a manner, in comparison to the above-described configuration of the seventh embodiment, the pressing force to be applied to the inflatable compression body 751 by the inflation of the inflatable pressing body 771 is applied to the inflatable compression body 751 only at a local position on the hinge portion 660 side. For this reason, the inflatable compression body 751 receives the pressing force caused by the inflation of the inflatable pressing body 771, to be likely to be curved, so that a surface on the downward direction A1 side of the inflatable compression body 751 is likely to be a projecting curved surface. Namely, the inflatable compression body 751 is curved to follow (conform to) the biological surface, so that a wider range on the biological surface can be compressed.

Furthermore, the inflatable pressing body 771 of the present embodiment overlaps the inflatable compression body 751 in the thickness direction A only on the hinge portion 660 side; however, the inflatable pressing body may overlap the inflatable compression body 751 in the thickness direction A only on the side (on the right side in FIG. 27) opposite to the hinge portion 660 side. As described above, it is preferable that the inflatable pressing body 771 overlaps the inflatable compression body 751 in the thickness direction A only on the hinge portion 660 side such that the surface on the downward direction A1 side of the inflatable compression body 751 is a projecting curved surface.

Similar to the seventh embodiment described above, the inflatable compression body 751 and the inflatable pressing body 771 of the present embodiment are configured such that the internal spaces thereof communicate with each other at a position adjacent to the hinge portion 660; however, the position where the internal spaces communicate with each other is not limited to the vicinity of the hinge portion 660. Therefore, as in the first embodiment described above, the inflatable compression body 751 and the inflatable pressing body 771 may be configured such that the internal spaces thereof communicate with each other at a position separate from the hinge portion 660.

Ninth Embodiment

Figure 28:
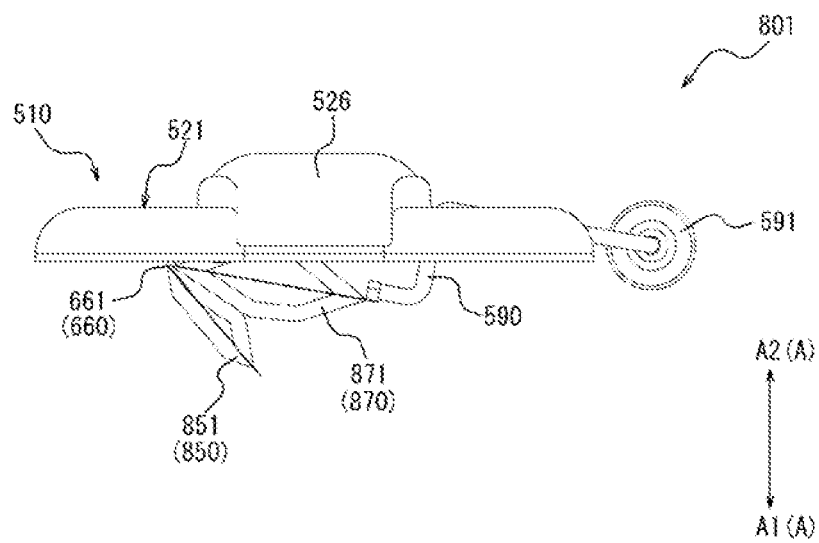
FIG. 28 is a side view of a compression device as one embodiment.

Next, a compression device 801 as a ninth embodiment will be described with reference to FIG. 28. FIG. 28 is a side view of the compression device 801. FIG. 28 illustrates a state where a compression portion 850 (to be described later) of the compression device 801 is in a protruding form. In FIG. 28, for convenience of description, the adhesion sheet 514 (refer to FIG. 22 and the like) as the fixing member 511 of the main body portion 510 is unillustrated. In the compression device 801 illustrated in FIG. 28, in comparison to the compression device 701 (refer to FIG. 27) described above, an inflatable compression body 851 as the compression portion 850 and an inflatable pressing body 871 as a pressing portion 870 have different sizes and shapes and the other configuration is common. Therefore, here, the above-described point of difference will be mainly described and a description of the common configuration will not be repeated.

The compression device 801 includes the main body portion 510, the compression portion 850, the hinge portion 660, and the pressing portion 870. In the present embodiment, the compression portion 850, the hinge portion 660, and the pressing portion 870 are joined and integrated by heat welding or the like.

Since the main body portion 510 and the hinge portion 660 of the present embodiment are the same as the eighth embodiment described above, here, a detailed description of such features will not be repeated.

The compression portion 850 of the present embodiment is formed of the inflatable compression body 851 that is flexible and inflatable by supply of a fluid. In addition, the pressing portion 870 of the present embodiment is formed of the inflatable pressing body 871 that is located between the main body portion 510 and the compression portion 850 and is inflatable by supply of the fluid. In the eighth embodiment described above, the size of the inflatable compression body 751 (refer to FIG. 27) during inflation is larger than the size of the inflatable pressing body 771 (refer to FIG. 27) during inflation; however, in the present embodiment, the size of the inflatable compression body 851 during inflation is smaller than the size of the inflatable pressing body 871 during inflation. With such a size relationship, similar to the eighth embodiment described above, the inflatable compression body 851 and the inflatable pressing body 871 overlap each other in the thickness direction A only on a hinge portion 660 side. In such a manner, a compression region on a biological surface, which is compressed by the inflatable compression body 851, is reduced, so that high local compression force can be realized.

In such a manner, the size relationship between the inflatable compression body 851 and the inflatable pressing body 871 can be appropriately set according to the size of a region to be compressed on the biological surface, a desired compression force, or the like.

Similar to the eighth embodiment described above, the inflatable compression body 851 and the inflatable pressing body 871 of the present embodiment are configured such that the internal spaces thereof communicate with each other at a position adjacent to the hinge portion 660; however, the position where the internal spaces communicate with each other is not limited to the vicinity of the hinge portion 660. Therefore, as in the first embodiment described above, the inflatable compression body 851 and the inflatable pressing body 871 may be configured such that the internal spaces thereof communicate with each other at a position separate from the hinge portion 660.

Tenth Embodiment

Figure 29:
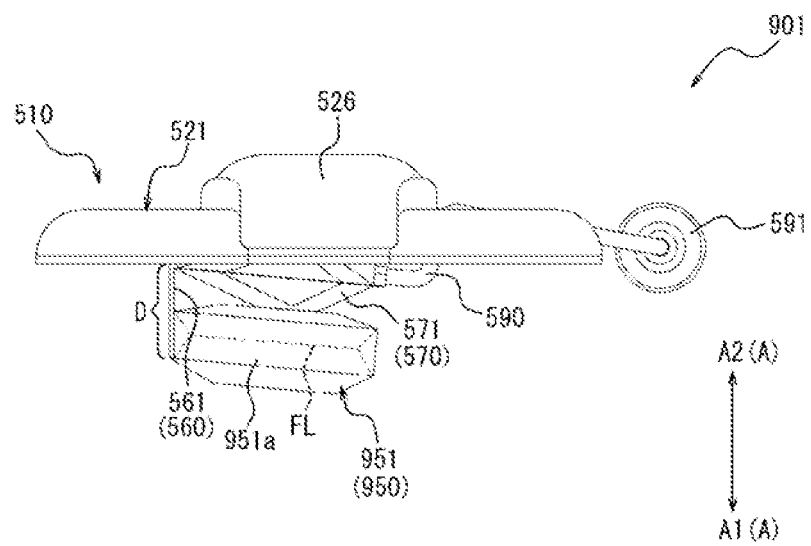
FIG. 29 is a side view of a compression device as one embodiment.

Next, a compression device 901 as a tenth embodiment will be described with reference to FIG. 29. FIG. 29 is a side view of the compression device 901. FIG. 29 illustrates a state where a compression portion 950 (to be described later) of the compression device 901 is in a protruding form. In FIG. 29, for convenience of description, the adhesion sheet 514 (refer to FIG. 22 and the like) as the fixing member 511 of the main body portion 510 is unillustrated. In the compression device 901 illustrated in FIG. 29, in comparison to the compression device 501 (refer to FIG. 25B and the like) described above, an inflatable compression body 951 as the compression portion 950 has a different shape and the other configuration is common. Therefore, the description below will mainly focus on differences in this tenth embodiment relative to earlier embodiments and a detailed description of features common to earlier embodiments will not be repeated.

The compression device 901 includes the main body portion 510, the compression portion 950, the hinge portion 560, and the pressing portion 570. In the present embodiment, the compression portion 950, the hinge portion 560, and the pressing portion 570 are joined and integrated by heat welding or the like.

Since the main body portion 510, the hinge portion 560, and the pressing portion 570 of the present embodiment are the same as the sixth embodiment described above, a detailed description of such features will not be repeated.

The compression portion 950 of the present embodiment is formed of the inflatable compression body 951 that is flexible and inflatable by supply of a fluid. The inflatable compression body 551 (refer to FIG. 25B and the like) as the compression portion 550 of the sixth embodiment described above has a configuration where the periphery is heat-welded and only a central region is inflatable in the thickness direction A; however, in the inflatable compression body 951 as the compression portion 950 of the present embodiment, not only a central region but also an outer wall in a direction orthogonal to the thickness direction A extends in the thickness direction A during inflation. Specifically, the inflatable compression body 951 as the compression portion 950 of the present embodiment includes a deformation side wall (deformable side wall) 951*a* which is folded in a retracted form and extends or expands in the thickness direction A during inflation from the retracted form to the protruding form (refer to FIG. 29), as a side wall in the direction orthogonal to the thickness direction A. For this reason, when the fluid flows into an internal space of the inflatable compression body 951, the inflatable compression body 951 is inflated from the state of a sheet shape to the state of a substantially quadrangular prism shape since the deformation side wall 951*a* extends or expands. In such a manner, the compression portion 950 that is brought into the state of a substantially quadrangular prism shape during inflation is used, and thus a surface of the inflatable compression body 951 becomes flat, the surface coming into contact with a biological surface, so that a wider range of a flat site on the biological surface can be pressed. In FIG. 29, a fold line FL of the deformation side wall 951*a* is indicated by a dotted line.

As long as the deformation side wall 951*a* is configured to extend in the thickness direction A when the compression portion 950 is changed from the retracted form to the protruding form, the deformation side wall 951*a* is not particularly limited. Therefore, the deformation side wall 951*a* may have, for example, a bellows-fold structure or a double-fold structure, or may adopt another extending mechanism.

Similar to the sixth embodiment described above, the inflatable compression body 951 and the inflatable pressing body 571 of the present embodiment are configured such that the internal spaces thereof communicate with each other at a position separate from the hinge portion 560; however, the position where the internal spaces communicate with each other may be a position adjacent to the hinge portion 560.

Figure 30:
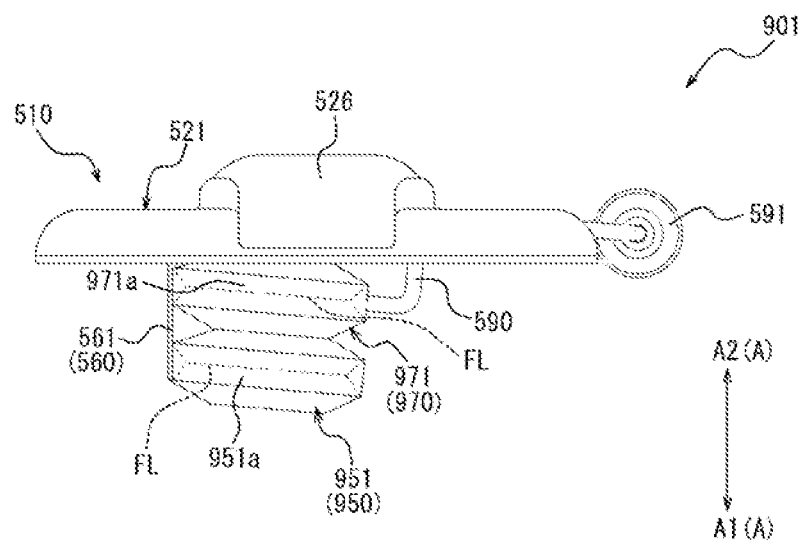
FIG. 30 is a view illustrating a modification example of the compression device in FIG. 29.

FIG. 30 illustrates a configuration where the inflatable compression body 951 as the compression portion 950 is provided with the deformation side wall (deformable side wall) 951*a* and an inflatable pressing body 971 as a pressing portion 970 is also provided with a deformation side wall (deformable side wall) 971a which is similar. In FIG. 30, for convenience of description, the adhesion sheet 514 (refer to FIG. 22 and the like) as the fixing member 511 of the main body portion 510 is unillustrated. As illustrated in FIG. 30, not only the inflatable compression body 951 as the compression portion 950 but also the inflatable pressing body 971 as the pressing portion 970 may be provided with the deformation side wall 971a that extends in the thickness direction A during inflation from the retracted form to the protruding form. In FIG. 30, the fold line FL of the deformation side walls 951a and 971a is indicated by dotted lines.

Eleventh Embodiment

Figure 31:
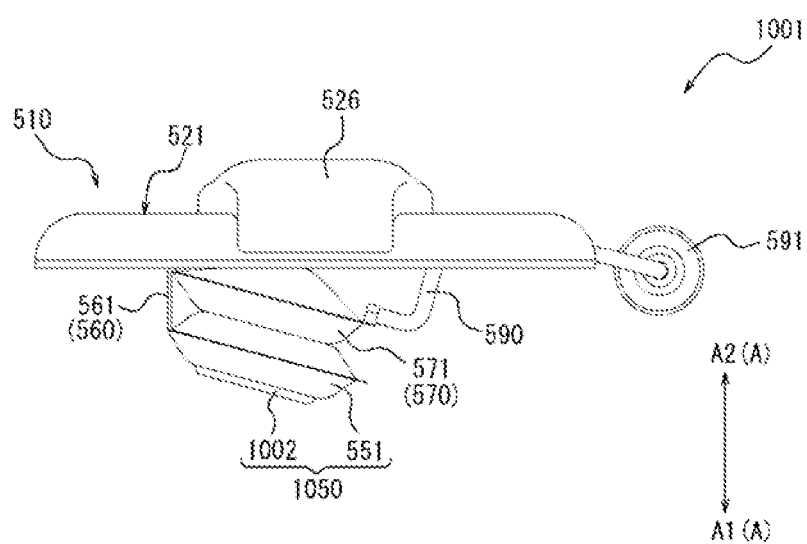
FIG. 31 is a side view of a compression device as one embodiment.

Next, a compression device 1001 as an eleventh embodiment will be described with reference to FIG. 31. FIG. 31 is a side view of the compression device 1001. FIG. 31 illustrates a state where a compression portion 1050 (to be described later) of the compression device 1001 is in a protruding form. In FIG. 31, for convenience of description, the adhesion sheet 514 (refer to FIG. 22 and the like) as the fixing member 511 of the main body portion 510 is unillustrated. In comparison to the compression device 501 (refer to FIG. 25B and the like) described above, the compression device 1001 illustrated in FIG. 31 differs in that the compression portion 1050 is formed of the inflatable compression body 551 and a plate-shaped member 1002, and the other configuration is common. Therefore, the description below will mainly focus on differences in this eleventh embodiment relative to earlier embodiments and a detailed description of features common to earlier embodiments will not be repeated.

The compression device 1001 includes the main body portion 510, the compression portion 1050, the hinge portion 560, and the pressing portion 570. In the present embodiment, the compression portion 1050, the hinge portion 560, and the pressing portion 570 are joined and integrated by heat welding or the like.

Since the main body portion 510, the hinge portion 560, and the pressing portion 570 of the present embodiment are the same as the sixth embodiment described above, a detailed description of such features will not be repeated.

The compression portion 1050 of the present embodiment is formed of the inflatable compression body 551 that is flexible and inflatable by supply of a fluid, and the plate-shaped member 1002 that is mounted on a surface on the downward direction A1 side of the inflatable compression body 551. The plate-shaped member 1002 may be configured to be harder than the inflatable compression body 551 and to be unlikely to be deformed even by the inflation of the inflatable compression body 551. Therefore, when the inflatable compression body 551 is formed of a balloon made of resin, the plate-shaped member 1002 can be made of, for example, resin having a larger tensile modulus of elasticity than that of the resin forming the balloon as the inflatable compression body 551. The material of the plate-shaped member 1002 is not particularly limited and as one example, polycarbonate can be used. Since the plate-shaped member 1002 described above is used, even if the deformation side wall (deformable side wall) 951a (refer to FIG. 29) of the compression portion 950 (refer to FIG. 29) of the tenth embodiment described above is not provided, the surface on the downward direction A1 side of the inflatable compression body 551 can become flat during inflation. The inflatable compression body 551 of the compression portion 1050 of the present embodiment may be configured to include the deformation side wall (deformable side wall) 951a (refer to FIG. 29) described above.

In addition, similar to the sixth embodiment described above, the inflatable compression body 551 and the inflatable pressing body 571 of the present embodiment are configured such that the internal spaces thereof communicate with each other at a position separate from the hinge portion 560; however, the position where the internal spaces communicate with each other may be a position adjacent to the hinge portion 560.

Twelfth Embodiment

Figure 32A:
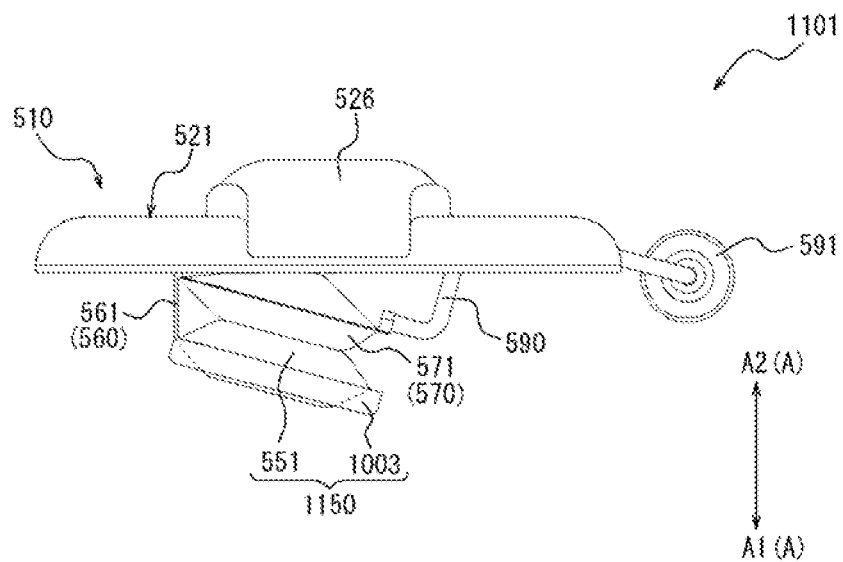
FIG. 32A is a side view of a compression device as one embodiment.
Figure 32B:
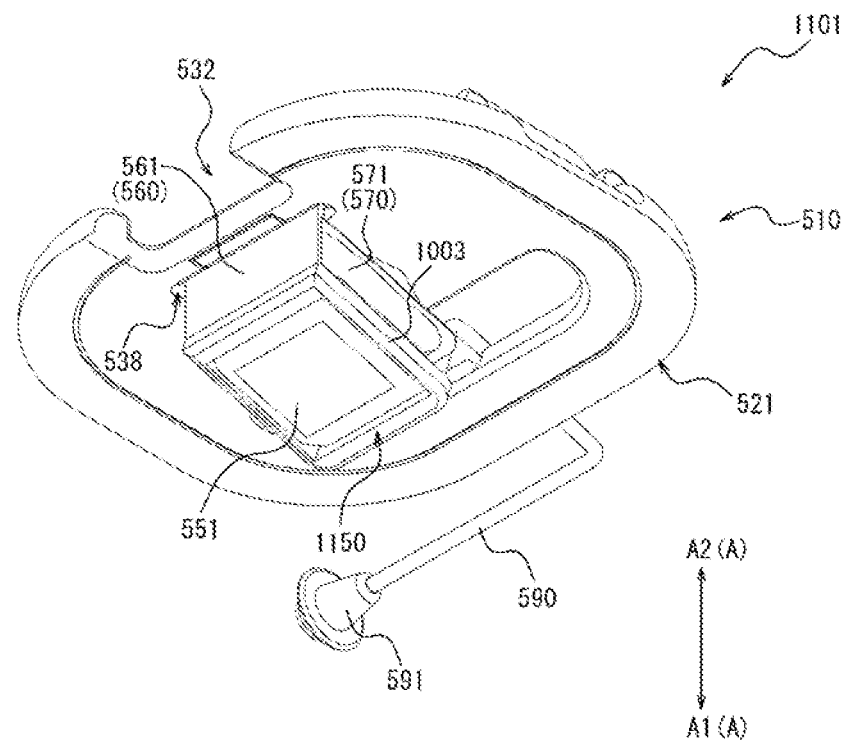
FIG. 32B is a perspective view of the compression device illustrated in FIG. 32A as seen from a lower surface side.

Next, a compression device 1101 as a twelfth embodiment will be described with reference to FIGS. 32A and 32B. FIG. 32A is a side view of the compression device 1101. FIG. 32A illustrates a state where a compression portion 1150 (to be described later) of the compression device 1101 is in a protruding form. FIG. 32B is a view of the compression portion 1150 of the compression device 1101 illustrated in FIG. 32A as seen from a lower surface side. In FIGS. 32A and 32B, for convenience of description, the adhesion sheet 514 (refer to FIG. 22 and the like) as the fixing member 511 of the main body portion 510 is unillustrated. In comparison to the compression device 501 (refer to FIG. 25B and the like) described above, the compression device 1101 illustrated in FIGS. 32A and 32B differs in that the compression portion 1150 is formed of the inflatable compression body 551 and a peripheral frame portion 1003, and the other configuration is common. Therefore, the description below will mainly focus on differences in this twelfth embodiment relative to earlier embodiments and a detailed description of features common to earlier embodiments will not be repeated.

The compression device 1101 includes the main body portion 510, the compression portion 1150, the hinge portion 560, and the pressing portion 570. In the present embodiment, the compression portion 1150, the hinge portion 560, and the pressing portion 570 are joined and integrated by heat welding or the like.

Since the main body portion 510, the hinge portion 560, and the pressing portion 570 of the present embodiment are the same as the sixth embodiment described above, here, a detailed description of such features will not be repeated.

The compression portion 1150 of the present embodiment is formed of the inflatable compression body 551 that is flexible and inflatable by supply of a fluid, and the peripheral frame portion 1003 that is mounted on an outer edge portion of a surface on the downward direction A1 side of the inflatable compression body 551. The inflatable compression body 551 has a configuration where the periphery in a direction orthogonal to the thickness direction A is heat-welded and only a central region is inflatable in the thickness direction A. For this reason, an outer edge portion of the inflatable compression body 551 in the direction orthogonal to the thickness direction A is not inflated in the thickness direction A to be unable to compress a biological surface. The peripheral frame portion 1003 of the present embodiment is formed of a frame body that is mounted on the surface on the downward direction A1 side of the inflatable compression body 551 at the position of the outer edge portion that is not to be inflated in the thickness direction A. The frame body as the peripheral frame portion 1003 may be configured to be harder than the inflatable compression body 551 and to be unlikely to be deformed even by the inflation of the inflatable compression body 551. Since the peripheral frame portion 1003 described above is provided, the compression force of the inflatable compression body 551 is further dispersed by the peripheral frame portion 1003. For this reason, the outer edge portion of the inflatable compression body 551, which is not to be inflated in the thickness direction A, can compress the biological surface via the peripheral frame portion 1003. Namely, even if the inflatable compression body 551 that partially includes portions which are not to be inflated in the thickness direction A is used, since the peripheral frame portion 1003 is provided, the range of the biological surface which can be compressed by the compression portion 1150 can be increased.

The peripheral frame portion 1003 may be configured to be harder than the inflatable compression body 551 and to be unlikely to be deformed even by the inflation of the inflatable compression body 551. Therefore, when the inflatable compression body 551 is formed of a balloon made of resin, the peripheral frame portion 1003 can be made of, for example, resin having a larger tensile modulus of elasticity than that of the resin forming the balloon as the inflatable compression body 551. The material of the peripheral frame portion 1003 is not particularly limited and as one example, polycarbonate can be used.

In addition, similar to the sixth embodiment described above, the inflatable compression body 551 and the inflatable pressing body 571 of the present embodiment are configured such that the internal spaces thereof communicate with each other at a position separate from the hinge portion 560; however, the position where the internal spaces communicate with each other may be a position adjacent to the hinge portion 560.

Thirteenth Embodiment

Figure 33:
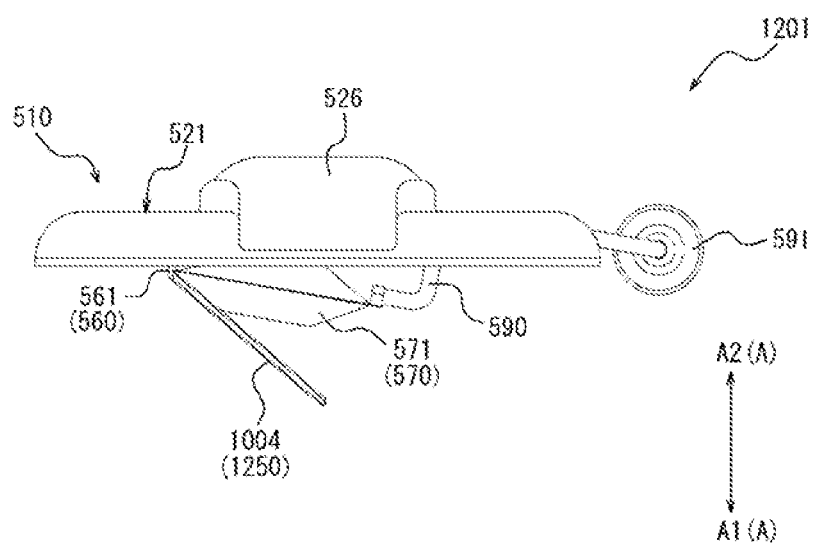
FIG. 33 is a side view of a compression device as one embodiment.

Next, a compression device 1201 as a thirteenth embodiment will be described with reference to FIG. 33. FIG. 33 is a side view of the compression device 1201. FIG. 33 illustrates a state where a compression portion 1250 (to be described later) of the compression device 1201 is in a protruding form. In FIG. 33, for convenience of description, the adhesion sheet 514 (refer to FIG. 22 and the like) as the fixing member 511 of the main body portion 510 is unillustrated. In comparison to the compression device 501 (refer to FIG. 25B and the like) described above, the compression device 1201 illustrated in FIG. 33 differs in that the compression portion 1250 is formed of a plate-shaped member 1004, and the other configuration is common. Therefore, the description below will mainly focus on differences in this thirteenth embodiment relative to earlier embodiments and a detailed description of features common to earlier embodiments will not be repeated.

The compression device 1201 includes the main body portion 510, the compression portion 1250, the hinge portion 560, and the pressing portion 570.

Since the main body portion 510, the hinge portion 560, and the pressing portion 570 of the present embodiment are the same as the sixth embodiment described above, a detailed description of such features will not be repeated.

The compression portion 1250 of the present embodiment is formed of the plate-shaped member 1004 that is rotatable around the hinge portion 560. The compression portion 1250 of the present embodiment may be integrated with or separated from the pressing portion 570. Namely, in addition to the extending portion 580 to which the plate-shaped member 1004 as the compression portion 1250 is connected, an extending portion to which the inflatable pressing body 571 as the pressing portion 570 is connected may be separately provided. In addition, the inflatable pressing body 571 as the pressing portion 570 may be connected to and integrated with the extending portion 580 to which the plate-shaped member 1004 as the compression portion 1250 is connected. In such integration, for example, a sheet portion that is flexible and made of, for example, polyvinyl chloride may extend from the inflatable pressing body 571 as the pressing portion 570, and the plate-shaped member 1004 may be joined onto the sheet portion.

The plate-shaped member 1004 may be configured to be harder than the inflatable pressing body 571 and to be unlikely to be deformed even by pressing force from the inflatable pressing body 571. Therefore, when the inflatable pressing body 571 is formed of a balloon made of resin, the plate-shaped member 1004 can be made of, for example, resin having a larger tensile modulus of elasticity than that of the resin forming the balloon as the inflatable pressing body 571. The material of the plate-shaped member 1004 is not particularly limited and as one example, polycarbonate can be used.

Figure 34:
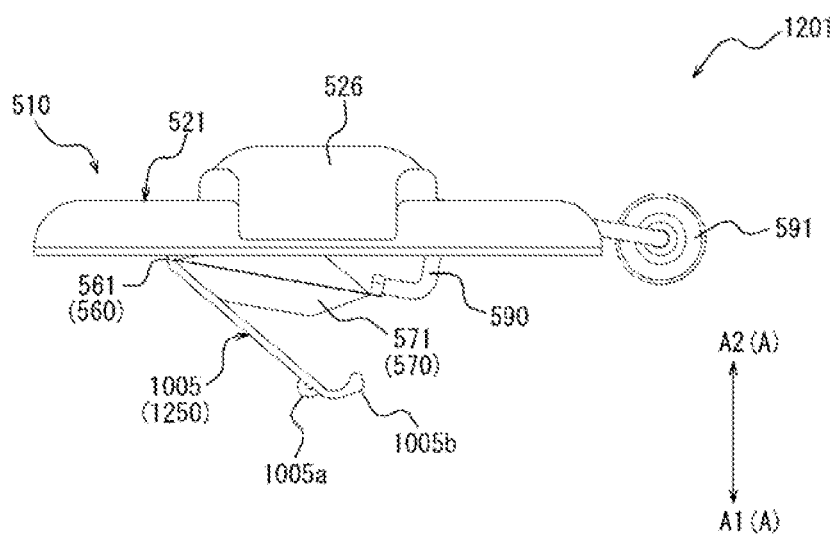
FIG. 34 is a view of a modification example of the compression device depicted in FIG. 33.

FIG. 34 is a view illustrating a plate-shaped member 1005 as a modification example of the plate-shaped member 1004 illustrated in FIG. 33. As illustrated in FIG. 34, the plate-shaped member 1005 may include one or more protruding portions 1005a on a surface on the downward direction A1 side which comes into contact with a biological surface, so as to be able to locally compress a part on the biological surface. The size, number, and shape of the protruding portions 1005a are not particularly limited. Furthermore, as illustrated in FIG. 34, it is preferable that a bent portion 1005b bent toward the upward direction A2 side is formed in an end portion on an opposite side of the plate-shaped member 1005 from a hinge portion 560 side. It is preferable that the bent portion 1005b is a curved surface projecting to the downward direction A1 side. In such a manner, the end portion on the opposite side of the plate-shaped member 1005 from the hinge portion 560 side can be suppressed from locally coming into contact with the biological surface at high pressure. Therefore, a pain of a patient can be reduced.

The compression device and the compression method according to the present disclosure are not limited to the specific configurations and steps described in the above embodiments, and various modifications and changes can be made without departing from the concept of the present disclosure. For example, also a compression device that is configured by appropriately combining the components illustrated in the above-described first to thirteenth embodiments belongs to the technical scope of the present disclosure.

Figure 35:
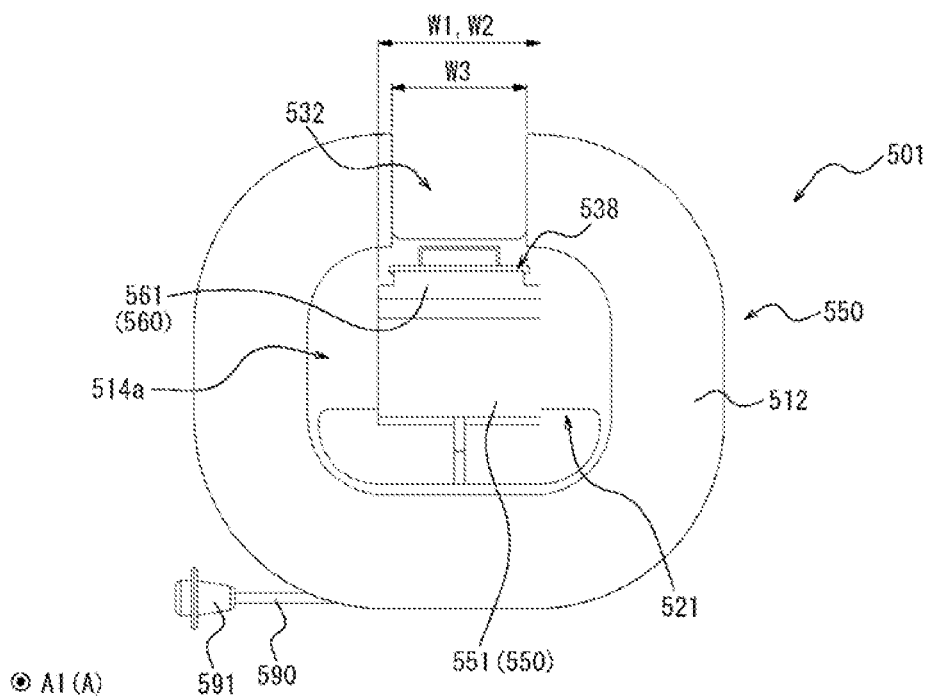
FIG. 35 is a view of a modification example of the compression device illustrated in FIG. 22.

In the sixth embodiment described above, as illustrated in FIG. 25B and the like, the extending portion 580 extends through the slit 538 of the holding member 521 of the main body portion 510. As described above, since the extending portion 580 is fixed to the holding member 521, the extending portion 580 does not move to the downward direction A1 side through the slit 538. Meanwhile, there is a possibility that the compression portion 550, the hinge portion 560, and the pressing portion 570 that are connected to the extending portion 580 move to the upward direction A2 side through the slit 538 due to force received from a biological surface. For this reason, it is preferable that the maximum width of at least one of, preferably the maximum widths of all of the compression portion 550, the hinge portion 560, and the pressing portion 570 are wider (longer) than the maximum width (maximum length) of the slit 538. When the width of one of the compression portion 550, the hinge portion 560, and the pressing portion 570 is wider than the maximum width of the slit 538, a portion having a wider width than the maximum width of the slit 538 may be provided in only a part thereof, or the minimum width thereof may be wider than that of the slit 538. As one example, FIG. 35 illustrates a configuration where in the sixth embodiment, a maximum width W1 of the inflatable compression body 551 as the compression portion 550 and a maximum width W2 of the material hinge 561 as the hinge portion 560 are larger than a maximum width W3 of the slit 538. The width of the compression portion 550 illustrated in FIG. 35 is uniform, and the width is the maximum width W1 at any position. For this reason, the minimum width of the compression portion 550 illustrated in FIG. 35 is wider than the maximum width W3 of the slit 538. In addition, regarding the maximum width W2 of the hinge portion 560 illustrated in FIG. 35, the maximum width of only a part close to the compression portion 550 is wider than the maximum width W3 of the slit 538. In such a manner, since the maximum width of at least one of the compression portion 550, the hinge portion 560, and the pressing portion 570 (refer to FIG. 25B and the like) is wider than the maximum width of the slit 538, even if receiving force from the biological surface, the compression portion 550, the hinge portion 560, and the pressing portion 570 are unlikely to move to the upward direction A2 side through the slit 538. It is preferable that such a size relationship between the maximum widths is also applied to the fifth embodiment and the seventh to thirteenth embodiments.

Figure 36:
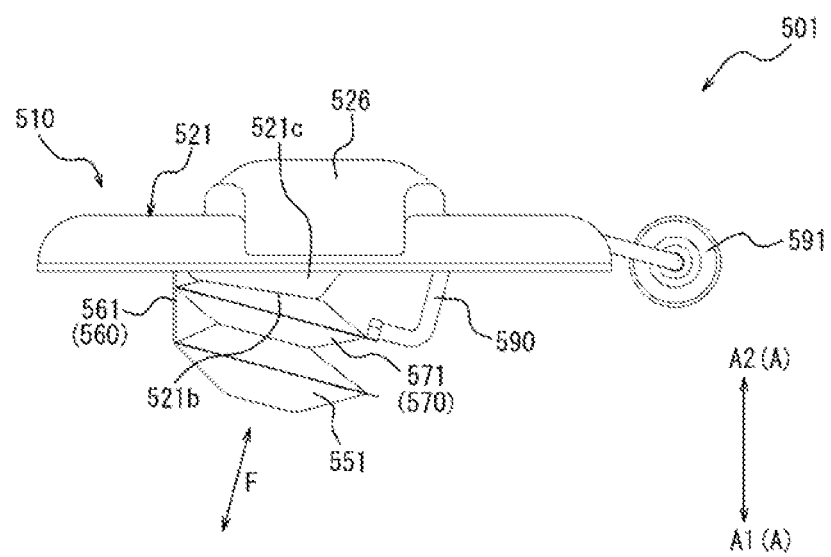
FIG. 36 is a view of a modification example of the compression device shown in FIG. 22.

Furthermore, in the sixth to thirteenth embodiments described above, the lower surface on the downward direction A side of the holding member 521 of the main body portion 510 is formed of a flat surface substantially orthogonal to the thickness direction A. Then, each of all of the inflatable pressing bodies as the pressing portions receives reaction force from the lower surface of the holding member 521 to be inflated toward the downward direction A1. The lower surface of the holding member 521 is not limited to a flat surface substantially orthogonal to the thickness direction A. FIG. 36 illustrates an example where an inclined surface is formed in a part of the lower surface of the holding member 521. In FIG. 36, for convenience of description, the adhesion sheet 514 (refer to FIG. 22 and the like) as the fixing member 511 of the main body portion 510 is unillustrated. As illustrated in FIG. 36, an inclined surface portion 521b inclined with respect to a plane orthogonal to the thickness direction A may be provided in the lower surface of the holding member 521. The inclined surface portion 521b may be a flat surface or a curved surface. As illustrated in FIG. 36, the inflatable pressing body 571 as the pressing portion 570 receives reaction force from the inclined surface portion 521b to be inflatable toward an inclination direction F inclined with respect to a direction substantially orthogonal to the thickness direction A. The inclination angle of the inclination direction F can be appropriately set according to a desired direction of compression of a biological surface by the compression portion 550. Furthermore, in FIG. 36, the inclined surface portion 521b is formed in a top surface of a protruding portion 521c protruding toward the downward direction A1. In such a manner, a deep position from the biological surface can be compressed by the inflatable compression body 551 as the compression portion 550.

In addition, also in the first to fifth embodiments, a surface of the pressing portion, which receives reaction force during inflation, is a flat surface in the main body portion, the flat surface being substantially orthogonal to the thickness direction A; however, similar to the above configuration, an inclined surface portion inclined with a plane orthogonal to the thickness direction A may be provided, and the reaction force of the pressing portion during inflation may be received by the inclined surface portion.

Figure 37:
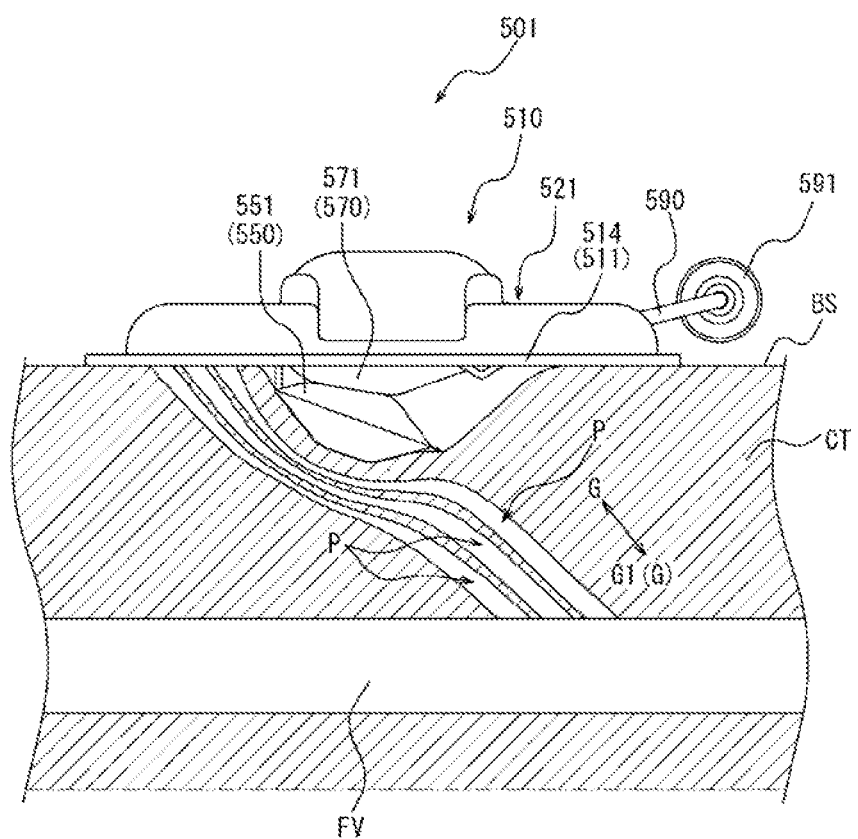
FIG. 37 is a view illustrating a state where perforations illustrated in FIG. 7B are narrowed or obstructed by the compression device illustrated in FIG. 22.

FIG. 37 is a view illustrating a state where the perforations P illustrated in FIG. 7B are narrowed or obstructed by the compression device 501 as the sixth embodiment. Here, the compression device 501 as the sixth embodiment is provided as one example; however, the compression device in any embodiment of the first to thirteenth embodiments may be used. As illustrated in FIG. 37, the compression device 501 can narrow or obstruct the perforations P without obstructing a vein such as the femoral vein FV.

Figure 38:
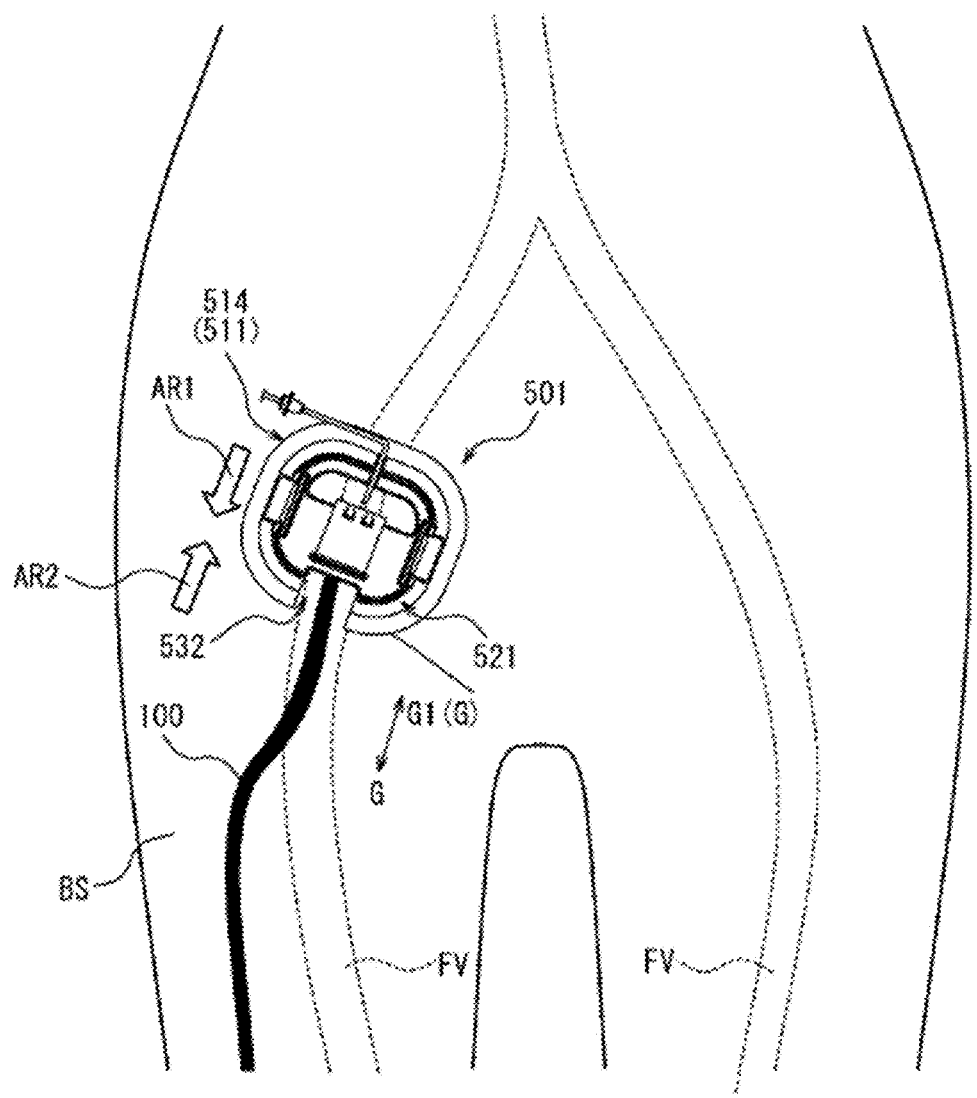
FIG. 38 is a front view of the state illustrated in FIG. 37 as seen from a biological surface side.

FIG. 38 is a front view of the state illustrated in FIG. 37 as seen from a biological surface BS side. In other words, FIG. 38 illustrates a front view at a position on the biological surface BS, which is compressed by the compression device 501. Here, the expression "a front view at a position on the biological surface, which is compressed by the compression device" means a state where a portion of the biological surface, which is to be compressed by the compression device, is seen from a direction perpendicular to the portion before compression. FIG. 38 illustrates a front view of the inguinal region. In the front view illustrated in FIG. 38, a direction where the biological surface BS is compressed (refer to white arrow "AR1" in FIG. 38) is opposite to an insertion direction G1 of a sheath as the medical device 100 from the biological surface BS toward the vein (refer to white arrow "AR2" in FIG. 38) in an extending direction G of the perforation P. Namely, in the front view illustrated in FIG. 38, the direction where the compression device 501 compresses the biological surface BS is opposite to the insertion direction G1 of the sheath as the medical device 100. In such a manner, the perforation P (refer to FIG. 7B) is easily narrowed or obstructed without obstructing the vein such as the femoral vein FV.

In other words, as illustrated in FIG. 7B, the extending direction G of the perforation P is inclined with respect to the biological surface BS. In addition, as illustrated in FIG. 37, the compression portion 550 as the compression device 501 compresses the biological surface BS while rotating around the hinge portion 560, and the compression force includes a component (hereinafter, referred to as an "inclination component") in a direction inclined with respect to the biological surface BS. Here, as illustrated in FIG. 37, an inclination direction of the perforation P is inclined reverse to the inclination direction of the inclination component of the compression force by the compression device 501. Namely, the compression of the biological surface BS by the compression device 501 is executed such that the direction of compression intersects the extending direction G of the perforation P. Therefore, the perforation P can be efficiently narrowed or obstructed.

The detailed description above describes embodiments of a compression device and a compression method. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A compression device comprising:
a main body portion that is fixable to a biological surface of a living body;
a compression portion configured to compress the biological surface;
a hinge portion that supports the compression portion relative to the main body portion so that the compression portion is rotatable around a rotational axis with respect to the main body portion;
a pressing portion configured to press the compression portion in one rotational direction so that the compression portion rotates in the one rotational direction around the rotational axis, the pressing portion including an inflatable pressing body that is located between the main body portion and the compression portion, the inflatable pressing body including an interior configured to receive fluid to inflate the inflatable pressing body;
a receiving portion configured to receive a tubular member constituting at least a part of a medical device that is positioned in the living body;
a fluid supply tube in communication with the interior of the inflatable pressing body to supply the fluid to the interior of the inflatable pressing body;
the compression portion being configured to compress the biological surface when the compression portion is rotated around the rotational axis in the one rotational direction as a result of the compression portion being pressed in the one rotational direction by the pressing portion;
the compression portion being comprised of an inflatable compression body, the inflatable compression body including an interior configured to receive fluid to inflate the inflatable compression body;
the hinge portion being located between the compression portion and the receiving portion in a cross-sectional view orthogonal to the rotational axis;
the interior of the inflatable pressing body and the interior of the inflatable compression body communicating with each other;
the inflatable pressing body having one side connected to the hinge portion, the inflatable pressing body also having an other side opposite the one side, the fluid supply tube being located at the other side of the inflatable pressing body and extending away from the other side of the inflatable pressing body; and
the fluid supplied from the fluid supply tube being supplied to the interior of the inflatable compression body after passing through the interior of the inflatable pressing body.

2. The compression device according to claim 1, wherein the compression device is configured to perform hemostasis at a puncture site at which the tubular member punctures the biological surface, the receiving portion extending, in a cross-sectional view orthogonal to the rotational axis, in a direction where the compression portion rotates when the pressing portion presses the compression portion to rotate around the rotational axis.

3. The compression device according to claim 1, wherein the compression portion contacts the biological surface to compress the biological surface, the compression portion including an outer surface provided with an anti-slip portion at a position that contacts the biological surface when the compression portion compresses the biological surface.

4. The compression device according to claim 1, further comprising: an angle restriction portion provided on the main body portion to restrict a range of rotation of the compression portion around the rotational axis.

5. The compression device according to claim 1, wherein the main body portion includes a mounting portion having a lower surface configured to face towards the biological surface, and further including an adhesion sheet provided on the lower surface of the mounting portion, the adhesion sheet including adhesive that is adherable to the biological surface to fix the main body portion on the biological surface.

6. The compression device according to claim 1, wherein the main body portion includes a belt that extends in an axial direction along the rotational axis and is configured to be wound around a living body that includes the biological surface.

7. The compression device according to claim 6,
wherein the main body portion further includes an extending portion that extends from the belt toward a direction orthogonal to the axial direction to support the compression portion via the hinge portion in an end portion on an opposite side of the extending portion from the belt,
the pressing portion is a band that is mounted on the compression portion to extend from opposite sides of the compression portion in opposite axial directions; and
when the band is fixed to the belt while the belt is wound around the living body, the band presses the compression portion so that the compression portion maintains a state where the compression portion rotates in the one rotational direction.

8. The compression device according to claim 1, wherein the hinge portion is a material hinge that includes a deformation portion which is flexible, and that is integrally connected to the compression portion.

9. The compression device according to claim 8, wherein the material hinge is fixed to the main body portion.

10. The compression device according to claim 8, further comprising:
an extending portion that extends from the material hinge and is fixed to the main body portion,
wherein the material hinge is supported, via the extending portion, by the main body portion.

11. A compression device comprising:
a main body portion positionable on a biological surface of a living body, the main body portion including a lower surface configured to face the biological surface, the lower surface of the main body portion facing in a downward direction;
the main body portion having an adhesive on the lower surface of the main body portion to adhere the main body to the biological surface of the living body and fix the main body portion on the biological surface;
a compression portion configured to compress the biological surface while the lower surface of the main body portion is adhered to the biological surface of the living body;
a hinge portion that supports the compression portion relative to the main body portion so that the compression portion is rotatable around a rotational axis with respect to the main body portion;
a pressing portion configured to press the compression portion in one rotational direction to rotate the compression portion in the one rotational direction around the rotational axis so that the compression portion moves in the downward direction;

the compression portion being configured to move in the downward direction to compress the biological surface when the compression portion is rotated around the rotational axis in the one rotational direction as a result of the compression portion being pressed in the one rotational direction by the pressing portion;

the main body portion including an annular-shaped adhesive sheet on which is located the adhesive;

the annular-shaped adhesive sheet including a receiving portion configured to receive a tubular member that is puncturing the biological surface when the main body is adhered to the biological surface during use of the compression device, the receiving portion being surrounded by an inner peripheral surface of the annular-shaped adhesive sheet that faces toward the receiving portion, the annular-shaped adhesive sheet also having an outer peripheral surface that is opposite the inner peripheral surface of the annular-shaped adhesive sheet and that faces away from the receiving portion;

the annular-shaped adhesive sheet including a slit that passes through the annular-shaped adhesive sheet from the outer peripheral surface to the inner peripheral surface; and the receiving portion being configured to receive the tubular member by way of the slit when the main body is adhered to the biological surface during use of the compression device.

12. A compression device comprising:

a main body portion configured to be fixed on a biological surface of a living body, the main body portion including an annular-shaped mounting portion having a lower surface configured to face the biological surface when the main body portion is fixed on the biological surface, the annular-shaped mounting portion including a through opening that passes through the mounting portion;

a compression portion configured to compress the biological surface while the lower surface of the annular-shaped mounting portion is fixed to the biological surface of the living body;

a hinge portion that supports the compression portion relative to the main body portion so that the compression portion is rotatable around a rotational axis with respect to the main body portion in a manner allowing the compression member to move in a downward direction toward the biological surface when the annular-shaped mounting portion is fixed to the biological surface of the living body;

a pressing portion configured to press the compression portion in one rotational direction to rotate the compression portion in the one rotational direction around the rotational axis so that the compression portion moves in the downward direction toward the biological surface;

the compression portion, the pressing portion and the hinge portion being located in the through opening as seen in a plan view of the main body portion while the lower surface of the annular-shaped mounting portion is facing in the downward direction; and the compression portion being configured to move in the downward direction to compress the biological surface when the compression portion is rotated around the rotational axis in the one rotational direction as a result of the compression portion being pressed in the one rotational direction by the pressing portion.

13. The compression device according to claim 12, wherein the wherein the pressing portion includes an inflatable pressing body that is located between the main body portion and the compression portion, the inflatable pressing body having one side connected to the hinge portion, the inflatable pressing body also having an other side opposite the one side, the fluid supply tube being located at the other side of the inflatable pressing body and extending away from the other side of the inflatable pressing body.

14. The compression device according to claim 12, wherein the main body portion includes a holding main body portion that extends across the through opening of the annular-shaped mounting portion, the hinge portion being fixed to the holding main body portion and extending away from a lower surface of the holding main body portion in a direction toward the lower surface of the main body portion, the rotational axis being located between the lower surface of the main body portion and the lower surface of the holding main body portion as seen in a cross-sectional view orthogonal to the rotational axis.

* * * * *